(12) United States Patent
Blauvelt et al.

(10) Patent No.: US 7,542,638 B2
(45) Date of Patent: Jun. 2, 2009

(54) OPTICAL ASSEMBLIES FOR FREE-SPACE OPTICAL PROPAGATION BETWEEN WAVEGUIDE(S) AND/OR FIBER(S)

(75) Inventors: Henry A. Blauvelt, San Marino, CA (US); David W. Vernooy, Sierra Madre, CA (US); Joel S. Paslaski, San Gabriel, CA (US)

(73) Assignee: HOYA Corporation USA, San Jose, CA (US)

( * ) Notice: Subject to any disclaimer, the term of this patent is extended or adjusted under 35 U.S.C. 154(b) by 0 days.

(21) Appl. No.: 11/754,298

(22) Filed: May 27, 2007

(65) Prior Publication Data

US 2007/0237456 A1 Oct. 11, 2007

Related U.S. Application Data

(62) Division of application No. 10/652,955, filed on Aug. 29, 2003, now Pat. No. 7,269,317.

(60) Provisional application No. 60/466,799, filed on Apr. 29, 2003, provisional application No. 60/455,712, filed on Mar. 17, 2003, provisional application No. 60/413,986, filed on Sep. 25, 2002.

(51) Int. Cl.
    *G02B 6/26* (2006.01)
(52) U.S. Cl. .......................... 385/34; 385/39; 385/50
(58) Field of Classification Search .................. 385/31, 385/33–36, 39, 42, 50, 52
    See application file for complete search history.

(56) References Cited

U.S. PATENT DOCUMENTS

| | | | |
|---|---|---|---|
| 4,094,578 A | 6/1978 | DiVita et al. |
| 4,156,206 A | 5/1979 | Comerford et al. |
| 4,398,791 A | 8/1983 | Dorsey et al. |
| 4,750,799 A | 6/1988 | Kawachi et al. |
| 4,978,189 A | 12/1990 | Blonder et al. |

(Continued)

FOREIGN PATENT DOCUMENTS

| | | |
|---|---|---|
| EP | 0 575 993 | 12/1993 |
| EP | 1 143 273 | 10/2001 |

OTHER PUBLICATIONS

International Search Report dated Apr. 14, 2004 from related App No. PCT/US03/27238.

(Continued)

*Primary Examiner*—Kevin S Wood
(74) *Attorney, Agent, or Firm*—David S. Alavi

(57) ABSTRACT

An optical apparatus comprises segments of a GRIN optical medium mounted on a substrate in at least one groove thereon. The GRIN segments are longitudinally spaced apart from one another on the substrate, and are arranged so that a free-space optical beam received through the distal end face of the first GRIN segment is transmitted through the proximal end face of the first GRIN segment, propagates to the proximal end face of the second GRIN segment, is received through the proximal end face of the second GRIN segment, and is transmitted as a free-space optical beam through the distal end face of the second GRIN segment. The GRIN segments can be derived from a single GRIN optical medium mounted on the substrate.

20 Claims, 44 Drawing Sheets

U.S. PATENT DOCUMENTS

| | | | |
|---|---|---|---|
| 4,989,972 | A | 2/1991 | Braun et al. |
| 5,943,454 | A | 8/1999 | Aksyuk et al. |
| 6,014,483 | A | 1/2000 | Thual et al. |
| 6,498,876 | B1 | 12/2002 | Liu et al. |
| 6,856,749 | B2 * | 2/2005 | Kosuge et al. .............. 385/137 |
| 6,922,508 | B2 | 7/2005 | Glebov et al. |
| 7,269,317 | B2 | 9/2007 | Blauvelt et al. |
| 2003/0077035 | A1 | 4/2003 | Deng et al. |
| 2004/0218870 | A1 | 11/2004 | Blauvelt et al. |
| 2008/0031572 | A1 | 2/2008 | Blauvelt et al. |

OTHER PUBLICATIONS

EPO Search Report dated Sep. 1, 2005 from related App No. EP03770271.9.

EPO Examination Report dated Jul. 4, 2006 from related App No. EP03770271.9.

EPO Examination Report dated Aug. 8, 2007 from related App No. EP03770271.9.

EPO Examination Report dated Oct. 23, 2008 from related App No. EP03770271.9.

Dautartas et al, Hybrid Optical Packaging, Challenges and Opportunities, IEEE 2002 Electronics Components and Technology Conference, 2002, p. 787.

Drogemuller, A Compact Optical Isolator With a Plano-Convex YIG Lens for Laser-to-Fiber Coupling, Journal of Lightwave Technology, Feb. 1989, pp. 340-346, vol. 7, No. 2.

Oki Electric Industry Co. Ltd., Silicon Microlens(About) - R&D - Oki Global, www.oki.com/jp/RDG/English/CGH_ENG/intro.html, 2003.

Oki Electric Industry Co. Ltd., Silicon Microlens(Technical Data) - R&D - Oki Global, www.oki.com/jp/RDG/English/CGH_ENG/study.html, 2003.

Office Action dated Jun. 29, 2006 from related U.S. Appl. No. 10/652,955.

Office Action dated Jan. 17, 2007 from related U.S. Appl. No. 10/652,955.

Notice of Allowance dated Jul. 11, 2007 from related U.S. Appl. No. 10/652,955.

Office Action dated Nov. 3, 2008 from related U.S. Appl. No. 11/754,297.

Notice of Allowance dated Jan. 2, 2009 from related U.S. Appl. No. 11/754,297.

* cited by examiner

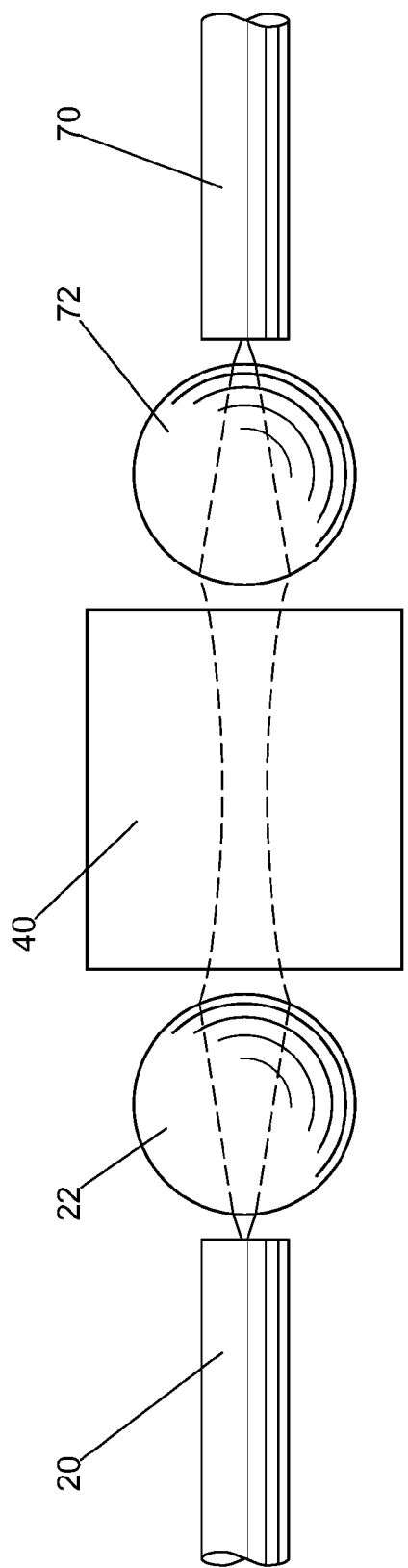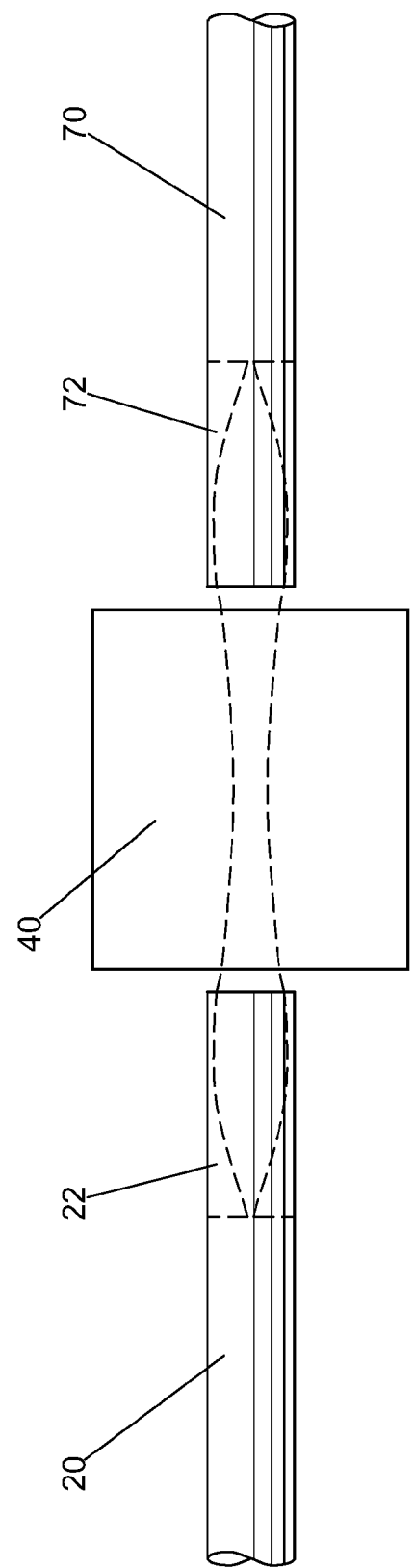
FIG. 1
Prior Art
FIG. 2
Prior Art

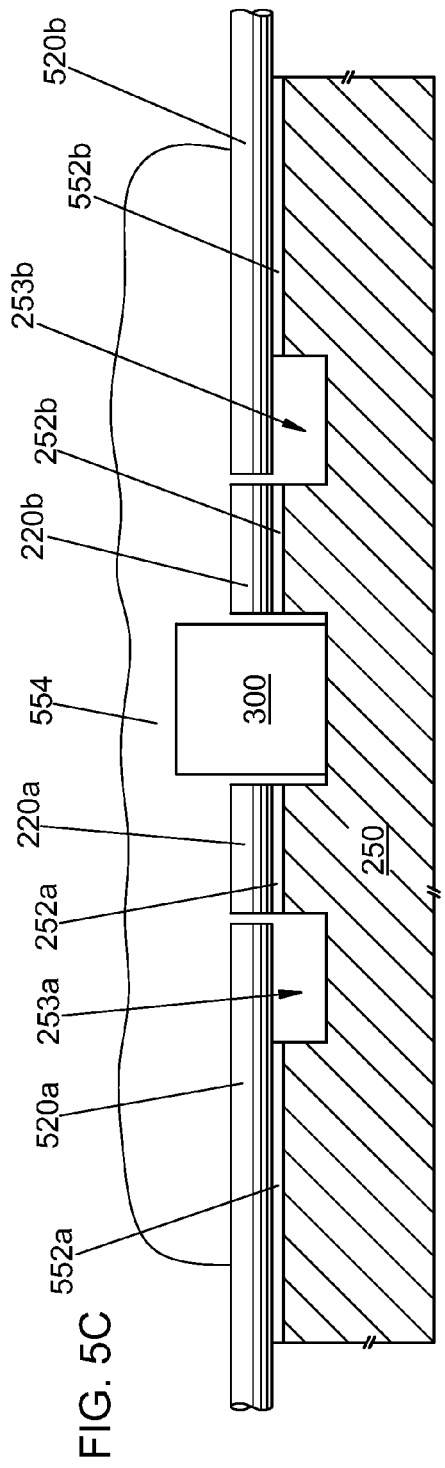
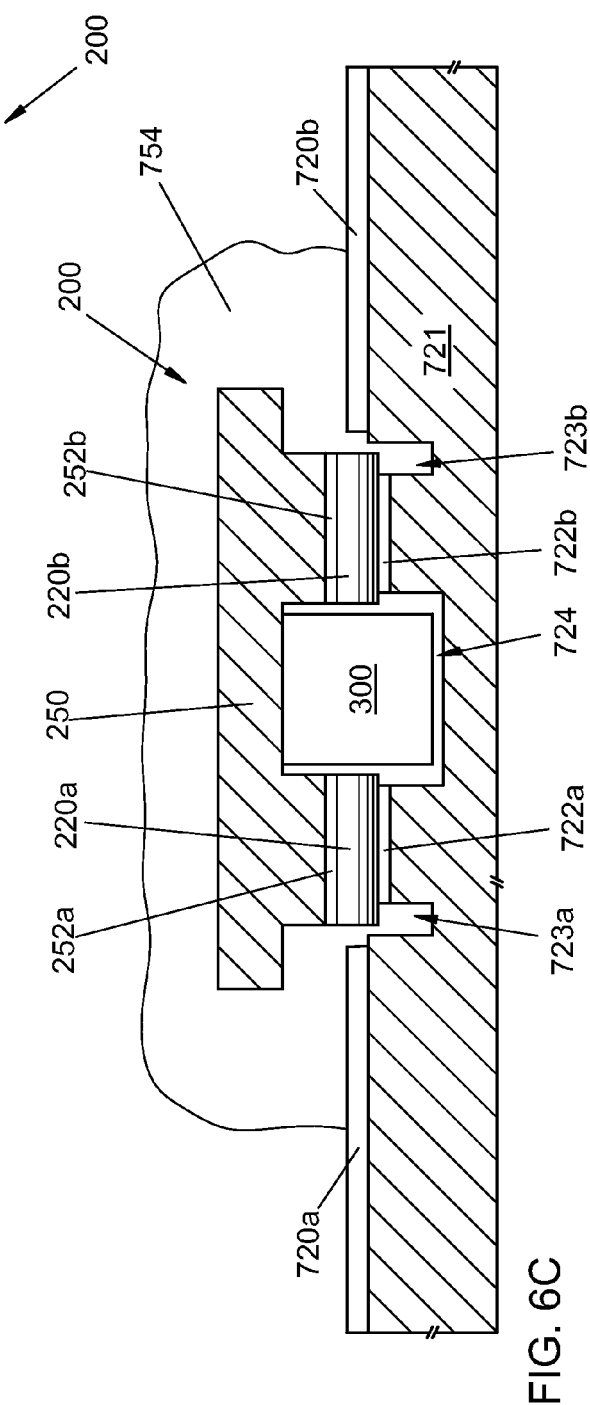
FIG. 5C
FIG. 6C

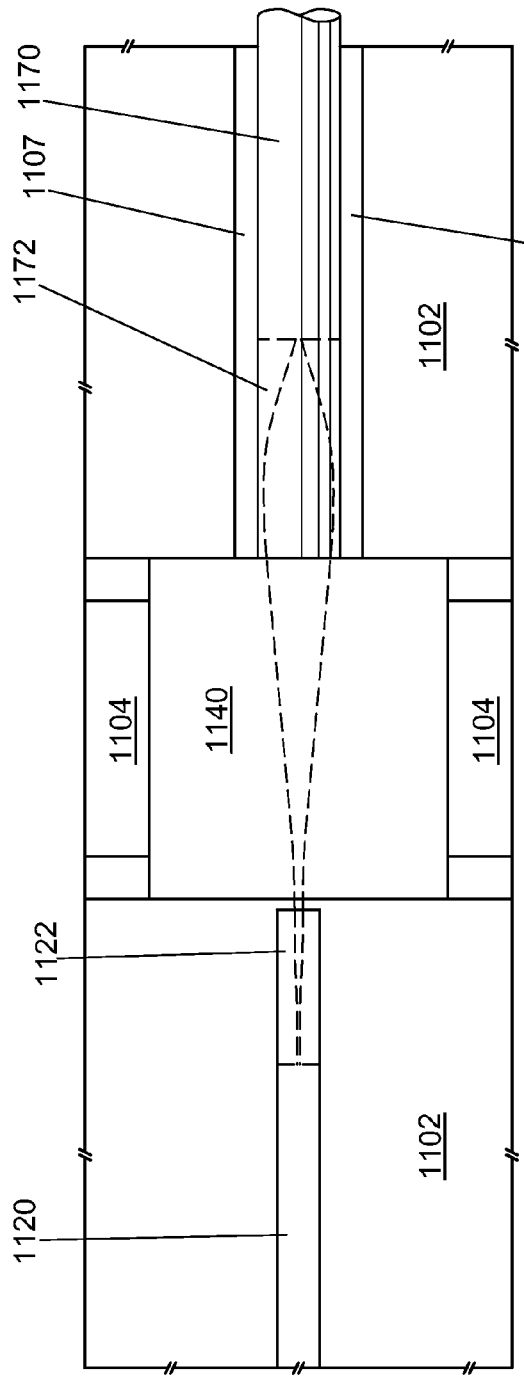
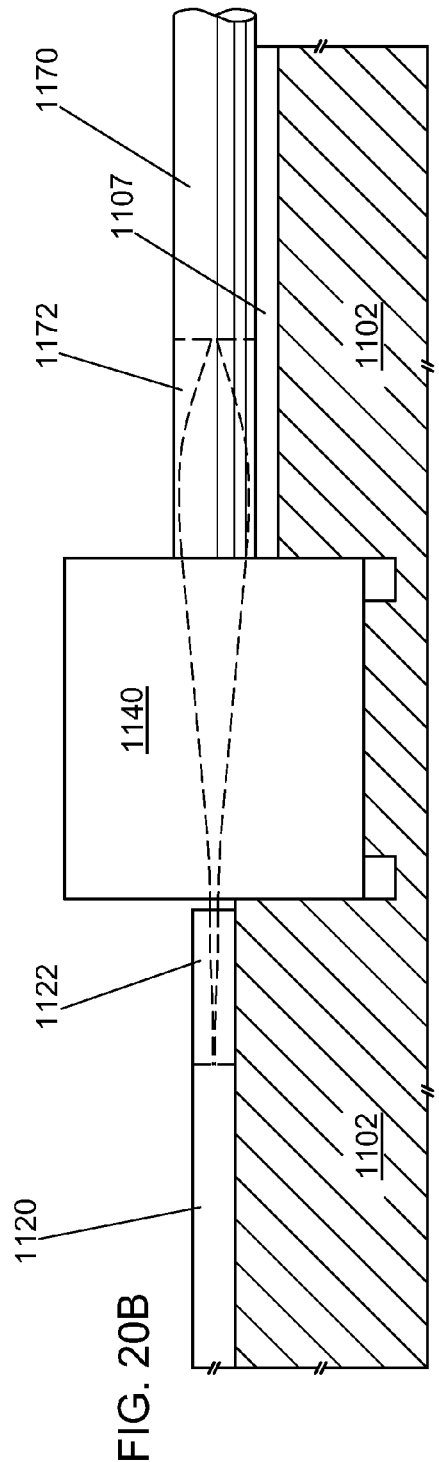
FIG. 20A
FIG. 20B

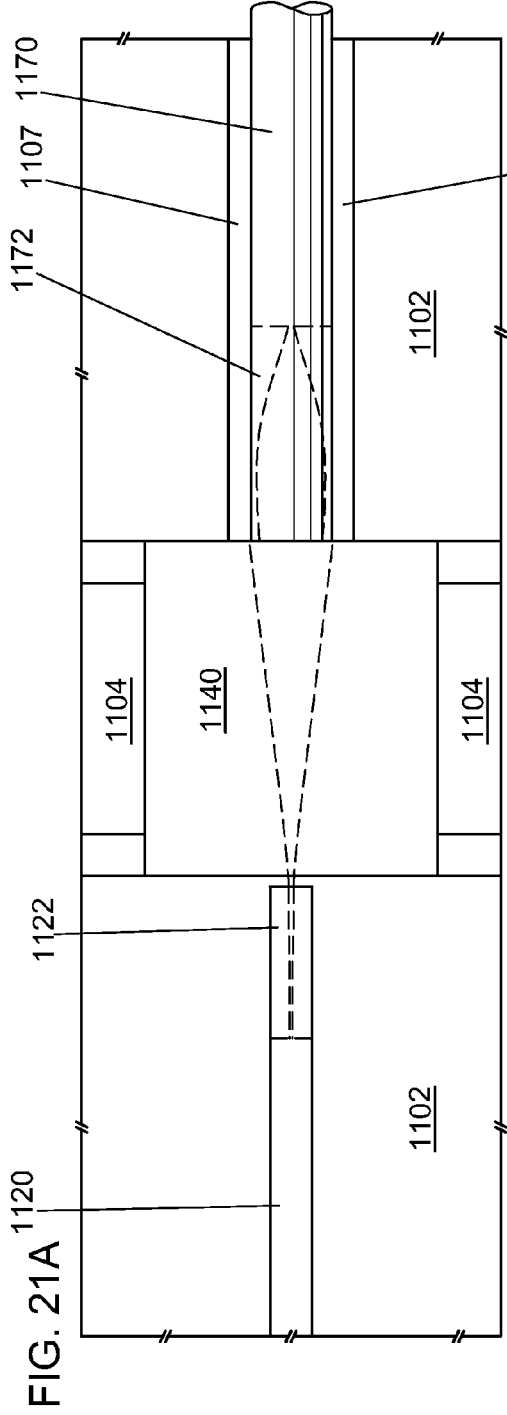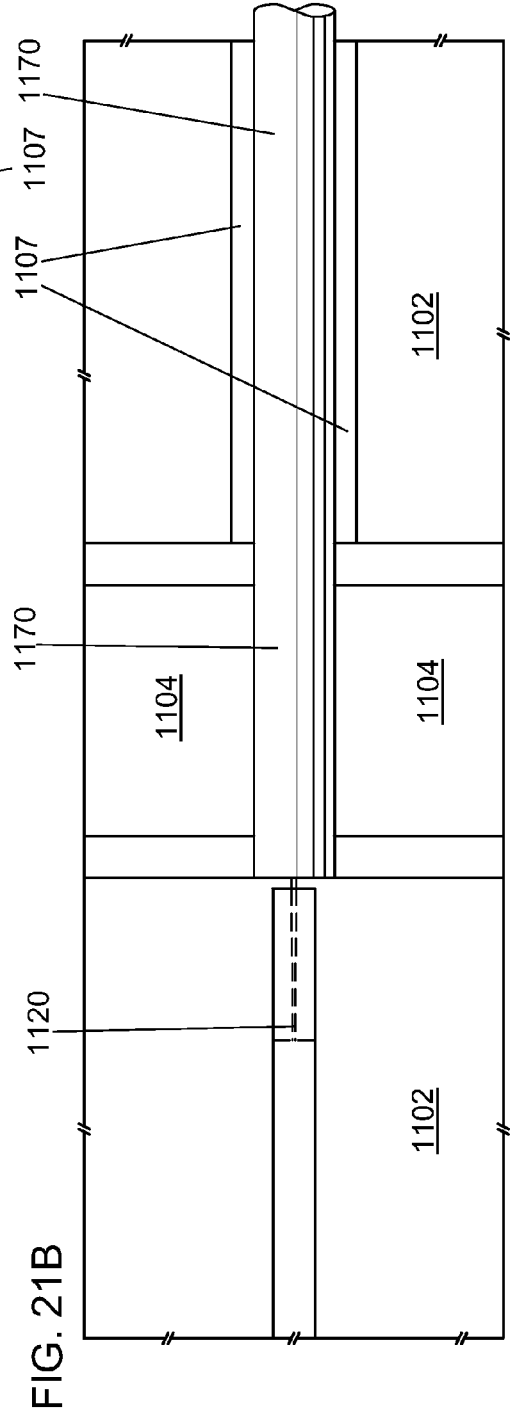

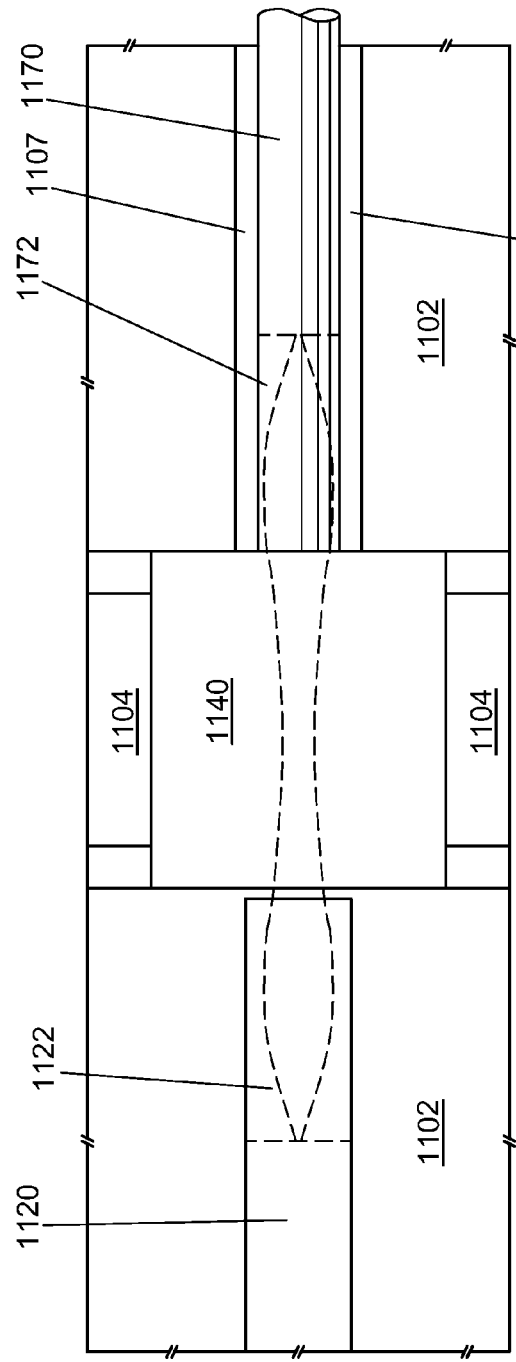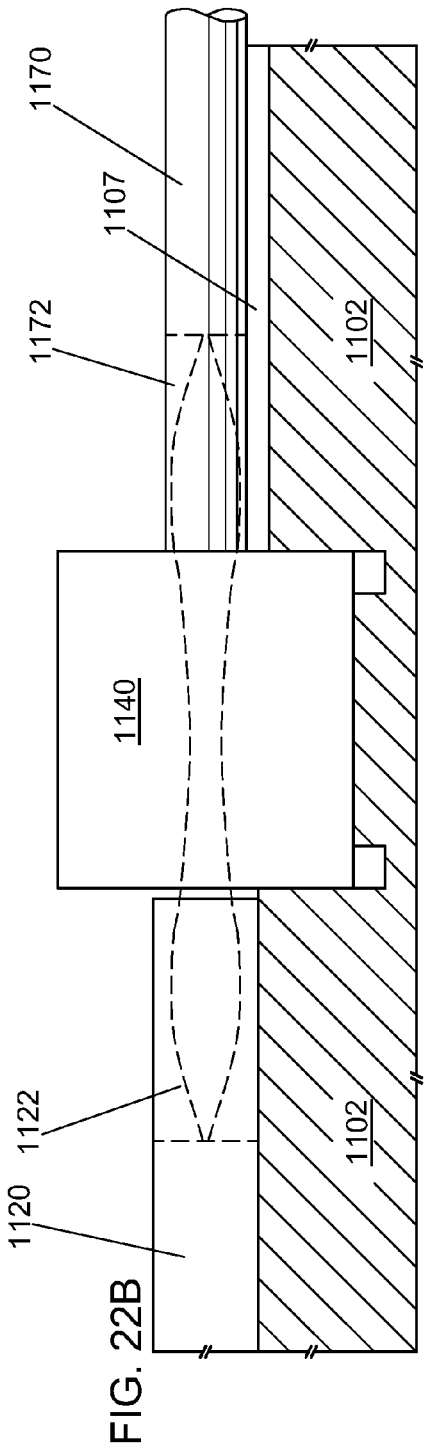
FIG. 22A
FIG. 22B

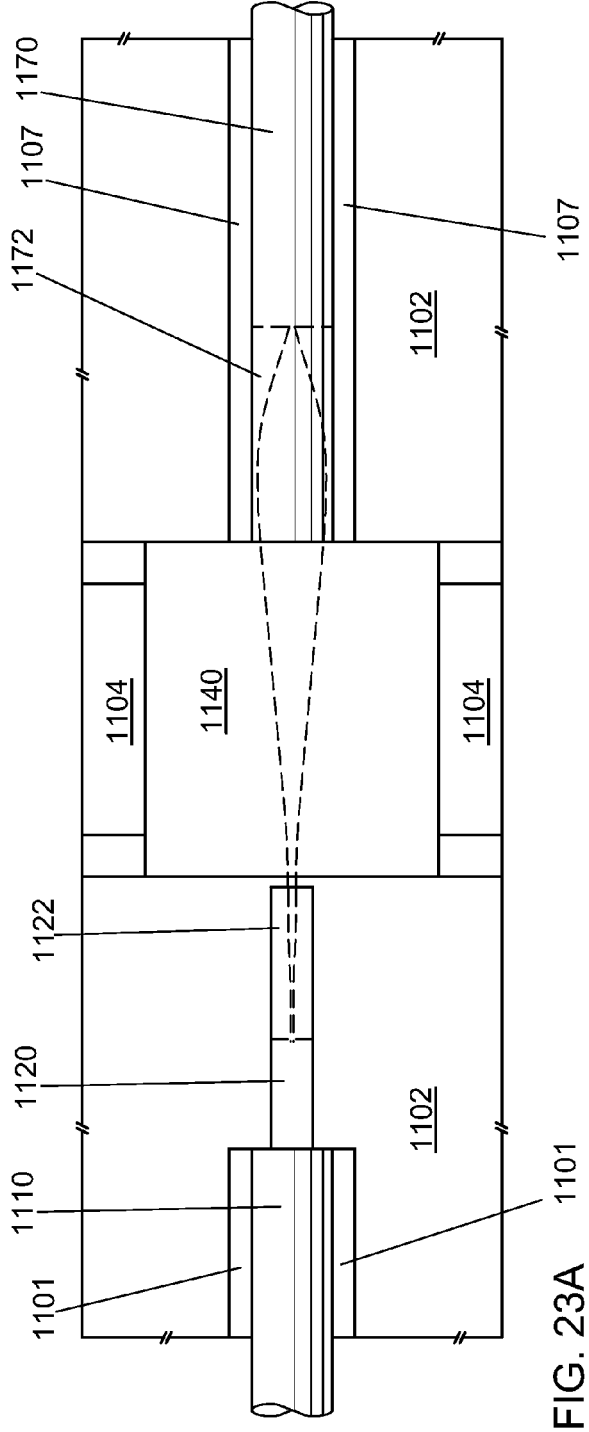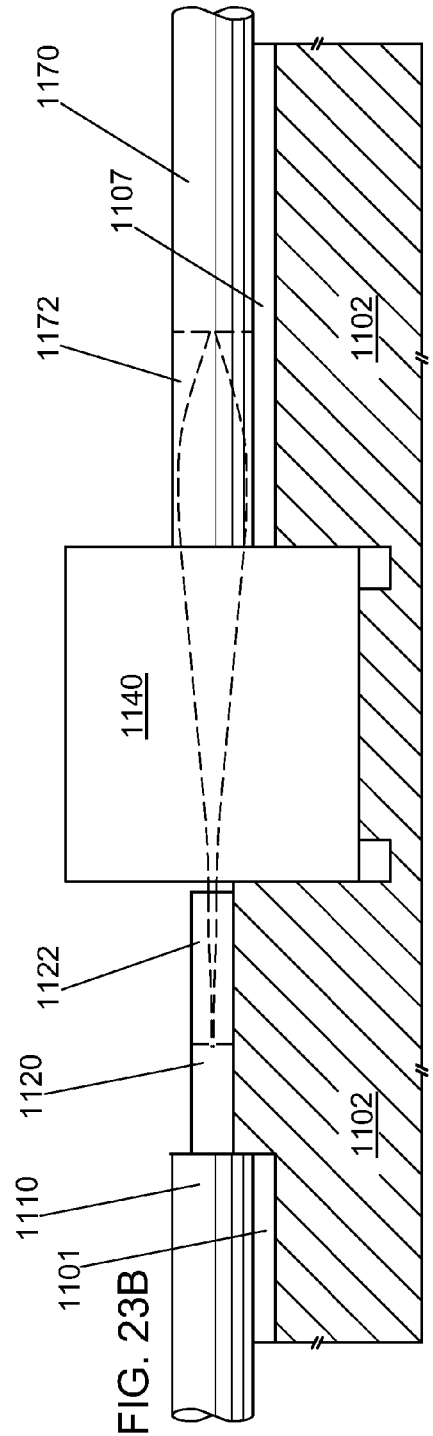

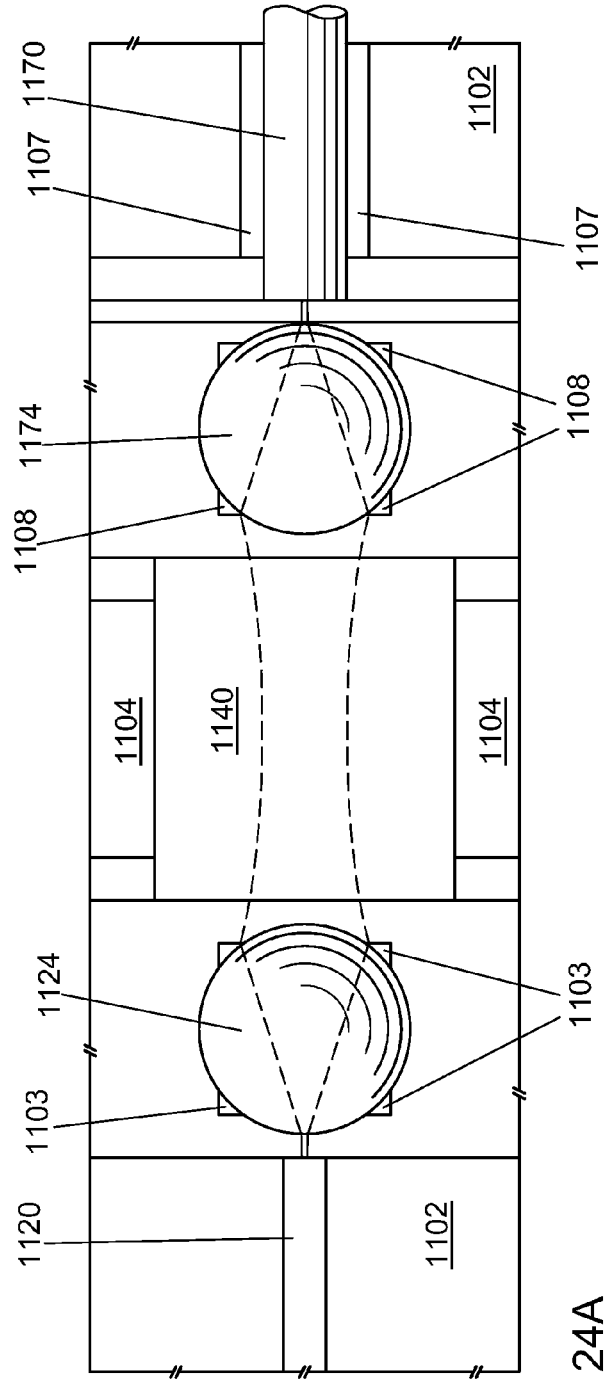
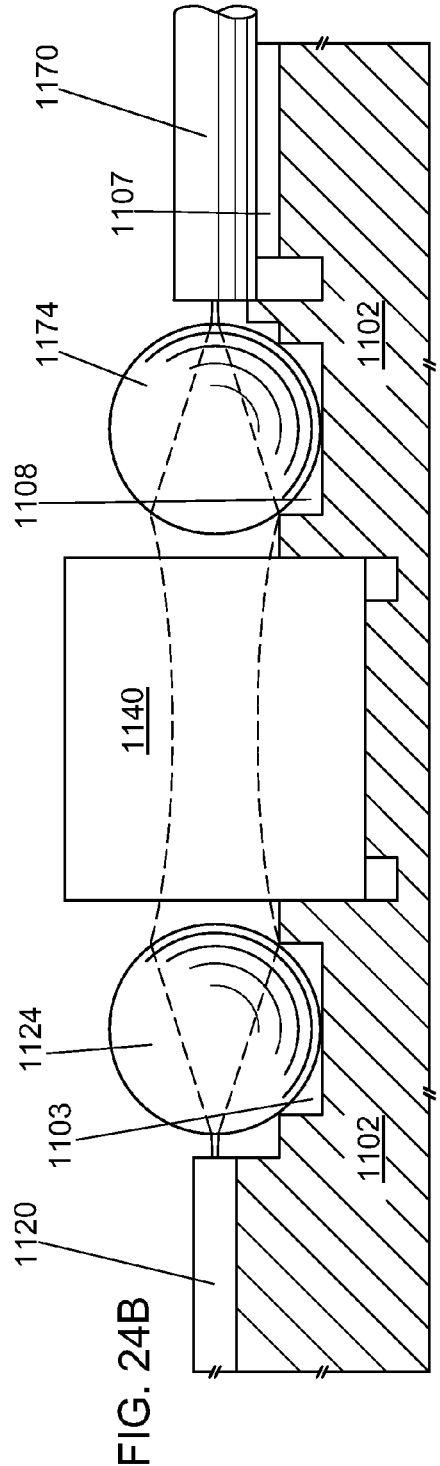
FIG. 24A
FIG. 24B

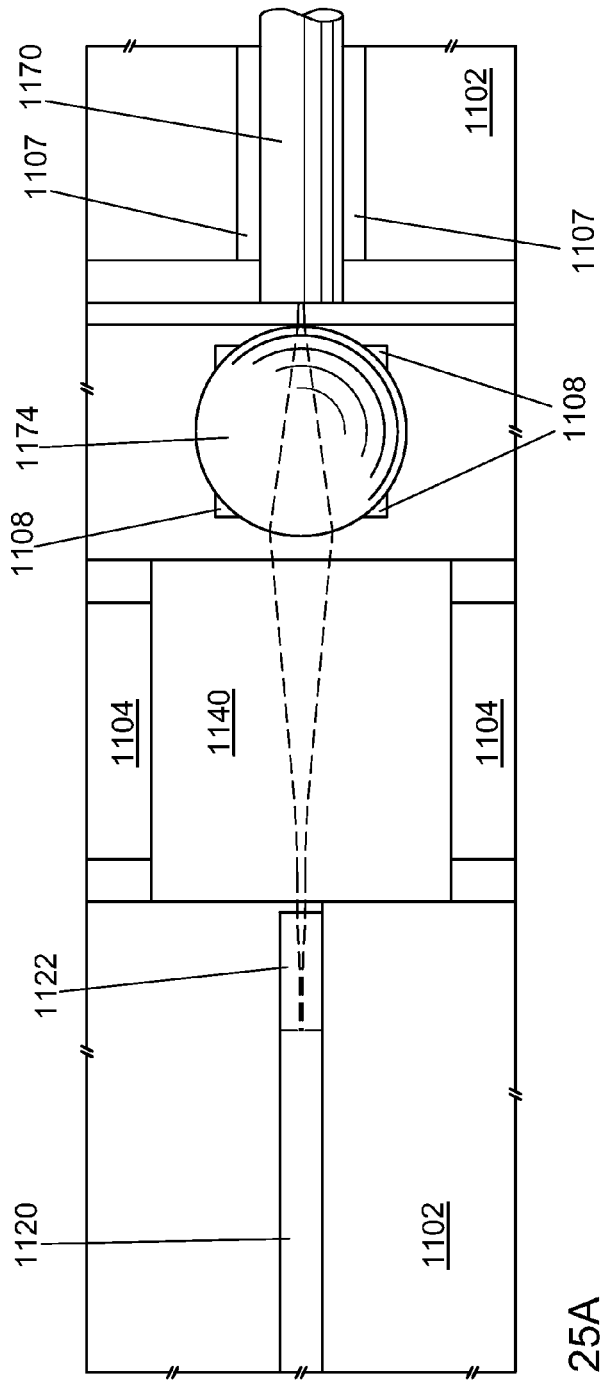
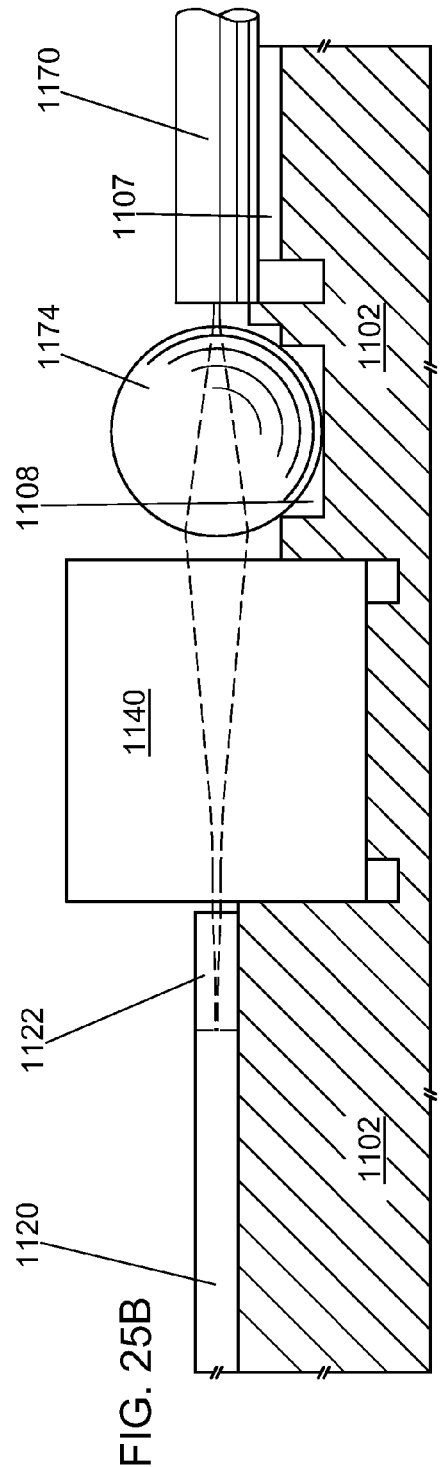
FIG. 25A
FIG. 25B

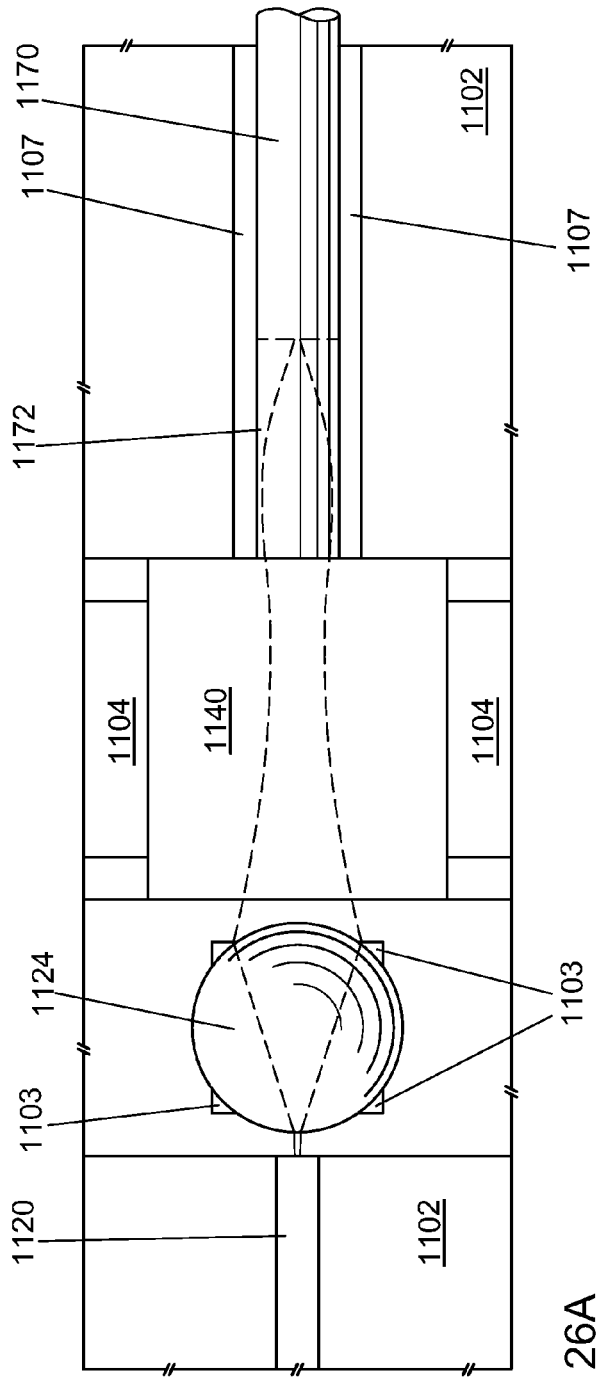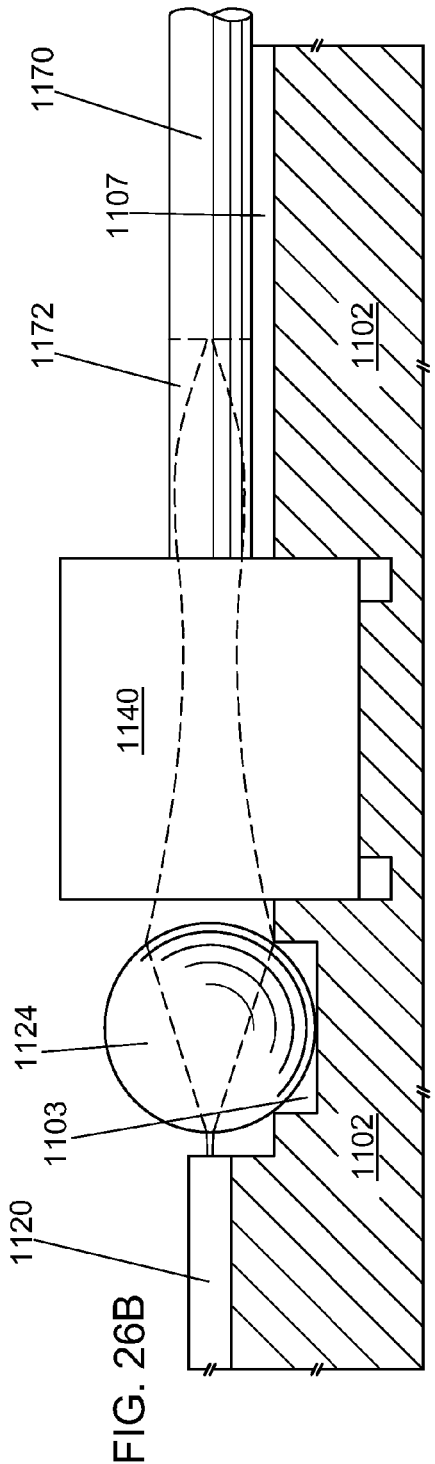
FIG. 26A
FIG. 26B

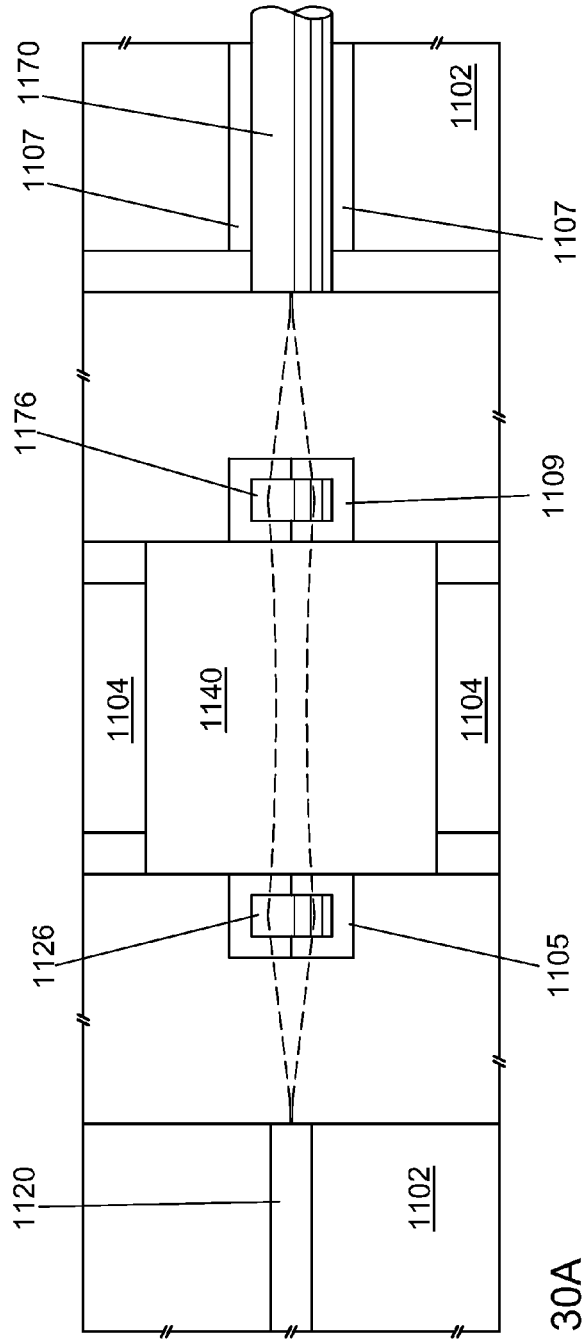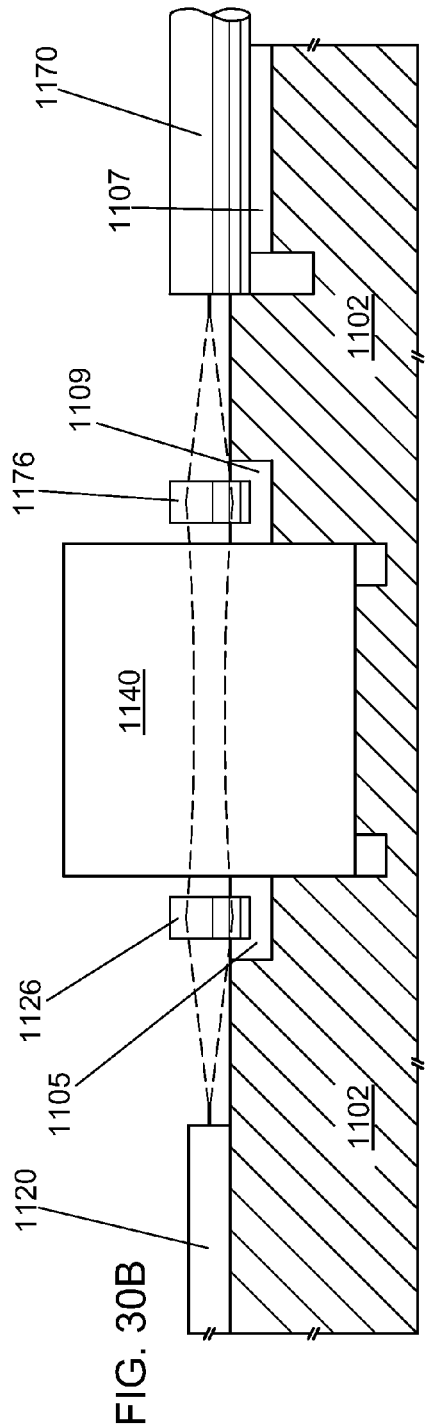
FIG. 30A
FIG. 30B

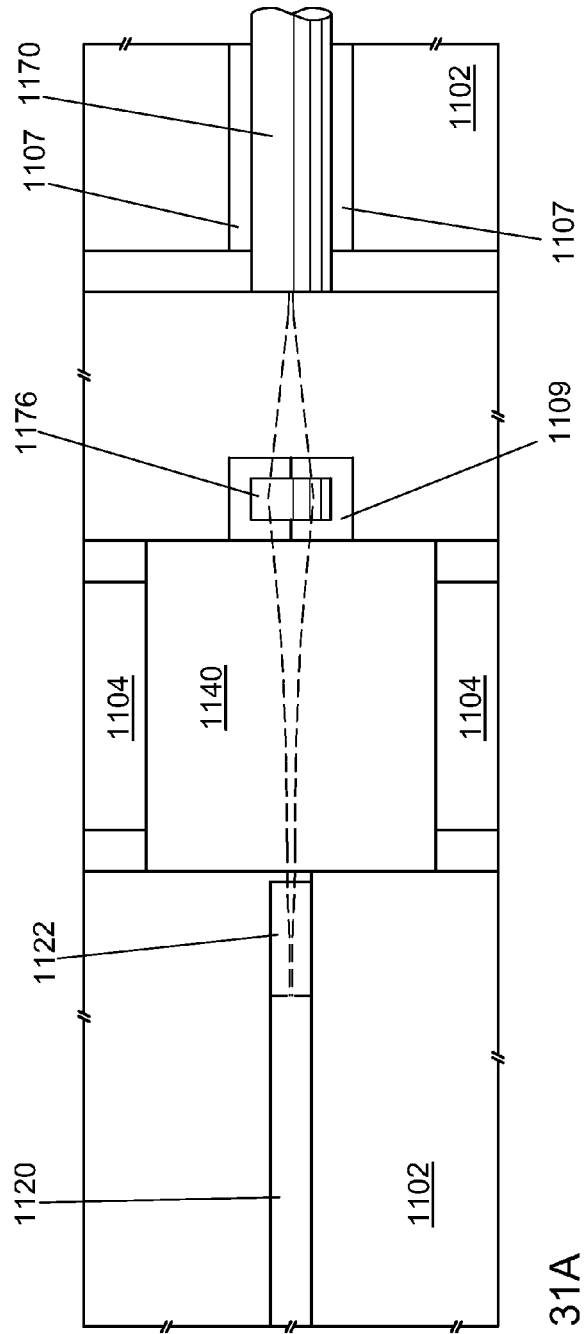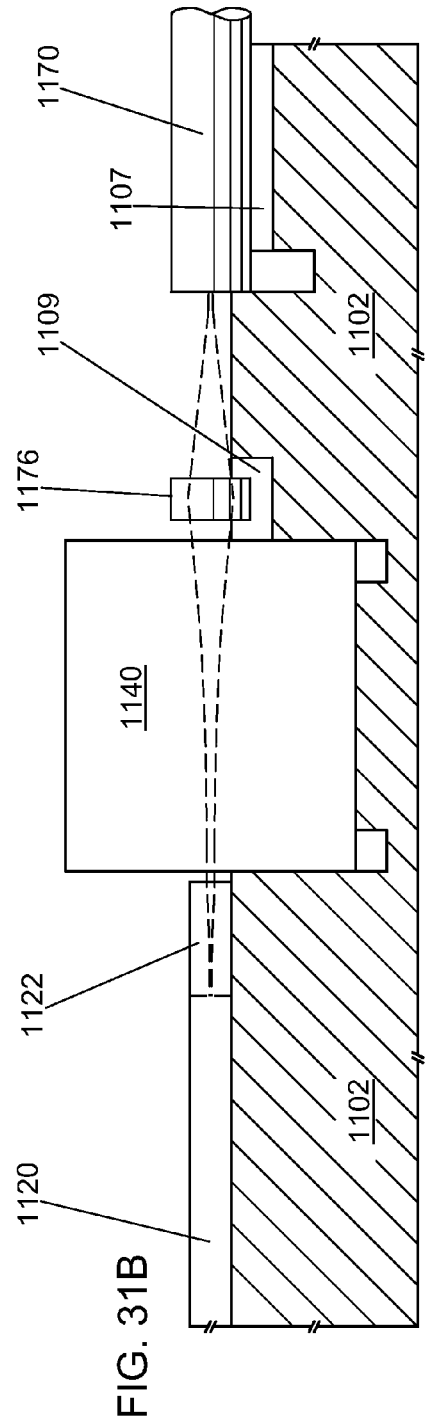
FIG. 31A
FIG. 31B

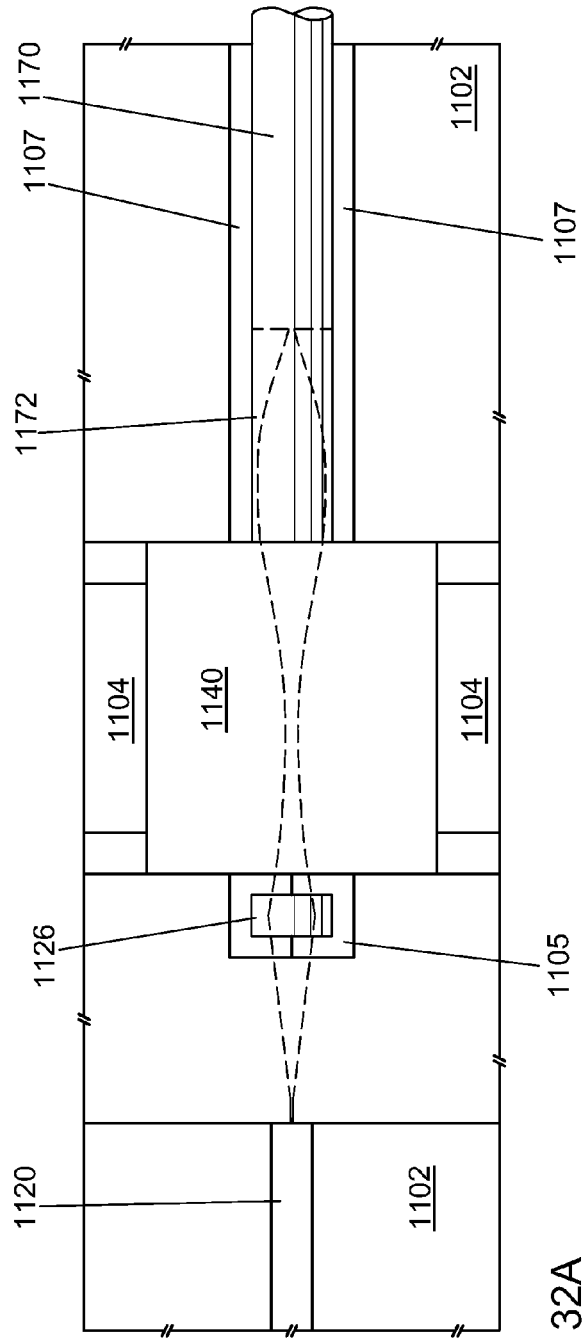
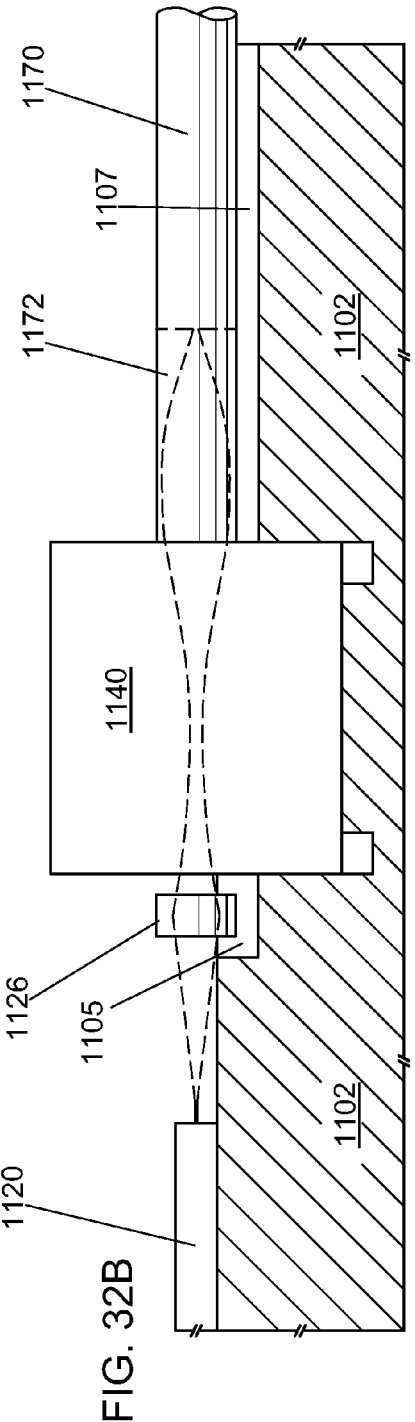
FIG. 32A
FIG. 32B

# US 7,542,638 B2

OPTICAL ASSEMBLIES FOR FREE-SPACE OPTICAL PROPAGATION BETWEEN WAVEGUIDE(S) AND/OR FIBER(S)

BENEFIT CLAIMS TO RELATED APPLICATIONS

This application is a divisional of U.S. non-provisional application Ser. No. 10/652,955 filed Aug. 29, 2003 (now U.S. Pat. No. 7,269,317), which in turn claims benefit of U.S. provisional App. Nos. 60/413,986 filed Sep. 25, 2002, 60/455,712 filed Mar. 17, 2003, and 60/466,799 filed Apr. 29, 2003, each of said applications being hereby incorporated by reference as if fully set forth herein.

BACKGROUND

The field of the present invention relates to free-space optical power transfer. In particular, optical assemblies for free-space optical propagation between waveguide(s) and/or fiber(s), and fabrication methods therefor, are disclosed herein.

Many optical components cannot yet be implemented within a waveguide or optical fiber, but require so-called "free-space" propagation of optical power through the component. The transverse dimensions of such components are typically too large to provide transverse confinement or guiding of the propagating optical power, which will converge and/or diverge as it propagates through the component. When such components must be incorporated into an optical transmission system that includes one or more planar-waveguide(s) and/or optical fiber(s), additional focusing and/or collection optics are required for: 1) transforming a small guided mode emerging from an end of an optical fiber or planar waveguide (typically less than about 10 µm across and divergent upon leaving the fiber or waveguide) into a free-space optical mode that may be transmitted through the optical component; and/or 2) collecting the free-space optical mode and transforming it into an optical mode (typically convergent) that may be efficiently coupled into another optical fiber or planar waveguide. The overall efficiency of optical power transfer between the fiber(s)/waveguide(s) is determined to a major extent by the degree of spatial mode matching achieved between the fiber/waveguide optical modes by the additional focusing and/or collection optics.

Exemplary prior art dual-lens optical assemblies are shown in FIGS. 1 and 2, where an optical isolator 40 (comprising in this example a Faraday rotator with input and output polarizers cemented onto the faces thereof) is shown positioned between two lenses 22 and 72 (ball lenses in FIG. 1, spaced from the fiber ends as shown or alternatively in contact with the fiber ends; gradient-index [GRIN] optical fiber coupling segments fusion spliced onto the fiber ends in FIG. 2). The optical modes are approximately indicated by the dashed lines in FIGS. 1 and 2. Optical power propagating through a single-mode optical fiber 20 exits the fiber end and is then focused by lens 22 for propagation through isolator 40 (with decreased divergence, substantially collimated, or convergent). Once through the isolator 40, the propagating optical power (typically, but not necessarily, divergent at this point) is collected and coupled into single-mode fiber 70 by lens 72. Optical transmission between fiber 20 and fiber 70 through isolator 40 is kept above operationally acceptable levels (i.e., the lenses provide adequate spatial mode matching between the two fibers) only within tight longitudinal, transverse, and angular alignment tolerances for both fiber ends and lenses (typically a few µm or less). Achieving alignment within these tolerances typically requires expensive and time-consuming active alignment procedures, driving up costs for assembled devices ("active alignment" denoting a procedure in which optical power transmission through the fibers/lenses is monitored for guiding the alignment procedure; in contrast, a "passive alignment" procedure does not require optical power transmission during the alignment procedure). Furthermore, while the solutions shown in FIGS. 1 and 2 may be adequate for some in-line fiber-optic applications, there is also a need for solutions compatible with semiconductor-based active optical devices, such as lasers and modulators, and/or compatible with planar waveguide optical transmission components. Optical mode sizes in these cases may be smaller (sometimes less than 1-2 µm across) and divergences correspondingly larger, imposing even tighter alignment tolerances for achieving an operationally acceptable level of optical power transfer.

Various exemplary embodiments of single- and dual-lens optical assemblies and methods for constructing the same are disclosed herein which may overcome one or more of the drawbacks of the previous art (as described hereinabove).

SUMMARY

An optical apparatus comprises segments of a GRIN optical medium mounted on a substrate in at least one groove thereon. The GRIN segments are longitudinally spaced apart from one another on the substrate, and are arranged so that a free-space optical beam received through the distal end face of the first GRIN segment is transmitted through the proximal end face of the first GRIN segment, propagates to the proximal end face of the second GRIN segment, is received through the proximal end face of the second GRIN segment, and is transmitted as a free-space optical beam through the distal end face of the second GRIN segment. The GRIN segments can be derived from a single GRIN optical medium mounted on the substrate.

Objects and advantages pertaining to free-space optical propagation between waveguide(s) and/or fiber(s) may become apparent upon referring to the disclosed exemplary embodiments as illustrated in the drawings and set forth in the following written description and/or claims.

BRIEF DESCRIPTION OF THE DRAWINGS

FIG. 1 illustrates a prior arrangement for free-space propagation of optical power through an optical component between optical fibers.

FIG. 2 illustrates a prior arrangement for free-space propagation of optical power through an optical component between optical fibers.

FIG. 5C is a side view of an exemplary optical assembly, optical component, and optical fibers.

FIG. 6C is a side view of an exemplary optical assembly, optical component, and planar waveguide.

FIGS. 20A and 20B are top and side views, respectively, of an exemplary assembly of an optical component, optical fiber, and planar waveguide.

FIGS. 21A and 21B are top views of exemplary assemblies of a planar waveguide and optical fiber, with and without an optical component, respectively.

FIGS. 22A and 22B are top and side views, respectively, of an exemplary assembly of an optical component, planar waveguide, and optical fiber.

FIGS. 23A and 23B are top and side views, respectively, of an exemplary assembly of an optical component, planar waveguide, and optical fibers.

FIGS. 24A and 24B are top and side views, respectively, of an exemplary assembly of an optical component, planar waveguide, optical fiber, and lenses.

FIGS. 25A and 25B are top and side views, respectively, of an exemplary assembly of an optical component, planar waveguide, optical fiber, and lens.

FIGS. 26A and 26B are top and side views, respectively, of an exemplary assembly of an optical component, planar waveguide, optical fiber, and lens.

FIGS. 30A and 30B are top and side views, respectively, of an exemplary assembly of an optical component, planar waveguide, optical fiber, and lenses.

FIGS. 31A and 31B are top and side views, respectively, of an exemplary assembly of an optical component, planar waveguide, optical fiber, and lens.

FIGS. 32A and 32B are top and side views, respectively, of an exemplary assembly of an optical component, planar waveguide, optical fiber, and lens.

It should be noted that the relative proportions of various structures shown in the Figures may be distorted to more clearly illustrate the present invention. Relative dimensions of various optical devices, optical waveguides, optical fibers, optical components, optical modes, alignment/support members, grooves, and so forth may be distorted, both relative to each other as well as in their relative transverse and/or longitudinal proportions. In many of the Figures the transverse or longitudinal dimension of one or more elements is exaggerated relative to the other dimension for clarity.

The embodiments shown in the Figures are exemplary, and should not be construed as limiting the scope of the present disclosure and/or appended claims.

DETAILED DESCRIPTION OF EMBODIMENTS

Figure 3A:
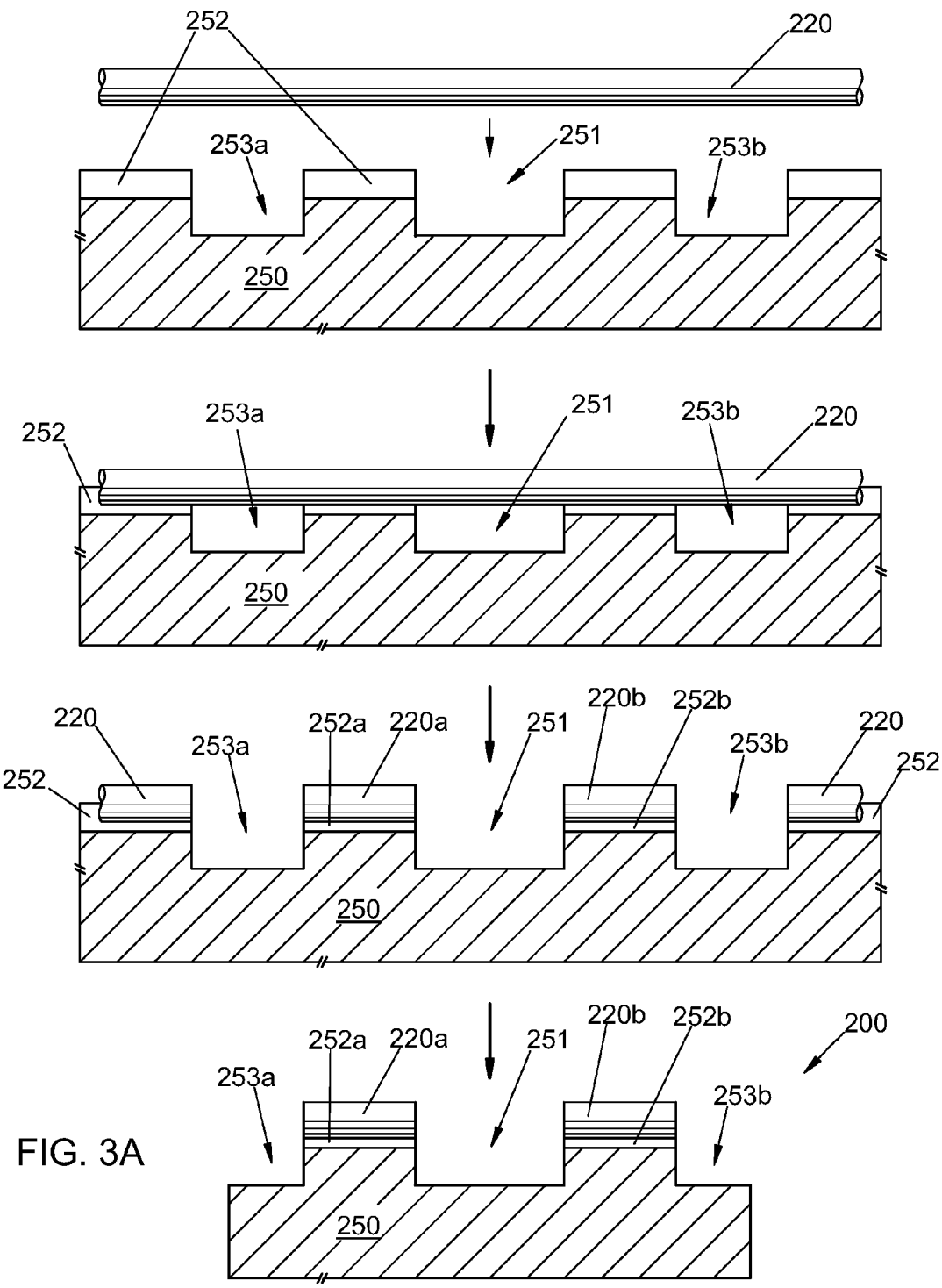
FIGS. 3A and 3B are side and top views, respectively, of an exemplary fabrication/assembly sequence for a dual-lens optical assembly.
Figure 3B:
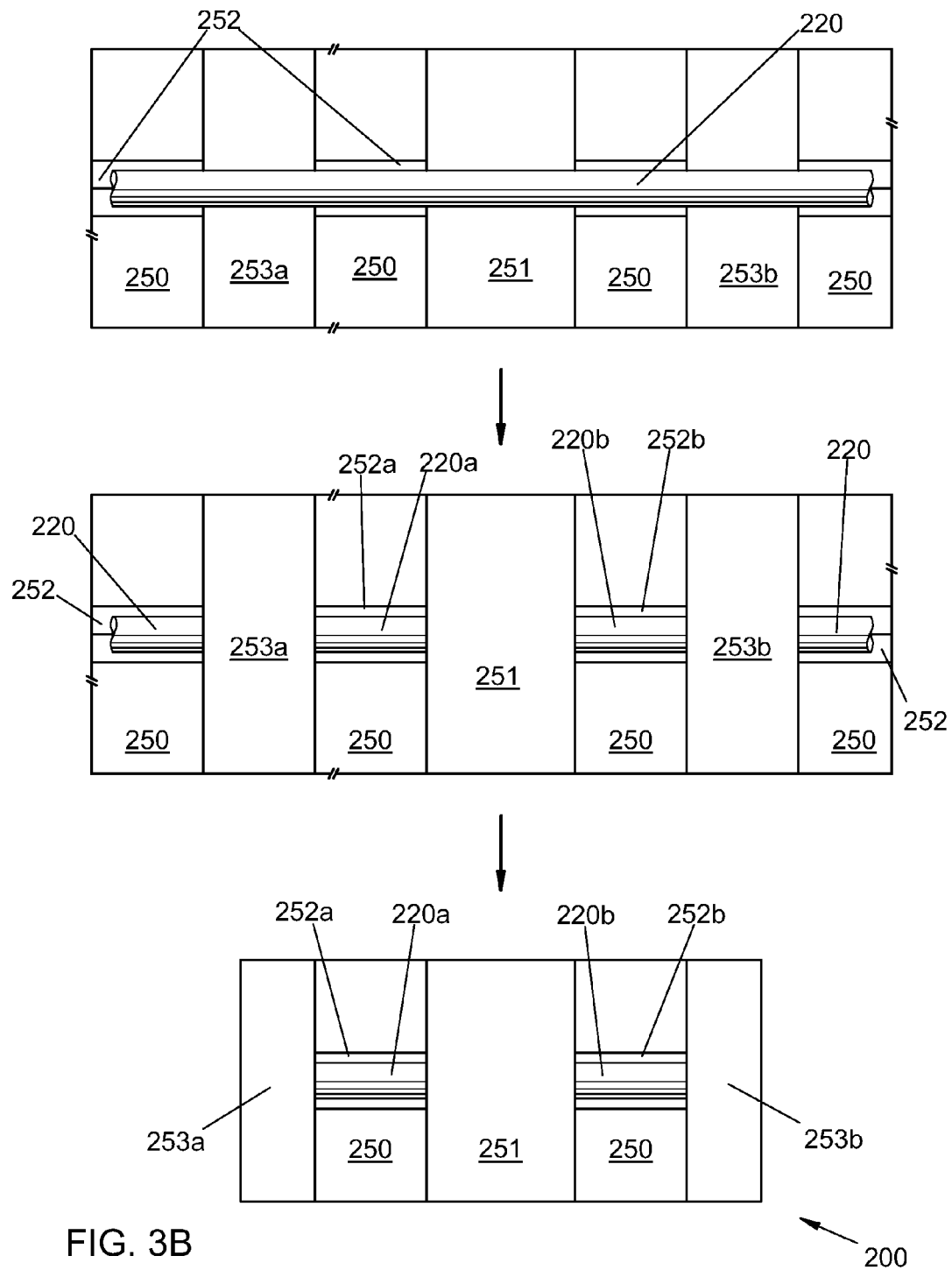
Figure 3C:
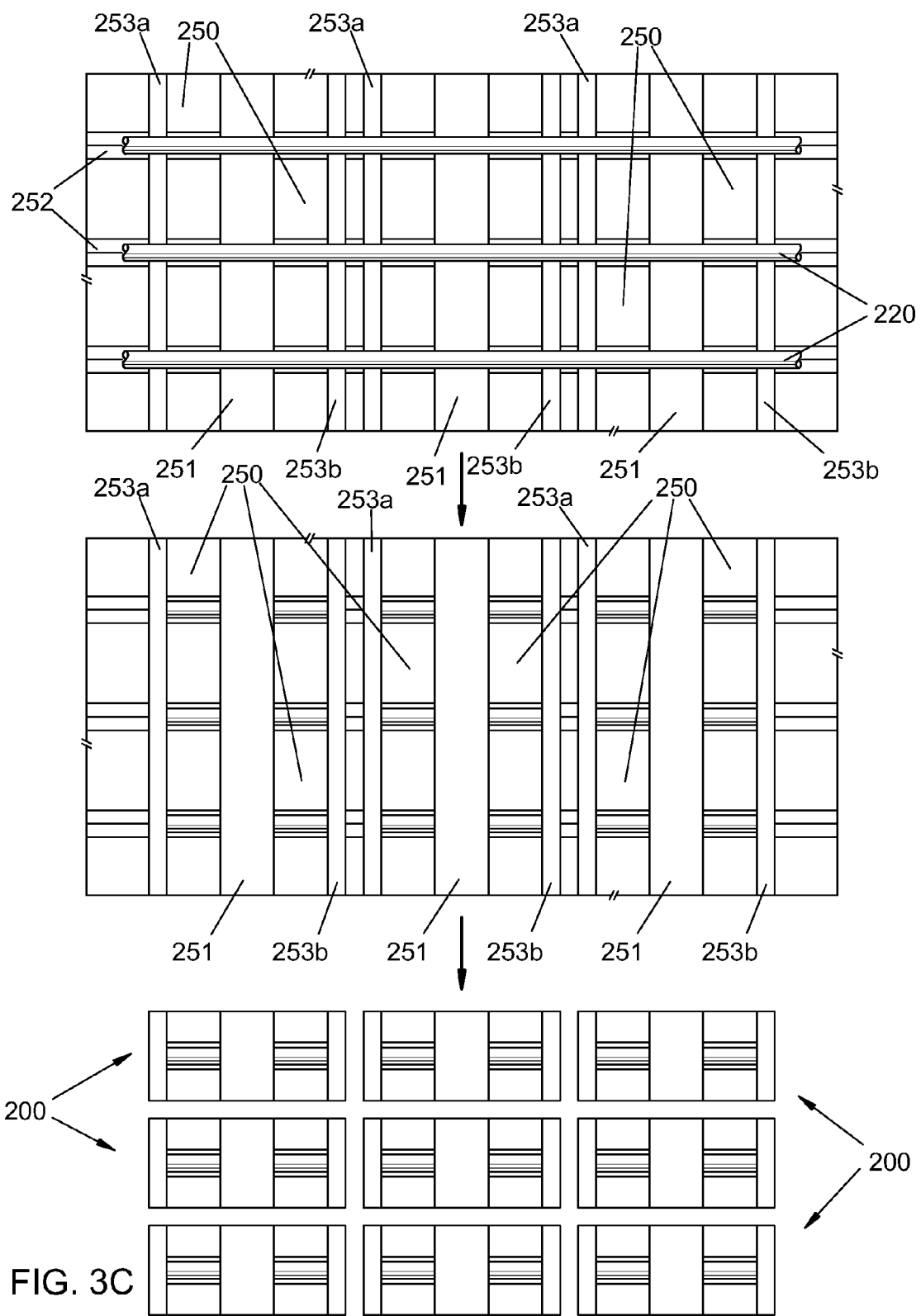
FIG. 3C is a top view of the same exemplary sequence implemented on a wafer scale.
Figure 3D:
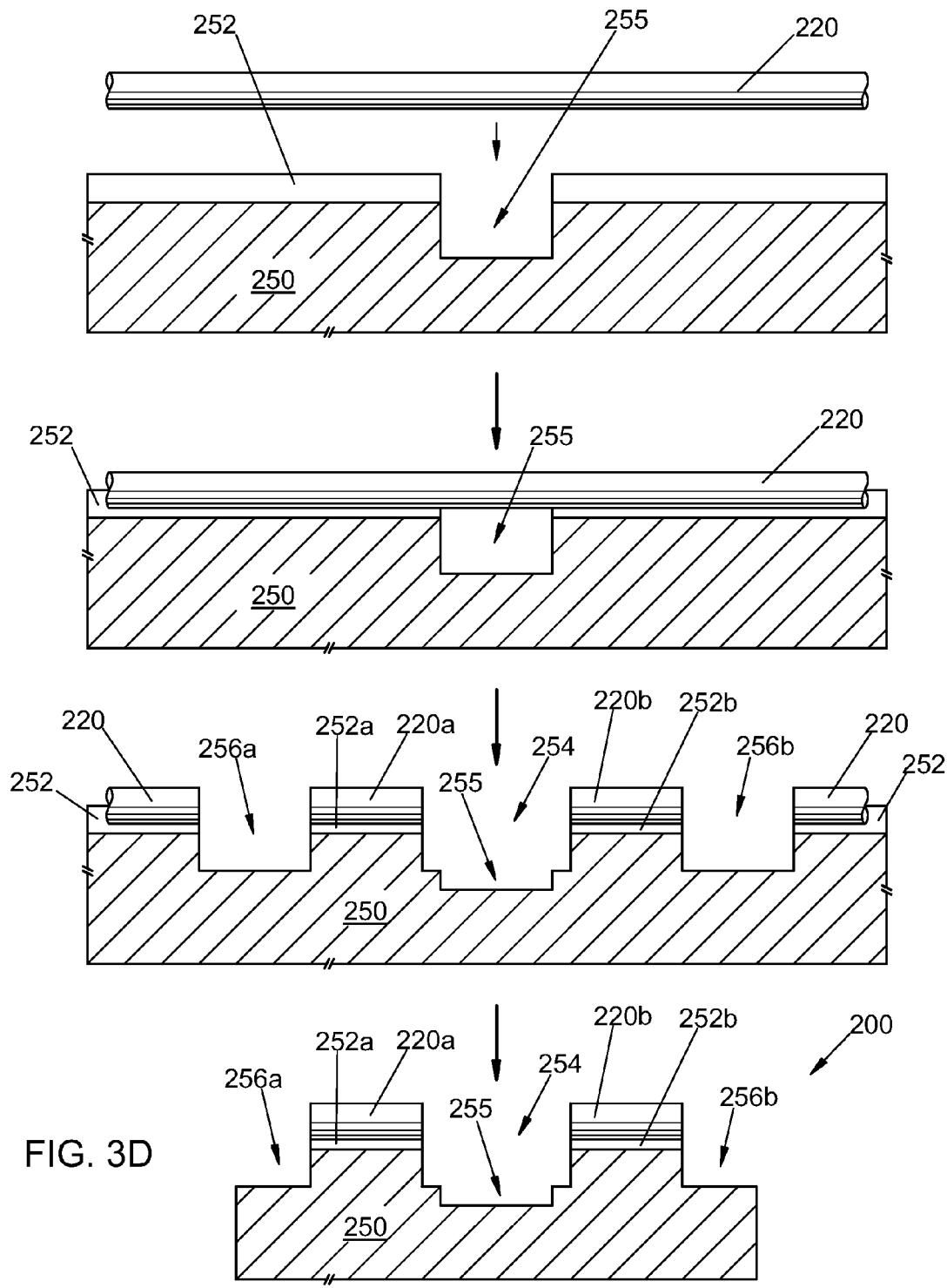
FIGS. 3D and 3E are side and top views, respectively, of an exemplary fabrication/assembly sequence for a dual-lens optical assembly.
Figure 3E:
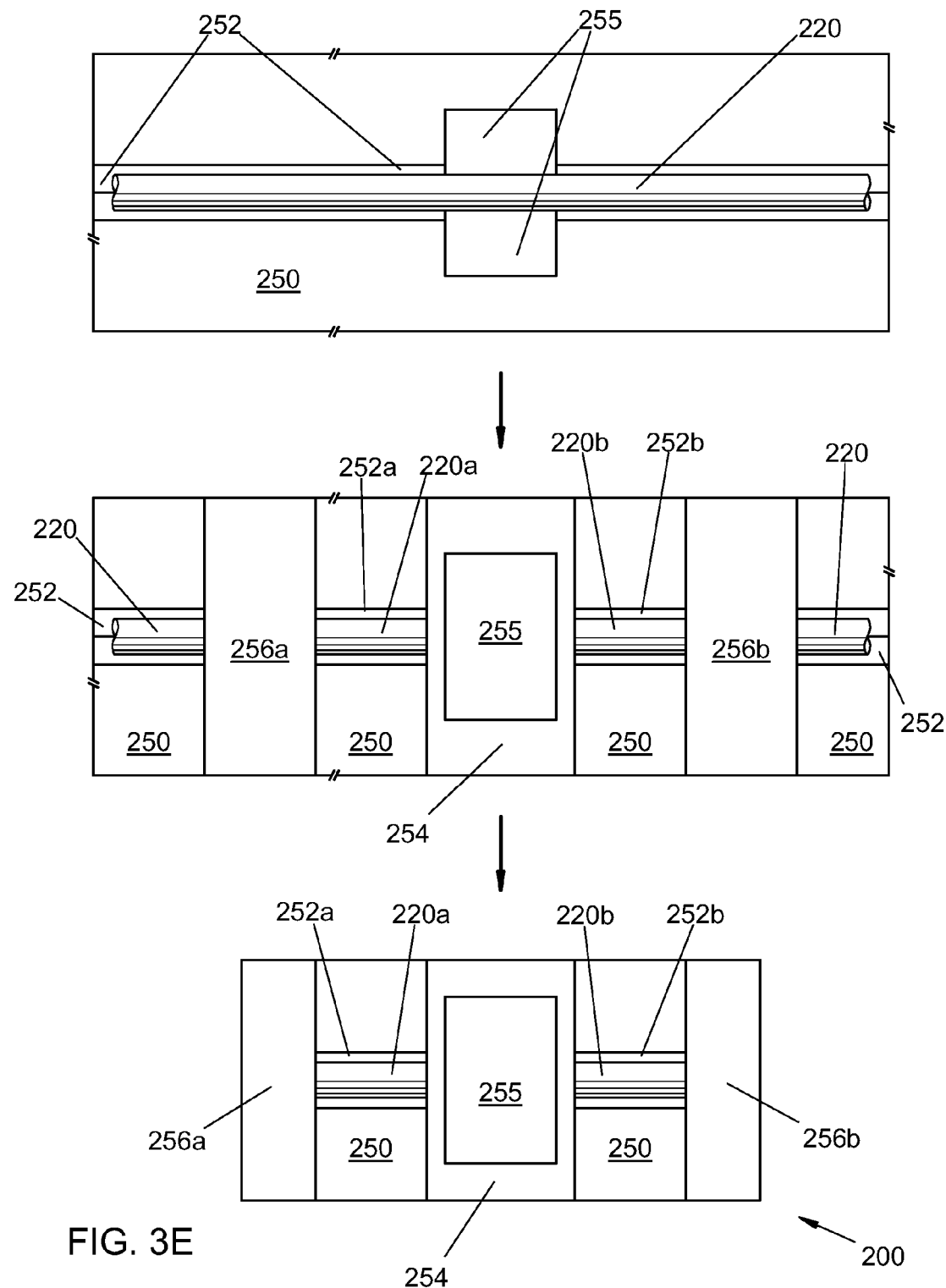
Figure 3F:
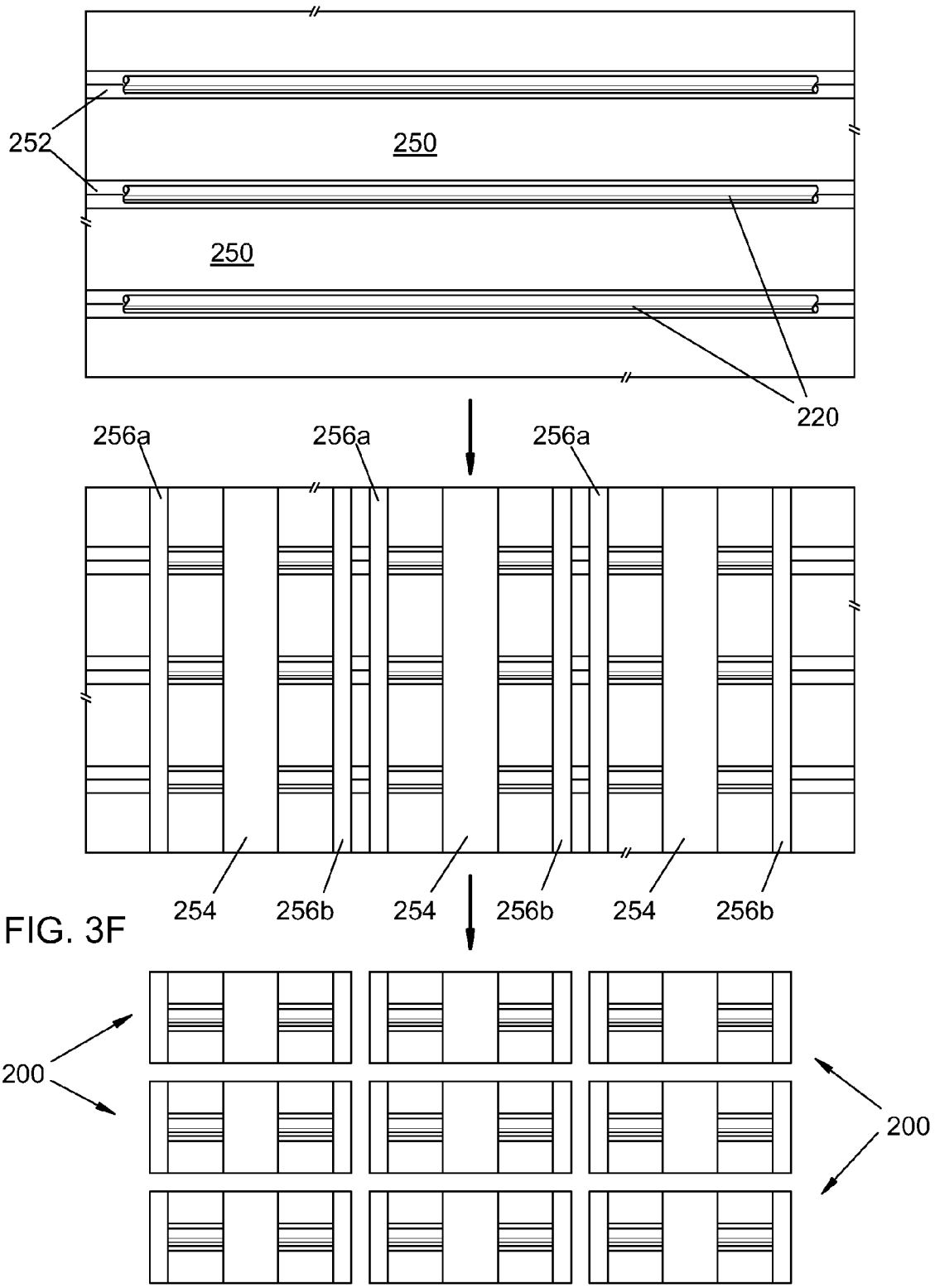
FIG. 3F is a top view of the same exemplary sequence implemented on a wafer scale.

Exemplary fabrication/assembly sequences are illustrated in FIGS. 3A-3F, each for producing an exemplary dual-lens optical assembly 200. In each sequence, a substrate 250 is provided with an elongated groove 252, typically a V-groove, using spatially selective material processing. For simultaneous fabrication of multiple assemblies on a wafer scale, multiple substantially parallel grooves 252 may be provided on substrate 250 (FIGS. 3C and 3F). In a first exemplary sequence (FIGS. 3A-3C), recessed areas 251 and 253a/253b are formed on substrate 250 using spatially selective material processing. These recessed areas divide the V-groove(s) 252. Multiple recessed areas 251/253a/253b may be formed dividing multiple V-grooves 252 each into multiple segments as in FIG. 3C, for a fabrication/assembly sequence implemented on a wafer scale. Separate recessed areas may be formed (not shown), or groups of recessed areas may be formed together as slots or grooves running across the substrate 250 substantially perpendicular to V-grooves 252 (as in FIG. 3C). In either case, if needed or desired the recessed areas 251 may be further adapted for later positioning and/or alignment of an optical component (by providing alignment structures in and/or near the recessed area, for example). Similarly, recessed areas 253a/253b may be further adapted, if needed or desired, for later positioning and/or alignment of the dual-lens optical assembly relative to waveguide(s) and/or fiber(s). A length of gradient-index (GRIN) multi-mode optical fiber 220 is positioned within each V-groove 252 and secured to substrate 250. The GRIN optical fiber 220 thus positioned and secured spans the recessed area(s) 251/253a/253b. The GRIN fiber 220 is cleaved to remove portions spanning recessed areas 251/253a/253b, thereby forming GRIN fiber segments 220a and 220b. The position of each fiber cleave may substantially coincide with a corresponding edge of a recessed area 251/253a/253b, may leave a slight overhang of the fiber segment over the edge of the recessed area (on the order of a few μm, corresponding roughly to the position accuracy/tolerance of the cleaving process), or may leave a substantial length of GRIN fiber segment overhanging the edge of the recessed area. Each GRIN fiber may be cleaved to form multiple pairs of GRIN fiber segments 220a/220b to in turn form multiple dual-lens assemblies along the length of the groove(s) 252 (FIG. 3C). In some instances a recessed area 253b for one optical assembly may also serve as recessed area 253a for an adjacent assembly along the groove 252; in other cases each assembly is provided with its own pair of recessed areas 253a/253b. The GRIN optical fiber segments 220a and 220b serve as the lenses of the dual-lens optical assembly 200. The separation between segments 220a and 220b and the lengths of the segments 220a and 220b are substantially determined by the position accuracy of the cleaving process.

A second exemplary fabrication/assembly sequence for producing an exemplary dual-lens optical assembly 200 is illustrated in FIGS. 3D-3F. Using spatially selective material processing, a substrate 250 is provided with an elongated groove 252, typically a V-groove. If needed or desired, substrate 250 may be further provided with recessed areas 255 adapted for later positioning and/or alignment of an optical component (including alignment structures in and/or near the recessed area 255, if needed or desired). For simultaneous fabrication of multiple assemblies on a wafer scale, multiple substantially parallel V-grooves 252 may be provided on substrate 250 (FIG. 3F). A length of gradient-index (GRIN) multi-mode optical fiber 220 is positioned within each V-groove 252 and secured to substrate 250. A set of substantially parallel precision saw cuts 254, 256a, and 256b are made substantially perpendicular to V-grooves 252. Multiple sets of saw cuts 254/256a/256b may be made to form multiple dual-lens assemblies along the length of the V-groove(s) 252 (FIG. 3F; recessed areas 255 omitted for clarity). In some instances a saw cut 256b for one optical assembly may also serve as saw cut 256a for an adjacent assembly along the groove 252; in other cases each assembly is provided with its own pair of saw cuts 256a/256b. Saw cuts 254 and 256a/256b are typically sufficiently deep so as to completely sever optical fiber 220, and are often at least about as deep as V-groove 252, or deeper if needed or desired. Saw cuts 254 are typically not as deep as recessed areas 255 (if present). Saw cuts 254 are sufficiently wide so as to accommodate within a later-placed optical component (not shown in FIGS. 3A-30). If recessed areas 255 are not present, saw cuts 254 may serve to receive, position, and/or align a later-placed optical component. Saw cuts 254 do not extend through the entire thickness of substrate 250.

The saw cuts 254 and 256a/256b divide the GRIN optical fiber into segments 220a and 220b, which serve as the lenses of the dual-lens optical assembly 200. Any remaining GRIN fiber segments (between saw cut 256b of one optical assembly and saw cut 256a of an adjacent assembly) may be removed or discarded, if needed or desired. The separation between segments 220a and 220b is substantially determined by the width of saw cuts 254, while the lengths of the segments 220a and 220b are substantially determined by the positions of saw cuts 256a/256b and the width of saw cuts 254. It should be noted that saw cuts 254 and/or 256a/256b may be formed by a single pass of a saw with the width of the cut determined by the width of the blade employed. Alternatively, saw cuts 254 and/or 256a/256b may be formed by multiple saw passes, using one or more blades, and the width of the final saw cut determined by the positions of the outer edges of the blades used for the outermost passes (which may be deeper than the rest, to facilitate later positioning of other components within groove 254 against a side edge thereof). Alternatively, saw cuts 254 and/or 256a/256b may be formed by two thinner substantially parallel saw cuts that form the side edges of the main cut, with the substrate material remaining therebetween removed by some other suitable spatially selective material processing technique.

If no further processing is required, the substrate wafer may be divided into individual substrate chips 250 (regardless of which of the foregoing sequences is employed, or if another functionally equivalent sequence is employed). Each individual substrate chip has thereon a dual-lens optical assembly 200 comprising a pair of GRIN fiber segments 220a and 220b (positioned within respective groove segments 252a and 252b) separated by a portion of a saw cut 254 or by a portion of a recessed area 251. If saw cuts are employed, saw cuts 256a/256b may extend through substrate 250 to divide the substrate wafer into strips or bars, which may be subsequently divided into individual substrate chips (if the substrate wafer originally had multiple grooves 252). If saw cuts 256a/256b do not extend through substrate 250, or if saw cuts are not employed, then the substrate wafer must be divided into bars or strips, and the bars then divided into individual substrate chips by any suitable method (once again, assuming multiple grooves 252 with multiple fibers 220). Portions of recessed areas 253a/253b, or portions of saw cuts 256a/256b, may remain on the individual substrate chip 250.

If further processing of the optical assembly 200 is required, such processing may be performed after dividing the substrate wafer into strips (i.e., at the bar level), or after dividing the bars into individual substrate chips (i.e., at the chip level). It may be advantageous, however, to perform further processing on a wafer scale, before any division of the substrate wafer occurs, for multiple dual-lens optical assemblies simultaneously. Such additional processing steps for the dual-lens optical assemblies may include one or more of, but are not limited to: altering the end-face surface profile; improving end-face surface optical quality; applying one or more optical coatings; and so forth.

The exemplary procedures illustrated in FIGS. 3A-3F yield a dual-lens optical assembly 200 (many dual-lens optical assemblies 200 if implemented on a wafer scale) comprising GRIN fiber segments 220a and 220b positioned in respective groove segments 252a and 252b on chip substrate 250. Since GRIN optical fiber segments 220a and 220b come from a common optical fiber 220 positioned in a common groove 252, the lenses formed by fiber segments 220a and 220b are positioned substantially coaxially. Any axial asymmetry (i.e., off-center GRIN profile) of GRIN fiber 220 is self-correlated, since the GRIN fiber segments 220a and 220b are formed from nearly adjacent segments of the same fiber and are positioned within their respective groove segments 252a and 252b before GRIN fiber 220 is separated into segments 220a and 220b. Potential transverse misalignment of the lenses of the dual-lens assembly is thereby reduced or substantially eliminated. The separation of the lenses is determined by the positions of fiber cleaves (FIGS. 3A-3C) or by the width of saw cut 254 (FIGS. 3D-3F), either of which may be predetermined within about 10 micron accuracy. Potential longitudinal misalignment of the lenses (relative to one another) is thereby reduced or substantially eliminated.

The focal properties of the lenses are determined by the gradient-index transverse profile of the GRIN optical fiber 220, and the lengths of the fiber segments 220a and 220b. The index profiles for various commercially available GRIN multimode optical fibers are well characterized. For a given GRIN fiber (with a given GRIN transverse profile), the correct length for the fiber segment may be calculated based on the particular spatial mode matching problem being addressed by the dual-lens optical assembly (using standard optical design techniques), and may typically range anywhere between about 100 µm to several mm in length. The mode sizes and diffractive properties of the waveguide(s) and/or fiber(s) to be coupled, as well as the operating wavelength, the index and other optical characteristics of the optical component, and the index of the surrounding medium, are all used to calculate the focal properties for the GRIN fiber segments 220a and 220b that are required to achieve an operationally acceptable level of optical power transfer (i.e., a sufficient degree of spatial made matching) from one waveguide/fiber, through the dual-lens optical assembly and the optical component, and into the other waveguide/fiber. The length tolerances required for achieving the desired focal properties for the GRIN lens segments is typically on the order of about ten microns, consistent with the precision achievable for positioning fiber cleaves (FIGS. 3A-3C) or saw cuts 254 and 256a/256b (FIG. 3D-3F).

Figure 4A:
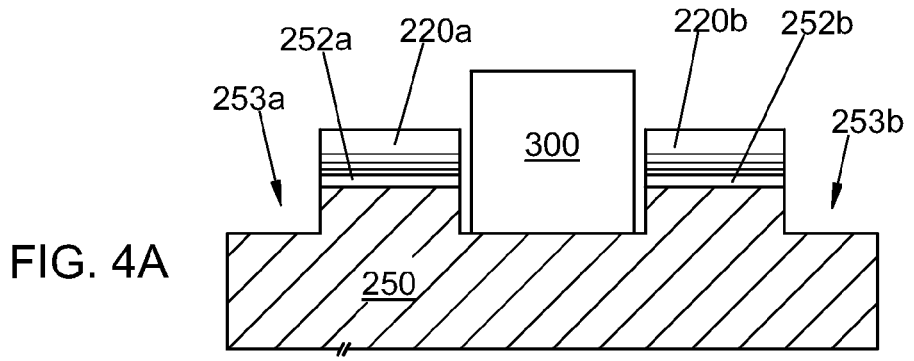
FIGS. 4A and 4B are side and top views, respectively, of an exemplary optical assembly and optical component.
Figure 4B:
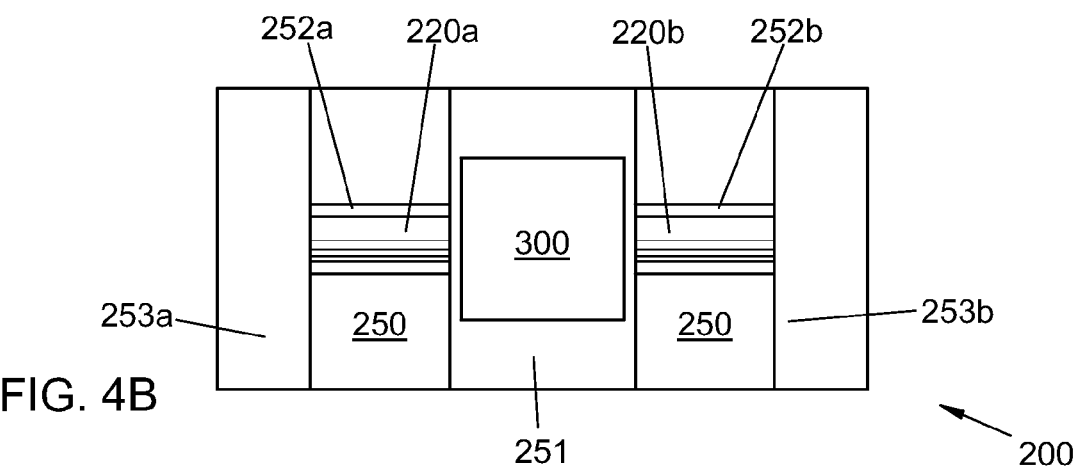
Figure 4C:
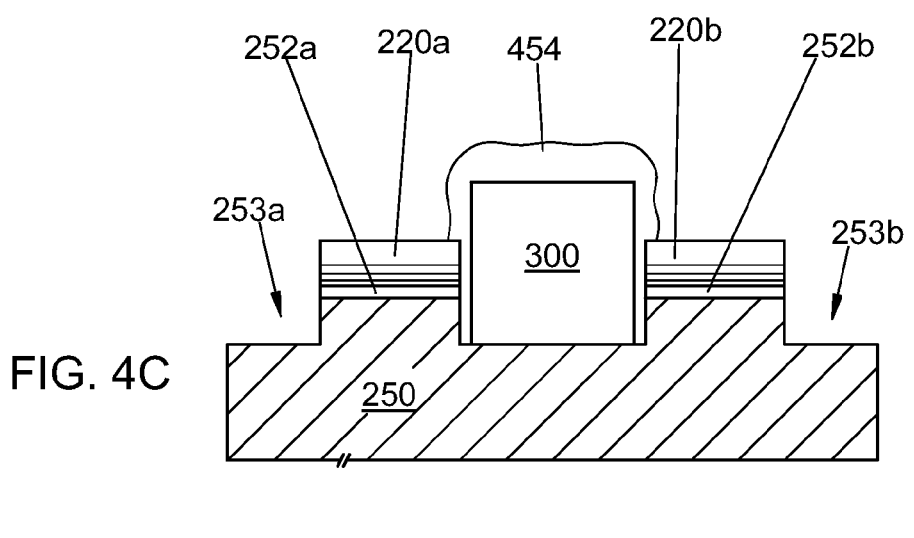
FIG. 4C is a side view of an exemplary optical assembly and optical component.

In FIGS. 4A and 4B, a so-called free-space optical component 300 is positioned between the GRIN fiber segments 220a and 220b in recessed area 251, positioned and/or aligned by any alignment structures provided in or near the recessed area 251 (alignment structures not shown). The following description/discussion may equivalently apply to an optical component 300 placed within a saw cut 254 or a recessed area 255 therein. The first and second end faces of optical component 300 each face the proximal end face of the first and second GRIN fiber segments 220a and 220b, respectively. An exemplary optical component 300 may be an optical isolator, typically including a Faraday rotator crystal configured for non-reciprocal 45° rotation placed between a pair of linear polarizers with their transmission axes offset by 45°. The polarizers may be Polarcor® or other bulk polarizers cemented or otherwise secured to the faces of the Faraday rotator, or may be provided as thin film coatings on the faces of the Faraday rotator. Other free-space optical components may be placed between the lenses instead. The dual-lens optical assembly 200 and/or the optical component 300 may be adapted for positioning and securing the optical component 300 between the lens segments 220a and 220b. Due to the "free-space" nature of the optical component 300, transverse alignment of the optical component relative to the lens segments is typically non-critical. It is typically sufficient to make the transverse dimensions of the optical component sufficiently large so that positioning the component on the bottom of the recessed area 251 (or saw cut 254 or recessed area 255 thereof, as the case may be) and substantially centered (within the tolerance of the positioning apparatus employed) results in substantially unimpeded transmission between the lens segments through the optical component. Optical component(s) 300 may be positioned and secured between GRIN fiber segments 220a and 220b before division of the substrate wafer (wafer scale, realizing significant economies of manufacture), after cutting the substrate wafer into strips (bar level), or after division into individual assembly chips (chip level).

The refractive index of optical component 300 must be substantially well characterized, and serves as an input for designing the focal properties of the lens segments 220a and 220b. The thickness, longitudinal positioning, and angular alignment of optical component 300 are related to one another and to the width of recessed area 251 (or saw cut 254 or recessed area 255 thereof, as the case may be). The overall thickness of optical component 300 determines the minimum separation of lens segments 220a and 220b, and serves as another input for calculating the desired focal properties of the lens segments. Recessed area 251 may be wider than the thickness of optical component 300, and substrate 250, recessed area 251, and/or optical component 300 may be adapted for enabling sufficiently accurate angular alignment and longitudinal positioning (FIGS. 4A-4C; positioning/alignment adaptations not shown). Suitable adaptations may include, but are not limited to: alignment edges and/or other registering surfaces; interlocking surfaces; alignment marks or targets; kinematic alignment structures (such as grooves, recesses, protrusions, and the like); and so on. Alternatively, optical component 300 may be positioned within the recessed area 251 against one side edge thereof, thereby reducing or substantially eliminating angular misalignment and variations of longitudinal position. Alternatively, recessed area 251 may be may only just wide enough (within fabrication tolerances) to accommodate optical component 300 between GRIN fiber segments 220a and 220b, thereby reducing or substantially eliminating angular misalignment and variations in longitudinal position. Once properly positioned, optical component 300 may be secured within recessed area 251 between GRIN lens segments 220a and 220b by any suitable means, including but not limited to: adhesives; embedding media (including encapsulants, polymers, and so forth); one or more clamps, retainers, covers or lids, or other structural components; solder; electrostatic interactions; heat/pressure bonding; and so forth.

It may be advantageous to provide one or both surfaces of the optical component 300 with anti-reflection coatings and/or other optical coatings, similar to coating mentioned hereinabove that might be provided on the transmissive surfaces (i.e., end faces) of the GRIN lens segments 220a and 220b. Alternatively, the optical path between the GRIN lens segments and adjacent surfaces of the optical component 300 may be substantially filled with an index-matching embedding medium (such as a polymer, for example). Such a medium may typically be chosen to have an index near or between the indices of the GRIN lens segment and the optical component, but may be chosen with any refractive index that serves to reduce unwanted reflections at the surfaces relative to vacuum or ambient air. The index-matching medium may be selectively applied to embed the relevant optical surfaces (i.e., end faces), or instead may be employed as an encapsulant 454 for the entire optical component 300 and the adjacent portions of GRIN lenses 220a and 220b (as in FIG. 4C; encapsulant may also serve as a hermetic sealant). When used as an encapsulant, the index-matching embedding medium may also fulfill the function of securing the optical component 300 in its proper position within recessed area 251, and may further serve as a mechanical, moisture, chemical, and/or hermetic protective barrier.

However optical component 300 is incorporated into dual-lens optical assembly 200, the result is a substantially internally-aligned optical assembly. Such an optical assembly 200 and optical component 300 may be designed as described hereinabove for a particular pair of optical transmission waveguide(s) and/or fiber(s). Such an assembly may be positioned for receiving incident optical power from a first optical transmission waveguide/fiber in a first optical mode, transmitting that optical power through the optical component, and delivering the transmitted optical power substantially spatial mode matched (within operationally acceptable limits) with an optical mode of a second optical transmission waveguide/fiber. Specific examples are described hereinbelow, but are only examples, and shall not limit the scope of the present disclosure.

Figure 5A:
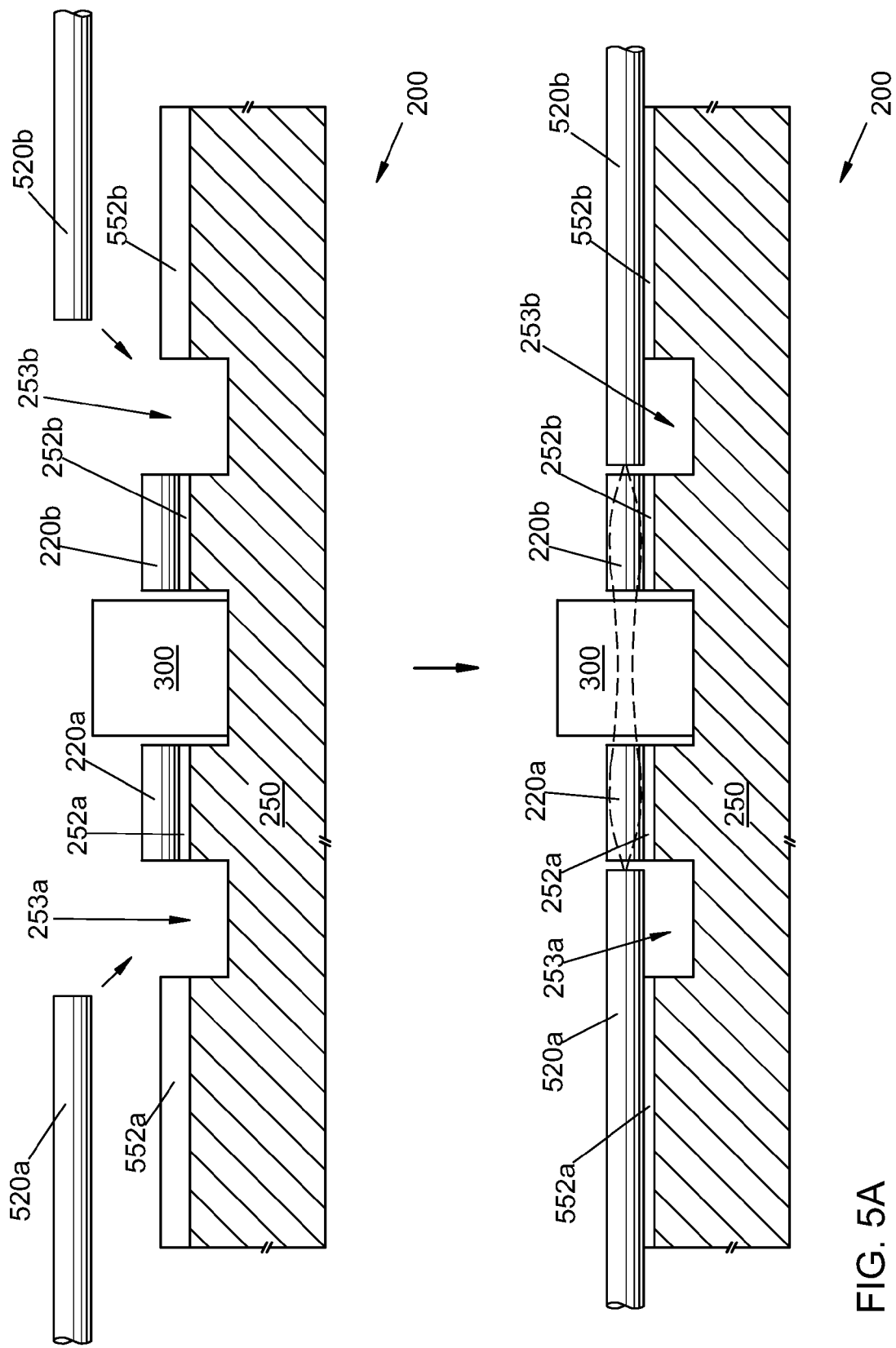
FIGS. 5A and 5B are side and top views, respectively, of an exemplary optical assembly, optical component, and optical fibers.
Figure 5B:
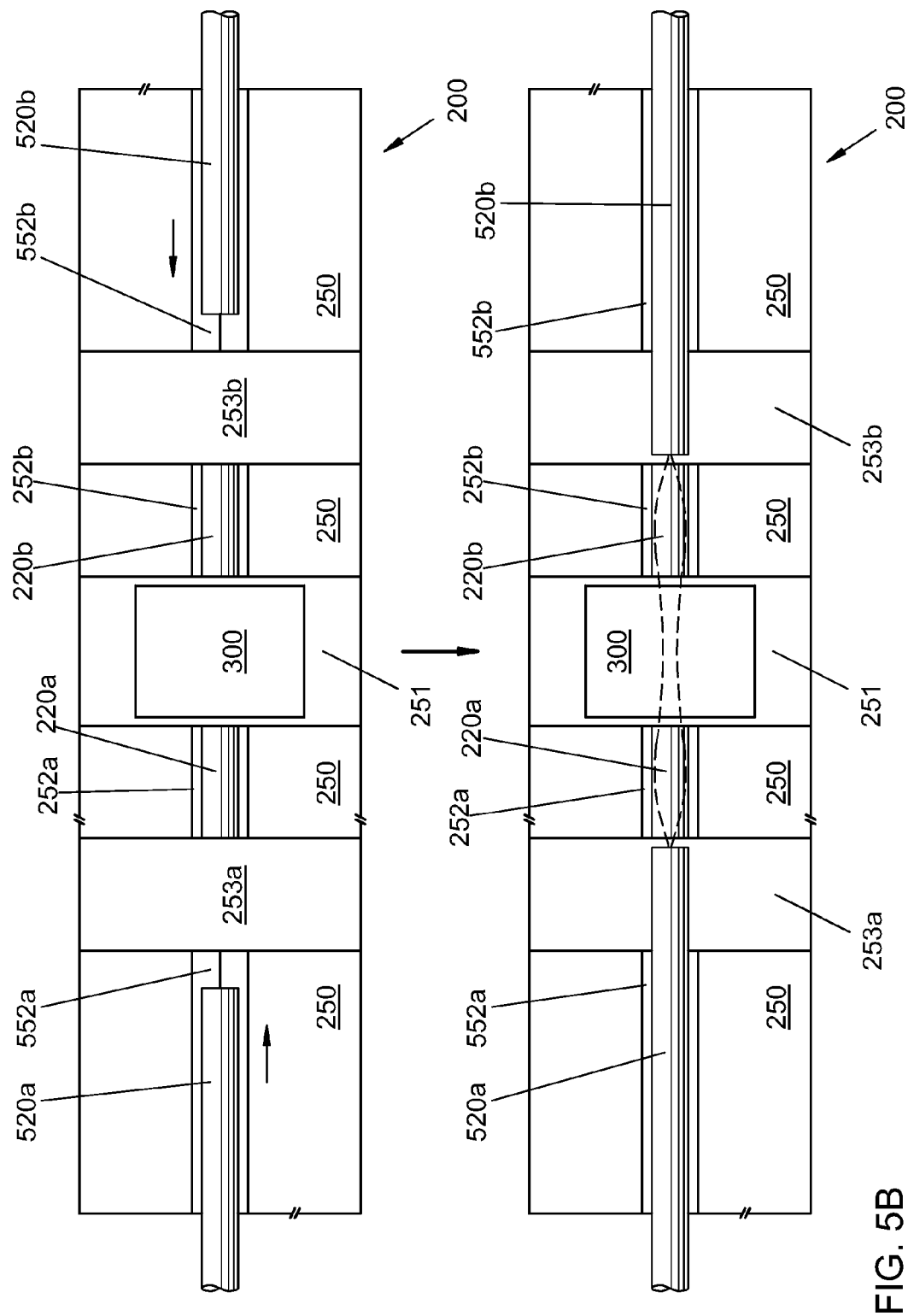

FIGS. 5A-5C illustrate an exemplary dual-lens optical assembly adapted for transferring optical power between single mode optical fibers 520a and 520b. Optical fibers 520a and 520b are typically substantially identical, but this need not be the case. The GRIN fiber segments 220a and 220b are of a length suitable for substantially mode matching (at an operationally acceptable level) an optical mode transmitted through the proximal end face of single mode fiber 520a and an optical mode transmitted through the proximal end face of single mode fiber 520b (given the separation of the GRIN fiber segments 220a and 220b, the thickness and index of the optical component 300, and the thickness and index of any medium between the GRIN fiber segments and the optical component 300). Recessed areas 251/253a/253b are shown in FIGS. 5A-5C; saw cuts 254/256a/256b (and recessed area 255, if present) could be equivalently employed. Excess GRIN fiber segments between adjacent recessed areas 253a/253b are removed, leaving empty segments of groove(s) 252. The division of substrate wafer 250 is carried out so that areas of substrate 250 with empty segments 552a and 552b of groove 252 remain on either side of the pair of GRIN fiber segments 220a and 220b. Optical component(s) 300 may be positioned and secured between GRIN fiber segments 220a and 220b before division of the substrate wafer (wafer scale), after cutting the substrate wafer into strips (bar level), or after division into individual assembly chips (chip level).

Single mode optical fibers 520a and 520b are positioned within empty groove segments 552a and 552b, respectively, and pushed along the respective groove segment to the desired longitudinal position. Single mode fibers 520a and 520b may be secured within groove segments 552a and 552b using: adhesives; embedding media (including encapsulants, polymers, and so forth); one or more clamps, retainers, covers or lids, or other structural components; solder; electrostatic interactions; heat/pressure bonding; and so forth. An index-matching embedding medium (such as a polymer, for example) may be employed between the proximal end faces of single mode fibers 520a and 520b and the distal end faces of respective GRIN fiber segments 220a and 220b to reduce or substantially eliminate unwanted reflections and increase overall optical throughput. Such an index-matching embedding medium may have an index near or between the indices of the GRIN fiber segments and the single mode fibers, although any medium that reduces the reflectivity at the various optical surfaces could be employed. The index-matching embedding medium may be the same as that employed (if any) between proximal end faces of the GRIN fiber segments and the end faces of optical component 300, or may be a different index matching medium. The index-matching embedding medium may be selectively applied to embed the relevant optical surfaces (i.e., end faces), or may be employed as an encapsulant 554 for optical component 300, GRIN lenses 220a and 220b, and the adjacent portions of single mode fibers 520a and 520b (as in FIG. 5C; encapsulant may also serve as a hermetic sealant). An index-matching embedding medium or encapsulant may also serve to secure the single mode fibers within the respective groove segments and/or to secure/index-match component 300 between GRIN segments 220a and 220b (FIG. 5C).

This exemplary fabrication scheme enables sufficiently accurate and substantially reproducible/repeatable transverse alignment between single mode optical fibers 520a and 520b and the respective GRIN fiber segments 220a and 220b. The optical modes are approximately indicated by the dashed lines in FIGS. 5A and 5B. Optical fiber, both single mode and GRIN multimode, are extraordinarily well-characterized commercial products, and the outer diameters of the fibers may be quite accurately known. By employing single mode fibers 520a and 520b and GRIN fiber 220 having substantially equal outer diameters, and placing them in a common substrate V-groove formed by spatially selective material processing, the single mode fiber end and the GRIN fiber segments may be substantially coaxial (both mechanically and optically), and therefore may be transversely positioned sufficiently accurately for enabling an operationally acceptable degree of optical power transfer. For longitudinal positioning of single mode fibers 520a and 520b, alignment stops and/or alignment marks (none shown) may be formed within or near the groove segments 552a and 552b or within an adjacent portion of recessed portions 253a/253b. The proximal ends of single mode fibers 520a and 520b may butt against corresponding alignment stops and/or may be aligned with corresponding alignment marks for sufficiently accurate longitudinal positioning relative to the respective GRIN fiber segment without making contact therewith. Alternatively, the proximal end face of each of single mode fibers 520a and 520b may butt directly against the distal end face of the corresponding GRIN fiber segment for longitudinal positioning.

It may be desirable to implement an embodiment analogous to that shown in FIGS. 5A-5C (i.e., with the optical assembly between two optical fibers), in which the dual-lens optical assembly 200 and the optical fibers 520a and 520b are all mounted on a second substrate with a groove (embodiment not shown). Optical component 300 may be mounted on substrate 250, or on the second substrate. Securing the GRIN optical fiber segments 220a and 220b and the optical fibers 520a and 520b in a common groove results in substantially coaxial alignment, as described above. Such embodiments shall fall within the score of the present disclosure and/or appended claims.

Figure 6A:
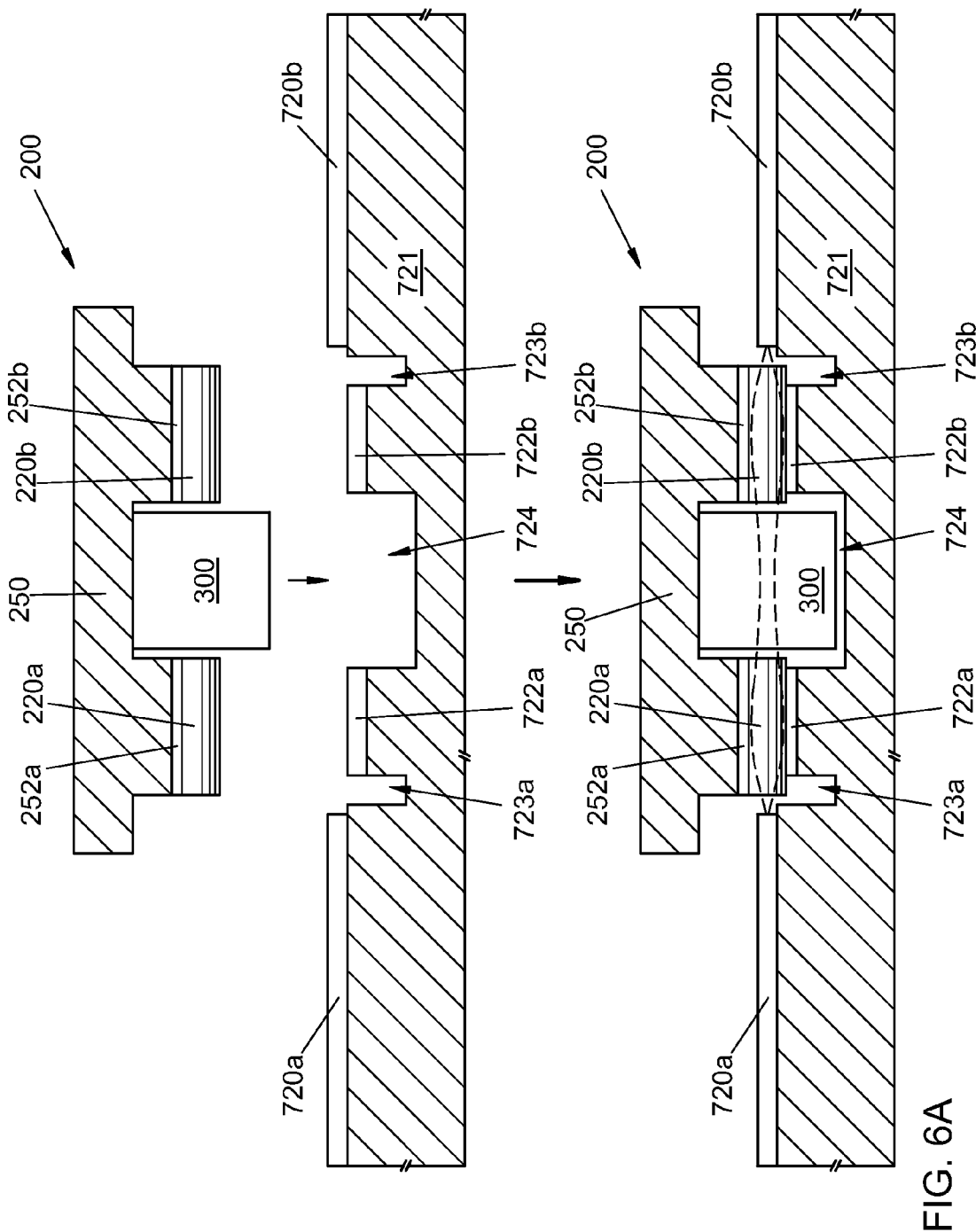
FIGS. 6A and 6B are side and top views, respectively, of an exemplary optical assembly, optical component, and planar waveguides.
Figure 6B:
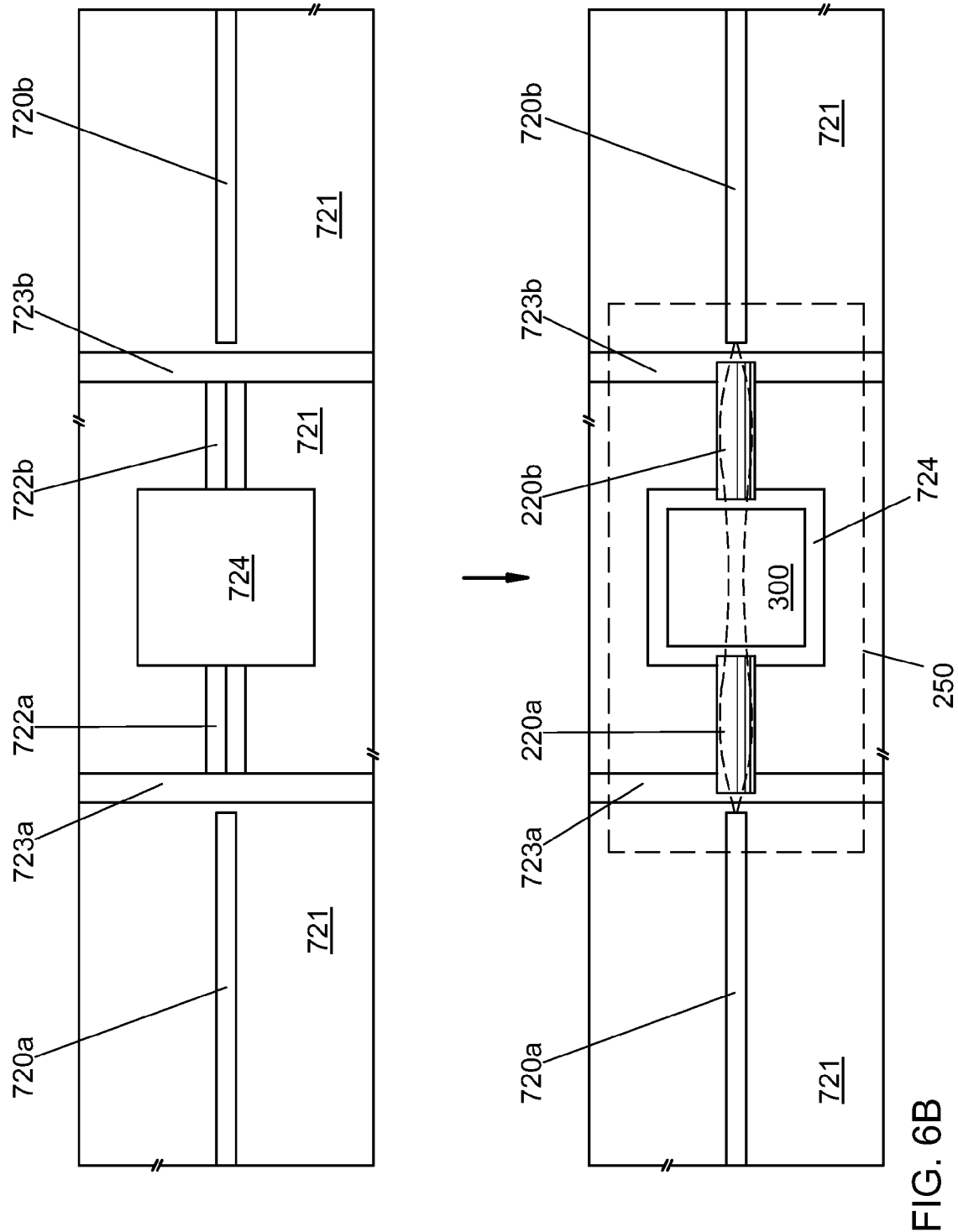

FIGS. 6A-6C illustrate an exemplary dual-lens optical assembly mounted on a planar waveguide substrate 721 between a first planar optical waveguide 720a and a second planar optical waveguide 720b (substantially collinear with and longitudinally spaced-apart from waveguide 720a). Planar optical waveguides 720a and 720b may be of any suitable type and configured in any suitable way, described further hereinbelow. The dual-lens assembly is adapted for transferring optical power between the planar waveguides through optical component 300. The GRIN fiber segments 220a and 220b are of lengths suitable for substantially mode matching (at an operationally acceptable level) an optical mode transmitted through the proximal end face of planar waveguide 720a and an optical mode transmitted through the proximal end face of planar waveguide 720b (given the separation of the ends of planar waveguides 720a and 720b, the separation of the GRIN fiber segments 220a and 220b, the thickness and index of the optical component 300, and the thickness and index of any medium between the GRIN fiber segments and the optical component 300). Prior to, during, and/or after fabrication of planar waveguides 720a and 720b on substrate 721, a V-groove is provided on substrate 721 between the waveguides. Spatially selective material processing of substrate 721 (wafer scale, bar level, or individual chip level) enables substantially coaxial alignment of waveguides 720a and 720b (coaxial with respect to their respective optical modes), and alignment of the V-groove with respect to the waveguides 720a and 720b. This relative alignment of the V-groove and waveguides enables substantially coaxial optical alignment of the planar waveguides 720a and 720b and GRIN fiber segments 220a and 220b positioned in the V-groove. Slots or grooves 723a and 723b may be formed for removing any sloped ends of the V-groove that may be present near the proximal ends of waveguides 720a and 720b, and may be formed by any suitable spatially selective material processing step(s). A recessed portion 724 is formed on substrate 721 between waveguides 720a and 720b by spatially selective material processing, eliminating a central portion of the V-groove and dividing it into V-groove segments 722a and 722b.

Planar waveguide substrate 721 thus provided with planar waveguides 720a and 720b, V-groove segments 722a and 722b, and recessed portion 724 is prepared for receiving thereon a dual-lens optical assembly 200, including an optical component 300. Optical assembly substrate 250 is inverted and placed on planar waveguide substrate 721 (i.e., "flip-chip" mounted) so that GRIN fiber segments 220a and 220b are received in corresponding V-groove segments 722a and 722b, and optical component 300 is received within recessed portion 724. This flip-chip mounting of optical assemblies may be implemented on substrate 721 on a wafer scale, bar level, or individual chip level. The sizes of the GRIN fiber segments 220a and 220b, the V-groove segments 722a and 722b, the optical component 300, and the recessed portion 724 are such that the V-groove segments mechanically engage the GRIN fiber segments before the optical component has made contact with bottom or side surfaces of the recessed portion. Such engagement results in substantially coaxial optical alignment of GRIN fiber segments 220a and 220b with corresponding planar waveguides 720a and 720b (within operationally acceptable tolerances).

The distance between the outer edges of slots 723a and 723b may be wider than the separation between the outer end faces of the GRIN fiber segments, and waveguide substrate 721, optical assembly substrate 250, V-groove segments 722a and/or 722b, recessed portion 724, and/or optical component 300 may be suitably adapted for enabling sufficiently accurate longitudinal positioning of optical assembly 200 and optical component 300 between waveguides 720a and 720b. Suitable adaptations may include, but are not limited to: alignment edges and/or other registering surfaces; interlocking surfaces; alignment marks or targets; kinematic alignment structures (such as grooves, recesses, protrusions, and the like); and so on. Alternatively, the outer end face of one of the GRIN fiber segments may be positioned against the adjacent outer edge of one of slots 723a and 723b, thereby reducing or substantially eliminating variations of longitudinal position of optical assembly 200 and optical component 300 between waveguides 720a and 720b. Alternatively, the distance between the outer edges of slots 723a and 723b may be only just wide enough (within fabrication tolerances) to accommodate the distance between outer end faces of the GRIN fiber segments of optical assembly 200, thereby reducing or substantially eliminating variations of longitudinal position of optical assembly 200 and optical component 300 between waveguides 720a and 720b.

Once properly positioned, optical assembly 200 and optical component 300 may be secured to planar waveguide substrate 721 between planar waveguides 720a and 720b by any suitable means, including but not limited to: adhesives; embedding media (including encapsulants, polymers, and so forth); one or more clamps, retainers, covers or lids, or other structural components; solder; electrostatic interactions; heat/pressure bonding; and so forth. An index-matching embedding medium (such as a polymer, for example) may be employed for substantially filling optical paths between the proximal end faces of planar waveguides 720a and 720b and the distal end faces of respective GRIN fiber segments 220a and 220b to reduce or substantially eliminate unwanted reflections and increase overall optical throughput. Such an index-matching medium may have an index near or between the indices of the GRIN fiber segments and the planar waveguide, although any medium that reduces the reflectivity at the various optical surfaces could be employed. The index-matching embedding medium may be the same as that employed (if any) between proximal end faces of the GRIN fiber segments and the end faces of optical component 300, or may be a different index matching medium. The index-matching embedding medium may also serve to secure the GRIN fiber segments within the respective V-groove segments 722a and 722b. The index-matching embedding medium may be applied selectively at the end faces and/or V-grooves, or may be employed as an encapsulant 754 for optical component 300, GRIN lenses 220a and 220b, and adjacent portions of planar waveguide 720a and 720b (as in FIG. 6C; encapsulant may also serve as a hermetic sealant). An index-matching embedding medium or encapsulant may also function as a mechanical, moisture, chemical, and/or hermetic protective barrier.

Spatially selective material processing employed for forming waveguides 720a and 720b and V-groove segments 722a and 722b enables sufficiently accurate and substantially reproducible/repeatable transverse and longitudinal alignment (i.e., substantially coaxial optical alignment) between planar optical waveguides 720a and 720b and the respective GRIN fiber segments 220a and 220b. The optical modes are approximately indicated by the dashed lines in FIGS. 6A and 6B. GRIN multimode optical fiber is an extraordinarily well-characterized commercial product, and the outer diameter of the fiber may be quite accurately known. Spatially selective material processing of various substrates, particularly semiconductor substrates such as silicon, gallium arsenide, indium phosphide, and others, readily attains sub-micron dimensional tolerances. By placing GRIN fiber segments 220a and 220b in a common substrate groove formed by spatially selective material processing along with the planar waveguides 720a and 720b, the planar waveguides and the GRIN fiber segments can be transversely positioned sufficiently accurately for enabling an operationally acceptable degree of optical power transfer. By aligning the end of one or both of the GRIN fiber segments against a slot edge or employing other alignment feature(s), the GRIN fiber segments can be longitudinally positioned sufficiently accurately for enabling an operationally acceptable degree of optical power transfer.

Figure 7A:
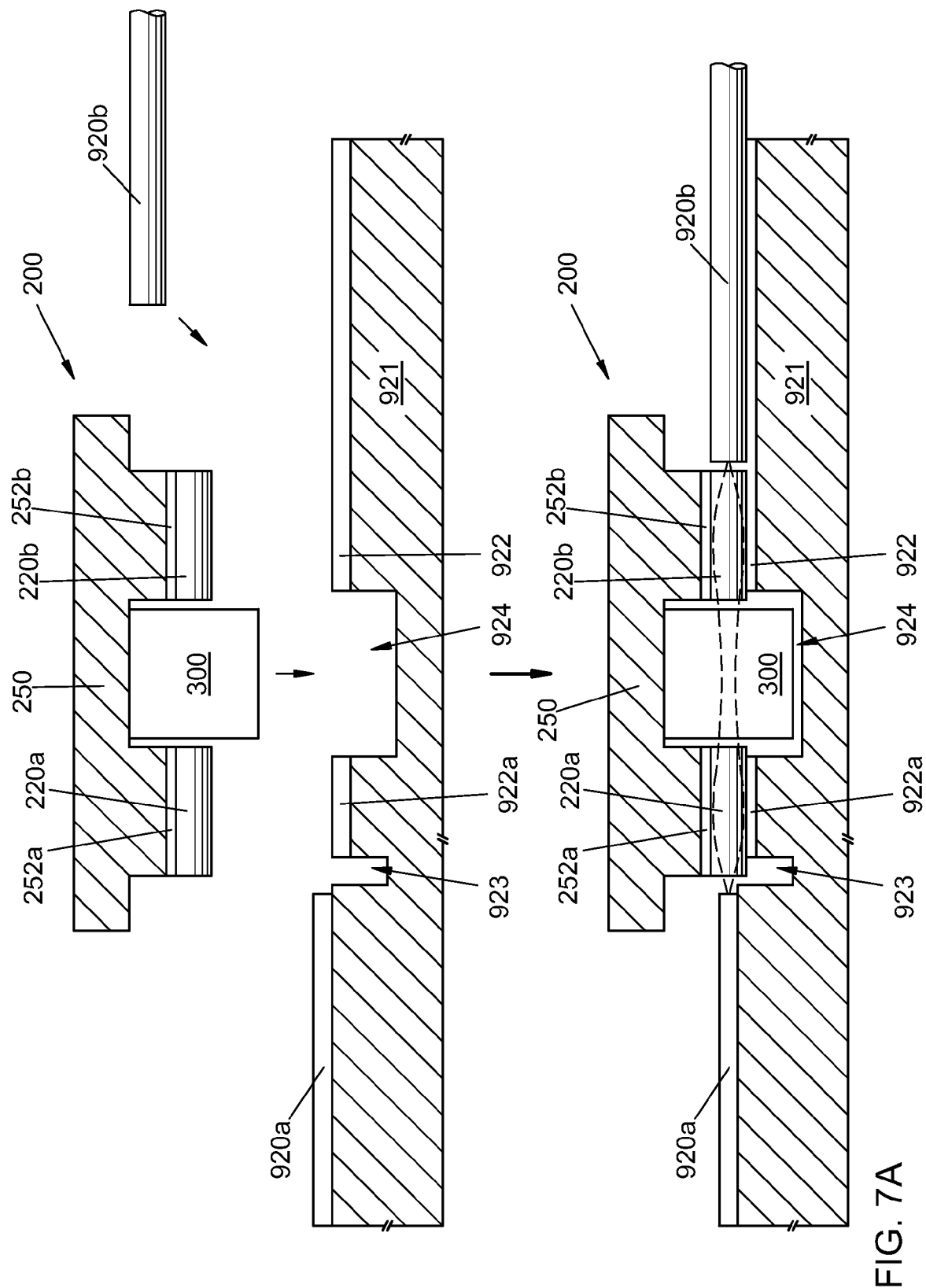
FIGS. 7A and 7B are side and top views, respectively, of an exemplary optical assembly, optical component, optical fiber, and planar waveguide.
Figure 7B:
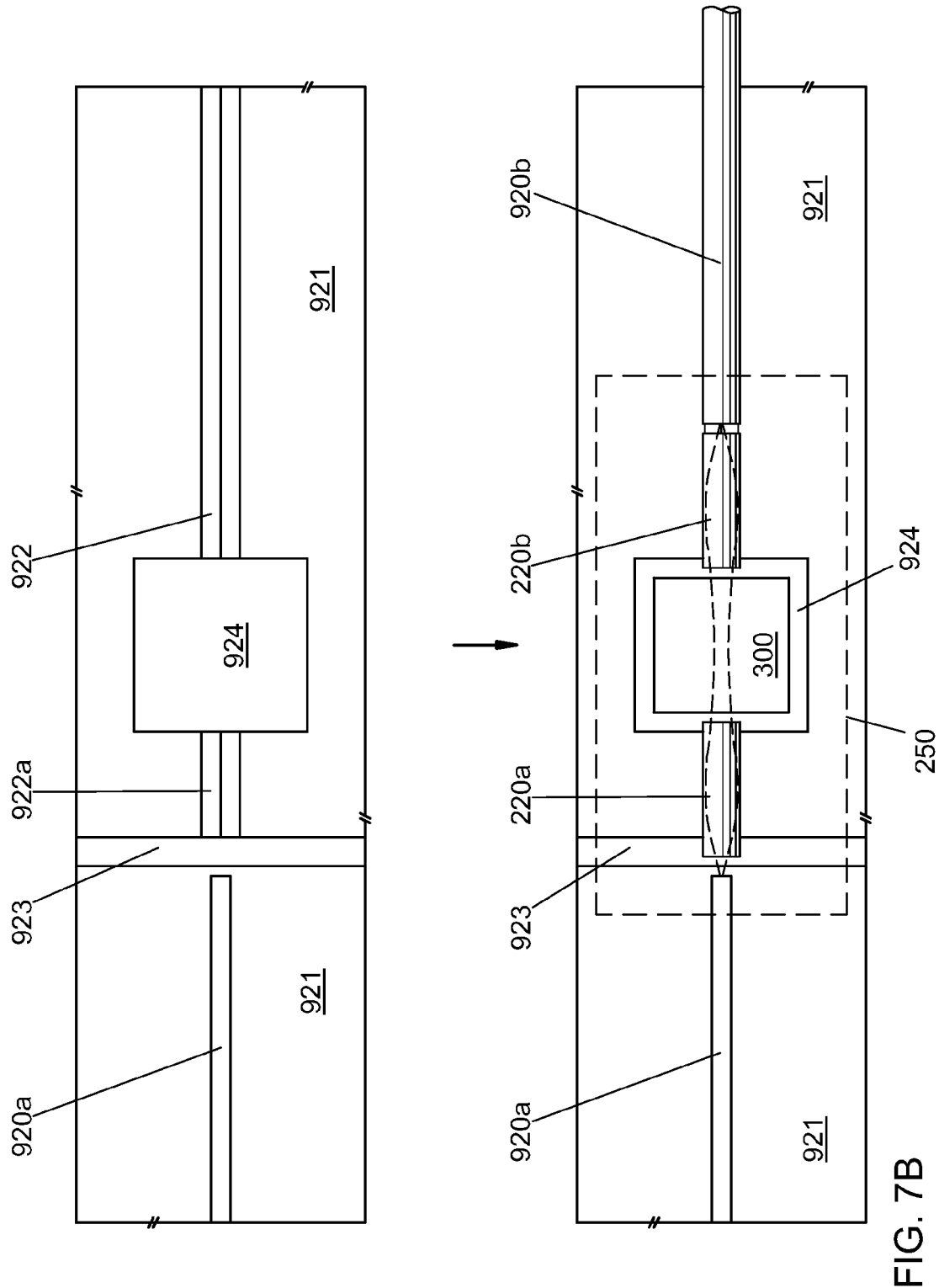
Figure 7C:
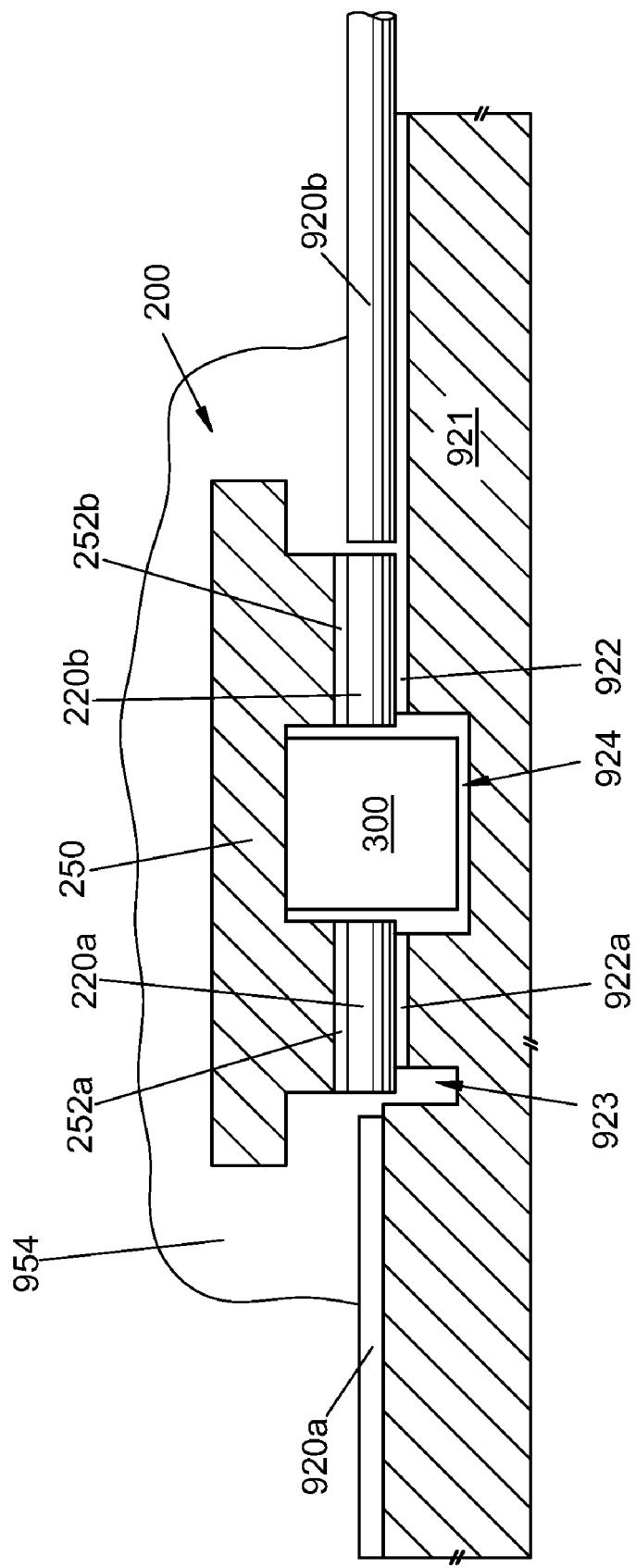
FIG. 7C is a side view of an exemplary optical assembly, optical component, optical fiber, and planar waveguide.

FIGS. 7A-7B illustrate an exemplary dual-lens optical assembly mounted on a planar waveguide substrate 921 between a first planar optical waveguide 920a (formed on substrate 921) and a single-mode optical fiber 920b (positioned in a V-groove 922 on substrate 921 and substantially coaxially optically aligned with waveguide 920a). The dual-lens assembly is adapted for transferring optical power between the planar waveguide and the optical fiber through optical component 300. The GRIN fiber segments 220a and 220b are of lengths suitable for substantially mode matching (at an operationally acceptable level) an optical mode transmitted through the proximal end face of planar waveguide 920a and an optical mode transmitted through the proximal end face of single-mode optical fiber 920b (given the separation of the ends of waveguide 920a and fiber 920b, the separation of the GRIN fiber segments 220a and 220b, the thickness and index of the optical component 300, and the thickness and index of any medium between the GRIN fiber segments and the optical component 300). Prior to, during, and/or after fabrication of planar waveguide 920a on substrate 921, V-groove 922 is provided on substrate 921. Spatially selective material processing of substrate 921 (wafer scale, bar level, or individual chip level) enables alignment of V-groove 922 with respect to waveguide 920a. This relative alignment of the V-groove and waveguide enables substantially coaxial optical alignment of waveguide 920a, the single-mode optical fiber 920b positioned in the V-groove 922, and GRIN segments 220a and 220b positioned in the V-groove. Any sloped end of V-groove 922 near the proximal end of waveguide 920a may be removed by forming slot 923. A recessed portion 924 is formed on substrate 921 near the end of waveguide 920a by spatially selective material processing, eliminating a portion of V-groove 922 and forming V-groove segment 922a.

Planar waveguide substrate 921 thus provided with planar waveguide 920a, V-groove 922 and V-groove segment 922a, and recessed portion 924 is prepared for receiving thereon a dual-lens optical assembly 200, including an optical component 300. Optical assembly substrate 250 is inverted and placed on planar waveguide substrate 921 (i.e., "flip-chip" mounted) so that GRIN fiber segments 220a and 220b are received in corresponding V-groove segment 922a and V-groove 922, and optical component 300 is received within recessed portion 924. This flip-chip mounting of optical assemblies may be implemented substrate 921 on a wafer scale, bar level, or individual chip level. The sizes of the GRIN fiber segments 220a and 220b, the V-groove 922 and V-groove segment 922a, the optical component 300, and the recessed portion 924 are such that the V-groove and V-groove segment mechanically engage the GRIN fiber segments before the optical component has made contact with bottom or side surfaces of the recessed portion. Such engagement results in substantially coaxial optical alignment of GRIN fiber segment 220a with planar waveguide 920a (within operationally acceptable tolerances). Single-mode fiber 920b is positioned in V-groove 922, resulting in substantially coaxial optical (and mechanical) alignment with GRIN fiber segment 220b (within operationally acceptable tolerances).

Waveguide substrate 921, optical assembly substrate 250, V-groove 922, V-groove segment 922a, recessed portion 924, and/or optical component 300 may be suitably adapted for enabling sufficiently accurate longitudinal positioning of optical assembly 200 and optical component 300 relative to the end of waveguide 920a. Suitable adaptations may include, but are not limited to: alignment edges and/or other registering surfaces; interlocking surfaces; alignment marks or targets; kinematic alignment structures (such as grooves, recesses, protrusions, and the like); and so on. Alternatively, optical assembly 200 (and optical component 300) may be pushed along the V-groove 922 and V-groove segment 922a to butt up against the edge of slot 923, thereby reducing or substantially eliminating variations of longitudinal position of optical assembly 200 and optical component 300 relative to the end of waveguide 920a. For longitudinal positioning of single mode fiber 920b, alignment stops and/or alignment marks (none shown) may be formed within or near the groove 922. The proximal end face of single mode fiber 920b may butt against corresponding alignment stops and/or be aligned with corresponding alignment marks for sufficiently accurate longitudinal positioning relative to the respective GRIN fiber segment without making contact therewith. Alternatively, the proximal end face of single mode fiber 920b may butt directly against the distal end face of the corresponding GRIN fiber segment 220b for longitudinal positioning.

Once properly positioned, optical assembly 200 (with optical component 300) and single mode optical fiber 920b may be secured to planar waveguide substrate 921 by any suitable means, including but not limited to: adhesives; embedding media (including encapsulants, polymers, and so forth); one or more clamps, retainers, covers or lids, or other structural components; solder; electrostatic interactions; heat/pressure bonding; and so forth. An index-matching embedding medium (such as a polymer, for example) may be employed between the proximal end face(s) of planar waveguide 920a and/or single mode fiber 920b and the distal end faces of respective GRIN fiber segments 220a and 220b, to reduce or substantially eliminate unwanted reflections and increase overall optical throughput. Such an index-matching medium may have an index near or between the indices of the GRIN fiber segments, the single mode fiber, and/or the planar waveguide, although any medium that reduces the reflectivity at the various optical surfaces could be employed. The index-matching embedding medium may be the same as that employed (if any) between proximal end faces of the GRIN fiber segments and the end faces of optical component 300, or may be a different index matching medium. The index-matching embedding medium may also serve to secure the GRIN fiber segments and/or single-mode fiber within the V-groove and/or V-groove segment. The index-matching embedding medium may be applied selectively at the end faces and/or V-grooves, or may be employed as an encapsulant 954 for optical component 300, GRIN lenses 220a and 220b, and adjacent portions of planar waveguide 920a and single-mode fiber 920b (as in FIG. 7C; encapsulant may also serve as a hermetic sealant). An index-matching embedding medium or encapsulant may also function as a mechanical, moisture, chemical, and/or hermetic protective barrier.

Spatially selective material processing employed for forming waveguide 920a, V-groove 922, and V-groove segment 922a enables sufficiently accurate and substantially reproducible/repeatable transverse and longitudinal alignment between planar optical waveguide 920a, single-mode optical fiber 920b, and the respective GRIN fiber segments 220a and 220b, as already described hereinabove. The optical modes are approximately indicated by the dashed lines in FIGS. 7A and 7B.

Dual-lens optical assemblies described thus far have involved substantially coaxial optical alignment of waveguides, fibers in V-grooves, fiber segments in V-grooves, and so forth. Such configurations may be appropriate in circumstances in which substantially normal incidence on optical component 300 is suitable and/or acceptable. However, in many instances substantially normal incidence on optical component 300 may lead to undesirable back-reflections, potentially degrading the performance of the optical system through unacceptably high levels of optical feedback. This may be reduced by application of anti-reflection coatings and/or index-matching media, and/or by alignment of the optical component 300 somewhat away from normal incidence (typically by less than about 10°, often less than about 5°, perhaps less than about 2°; depends on geometry, mode characteristics, sensitivity of upstream optical components to back-reflections, and so on). However, off-normal incidence also results in lateral displacement of an optical beam propagating through the optical component (up to a few tens of microns for optical components ranging from several hundred microns up to a few millimeters long). Such lateral displacement would result in decreased transmission through a dual-lens optical assembly as described herein if the GRIN fiber segments are substantially collinear. Therefore, additional embodiments of the optical assemblies disclosed herein may be constructed in which the GRIN fiber segments 220a and 220b are laterally displaced, and the corresponding V-groove segments and/or waveguide(s) on a mating fiber/waveguide substrate or waveguide substrate are similarly displaced. The optical assembly substrate 250 (including recessed area 251, saw cut 254, and/or recessed area 255, as the case may be) may be adapted for aligning the optical component 300 at a well-characterized off-normal angle of incidence, enabling precise calculation of the resulting lateral displacement of a transmitted optical beam.

Figure 10:
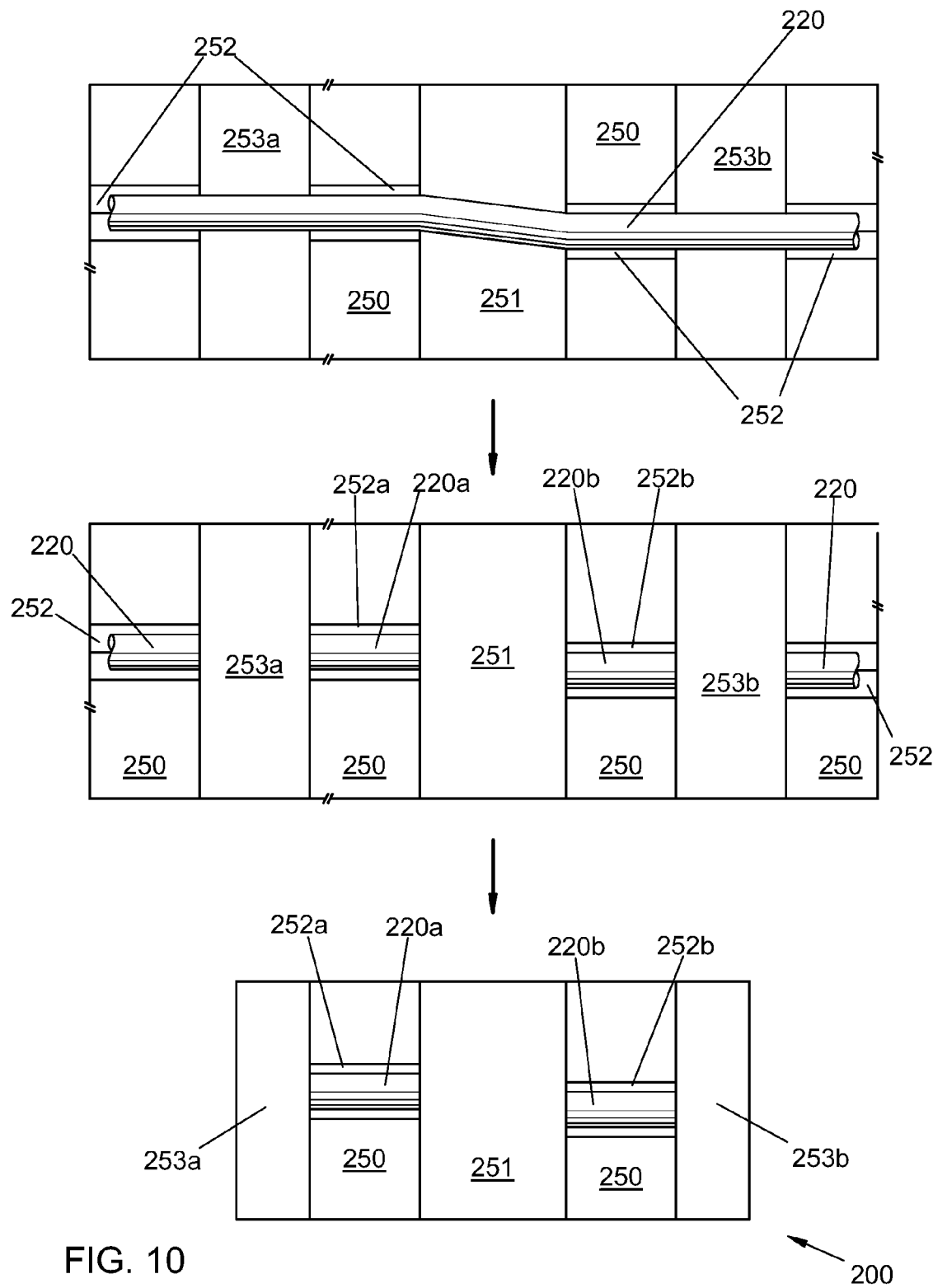
FIG. 10 is a top view of an exemplary fabrication/assembly sequence for a dual-lens optical assembly.

For forming laterally-displaced dual-lens optical assemblies analogous to the exemplary substantially collinear embodiments disclosed hereinabove, V-groove(s) 252 may be formed on substrate 250 to comprise multiple longitudinal segments, laterally displaced from one another by the calculated distance (FIG. 10). The calculated distance may be realized with the accuracy/precision characteristic of the spatially selective material processing employed therefor. Recessed areas (251 or 255, as the case may be) are formed between these laterally displaced segments of the V-groove 252, regardless of whether cleaving or saw cuts are to be employed for dividing the GRIN fiber into segments. A length of GRIN fiber 220 is positioned and secured within the V-groove 252, curving over the recessed areas to accommodate the lateral displacement of the segments of the V-groove 252. Upon dividing the GRIN fiber 220 into segments 220*a* and 220*b* (by cleaving, saw cuts, or other method), the segments are laterally displaced by the same distance as the laterally displaced V-groove segments 252*a* and 252*b*. Optical power collected by one of the GRIN fiber segments and transmitted through an off-normal optical component 300 positioned between the GRIN fiber segments is therefore substantially centered on the other GRIN segment. Instead of spanning recessed area 251 with a single GRIN optical fiber 220 (as shown in the first step of FIG. 10), separate segments of GRIN optical fiber may be positioned and secured with the laterally displaced V-groove segments, and then cleaved or cut to the desired length.

Figure 11:
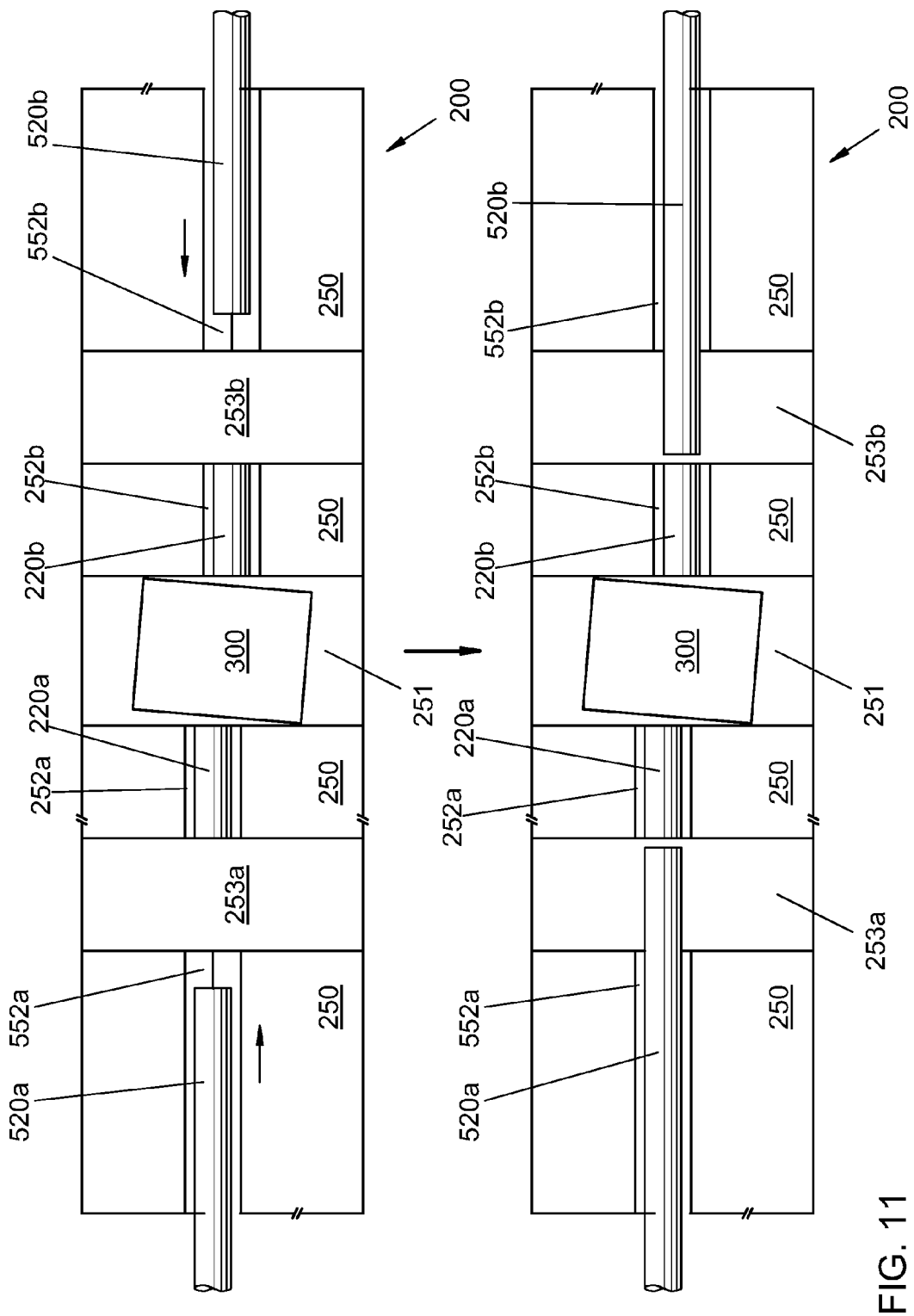
FIG. 11 is a top view of an exemplary optical assembly, optical component, and optical fibers.
Figure 12:
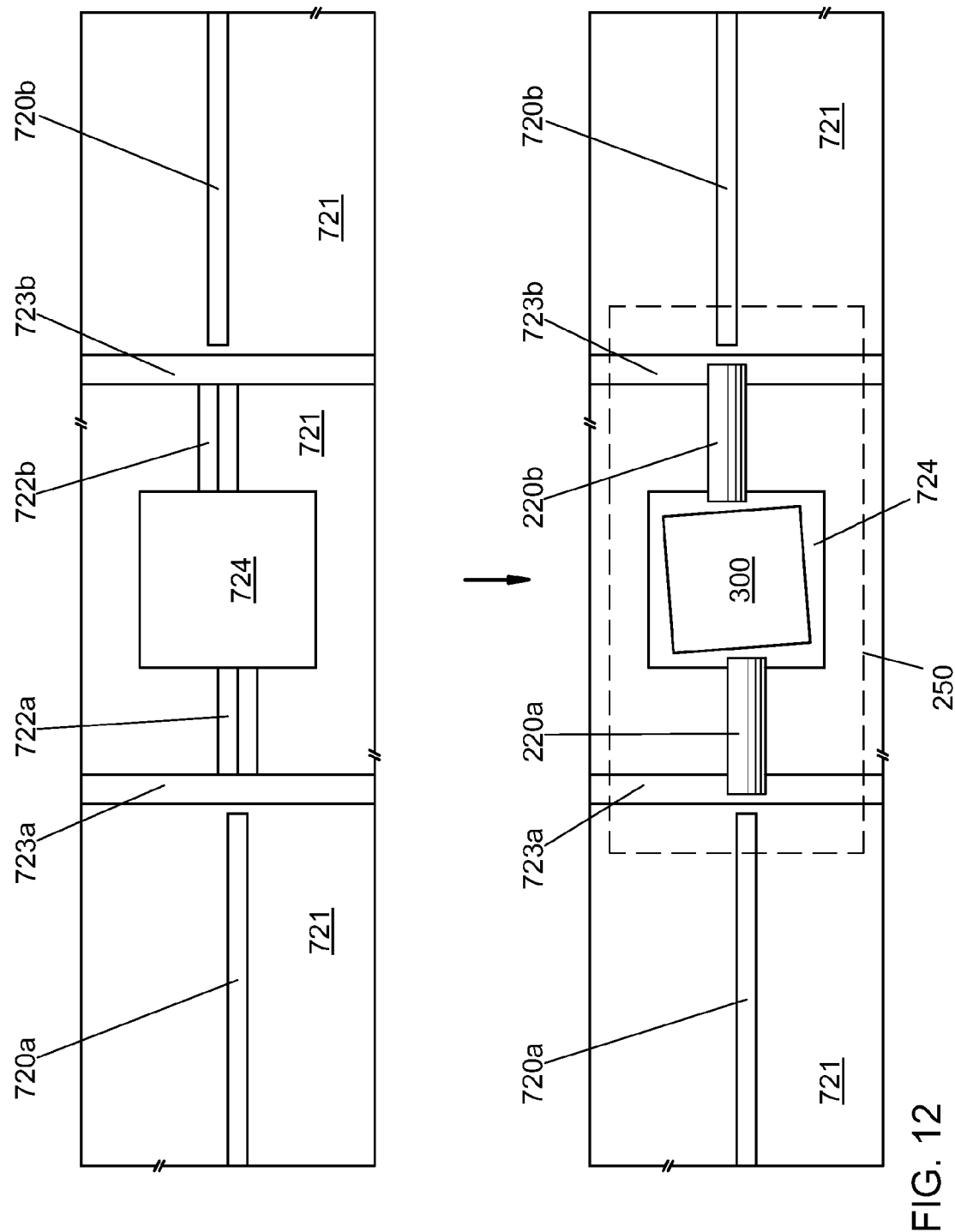
FIG. 12 is a top view of an exemplary optical assembly, optical component, and planar waveguides.
Figure 13:
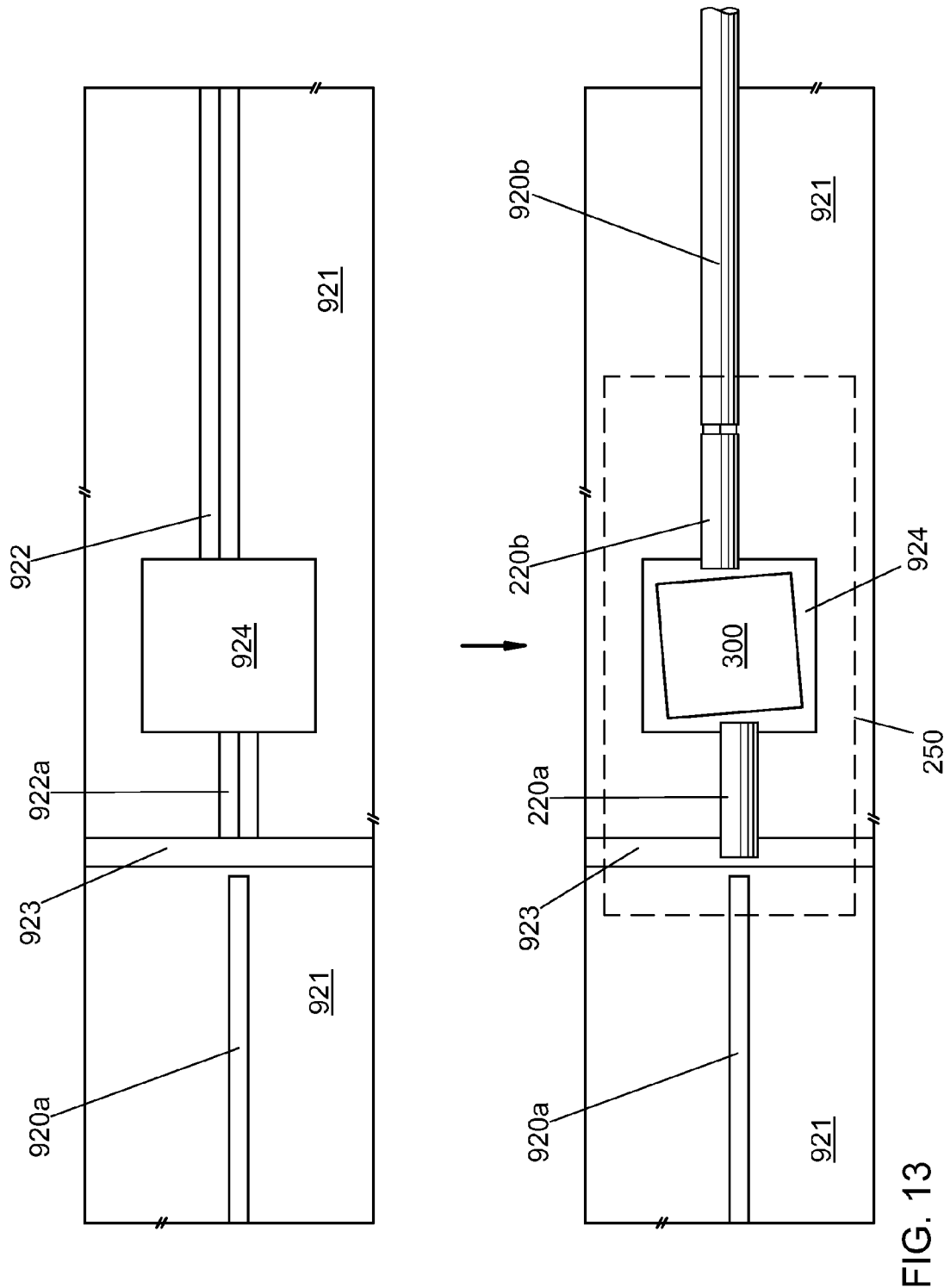
FIG. 13 is a top view of an exemplary optical assembly, optical component, optical fiber, and planar waveguide.

FIG. 11 shows an exemplary dual-lens optical assembly analogous to that depicted in FIGS. 5A-5C adapted for transferring optical power between two optical fibers 520*a* and 520*b*. Dashed lines indicating the optical modes are omitted. The embodiment of FIG. 11 differs from that of FIGS. 5A-5C only in that the V-groove segments 252*a*/252*b* and 552*a*/552*b* are laterally displaced, so as to accommodate an off-normal optical component 300. Spatially selective material processing may be employed for forming the various grooves/segments on substrate 250 in the proper positions. FIGS. 12 and 13 show exemplary optical assemblies analogous to those depicted respectively in FIGS. 6A-6C (adapted for transferring optical power between two planar waveguides) and 7A-7C (adapted from transferring optical power between a planar waveguide and an optical fiber). Dashed lines indicating the optical modes are omitted. The embodiments of FIGS. 12 and 13 differ from their respective collinear analogues only in that the waveguides 720*a*/720*b* and V-groove segments 722*a*/722*b* (FIG. 12) and the waveguide/fiber 920*a*/920*b* and V-groove/segment 922/922*a* (FIG. 13) are laterally displaced, so as to accommodate an optical assembly 100 with substantially similarly displaced GRIN segments 220*a*/220*b* and an off-normal optical component 300. Spatially selective material processing may be employed for forming the various waveguide(s), groove(s), and groove segment(s) on substrate 721 (FIG. 12) or 921 (FIG. 13) in the proper positions.

It should be noted that embodiments may be made that are analogous to the exemplary embodiments of FIGS. 10-13, except that the displacement of the GRIN fiber segments is in the vertical dimension. Such embodiments fall within the scope of the present disclosure. Such vertical displacement may be achieved in a variety of suitable ways, including but not limited to the following examples. Portions of V-groove 252 may be formed at different depths, so that the resulting V-groove segments 252*a*/252*b* and the GRIN fiber segments 220*a*/220*b* therein are at different depths. Corresponding V-groove segments 552*a*/552*b* (if present) would also be formed at different depths. V-groove segments 722*a*/722*b* on a waveguide substrate 721, as well as waveguides 720*a*/720*b*, would be formed at differing heights. V-groove segments 922*a*/922*b*, V-groove 922, and waveguide 920*a* would be formed on a waveguide substrate 921 at differing heights. Optical component 300, substrate 250, and/or substrate 721 or 921, would be adapted for providing off-normal faces tilted in the vertical direction.

Figure 14:
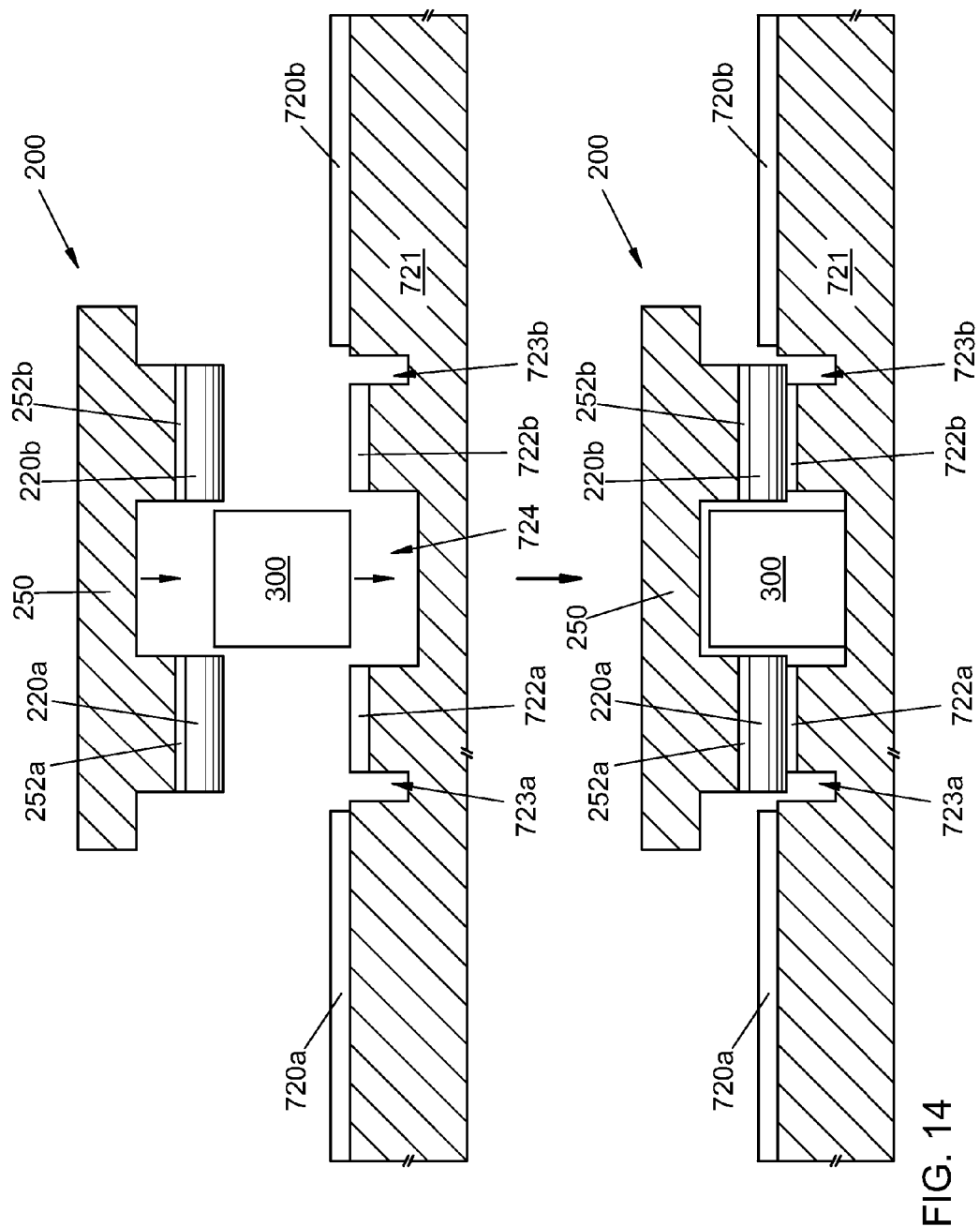
FIG. 14 is a side view of an exemplary optical assembly, optical component, and planar waveguides.
Figure 15:
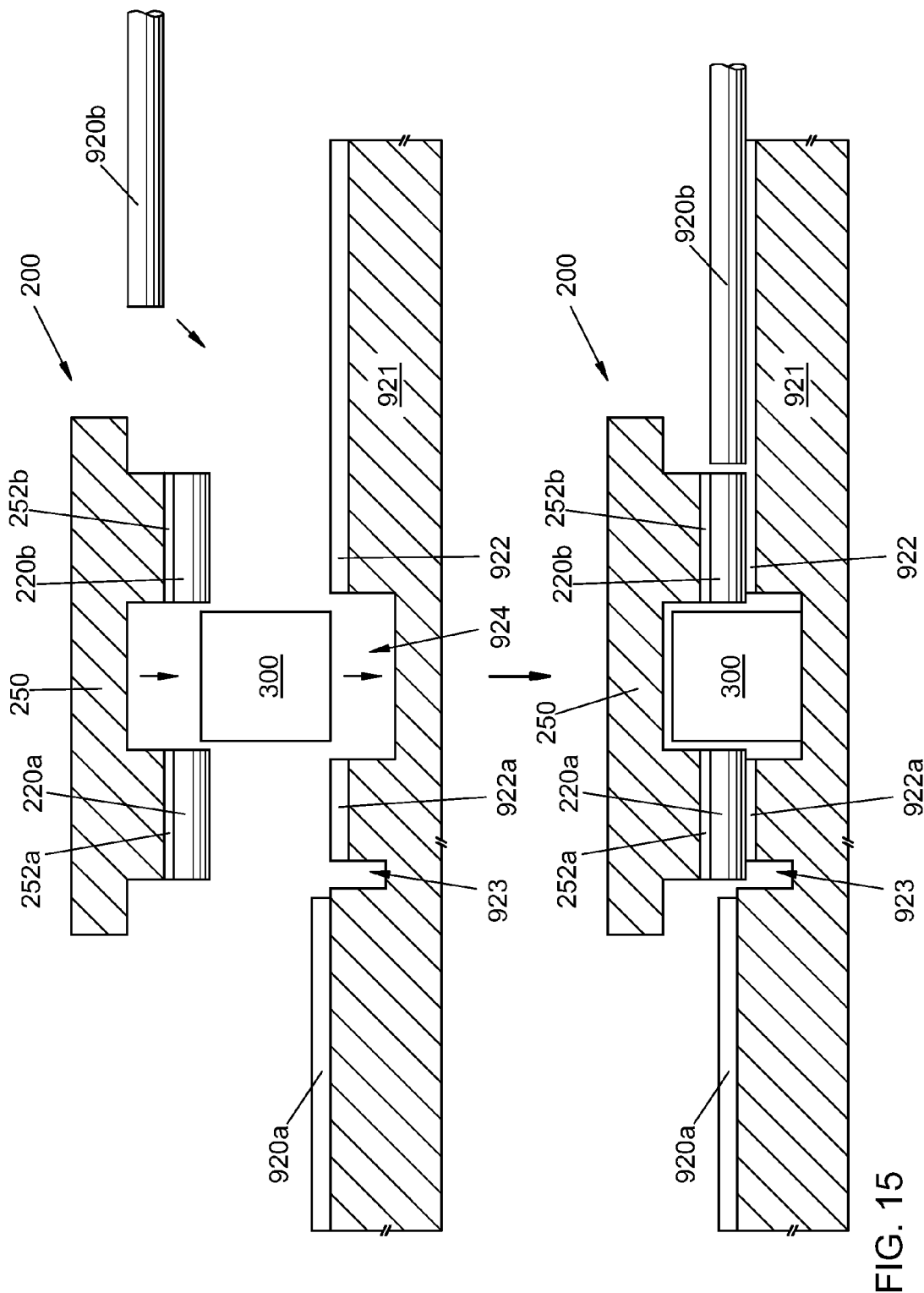
FIG. 15 is a side view of an exemplary optical assembly, optical component, optical fiber, and planar waveguide.

It may be desirable in some instances of embodiments similar to those of FIGS. 6A-6C, 7A-7C, 12, and 13 to position and align the optical component 300 on the planar waveguide substrate (721 or 921), instead of on substrate 250 (with the GRIN segments 220*a* and 220*b*). Since transverse positioning of the optical component 300 typically does not require a high degree of accuracy, it may not be necessary to include the optical component 300 in an optical assembly with the GRIN fiber segments. Exemplary assembly procedures are illustrated in FIGS. 14 and 15, wherein the optical component 300 is positioned and aligned on waveguide substrate 721 or 921 (the waveguide substrate being adapted therefor; adaptations not shown), and then an optical assembly as variously described hereinabove (minus the optical component 300 but including V-groove-mounted GRIN segments 220*a*/220*b*) is then positioned and aligned on substrate 721 or 921. Dashed lines indicating the optical modes are omitted.

Figure 16:
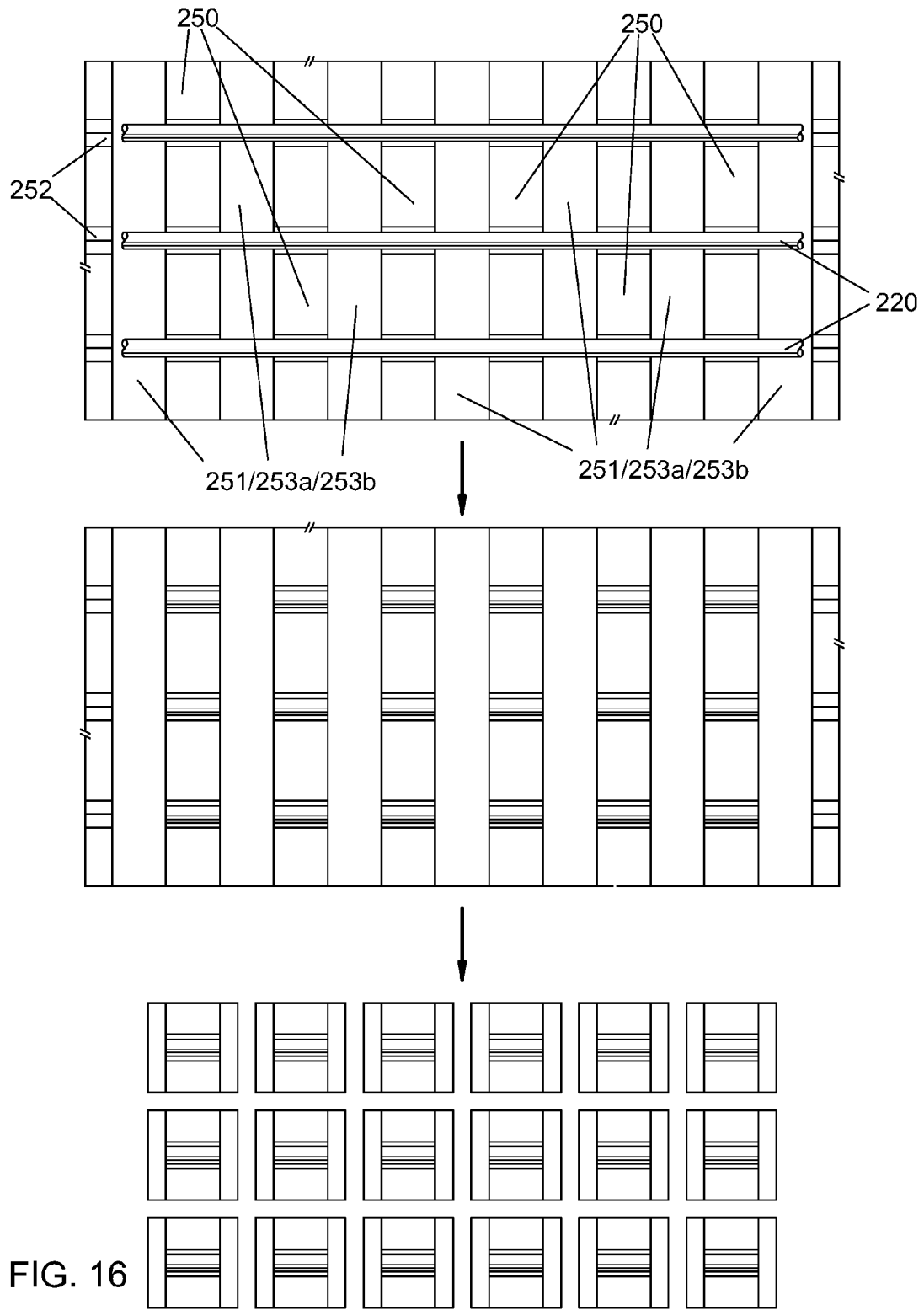
FIG. 16 is a top view of an exemplary fabrication/assembly sequence for a GRIN lens optical assembly.
Figure 17:
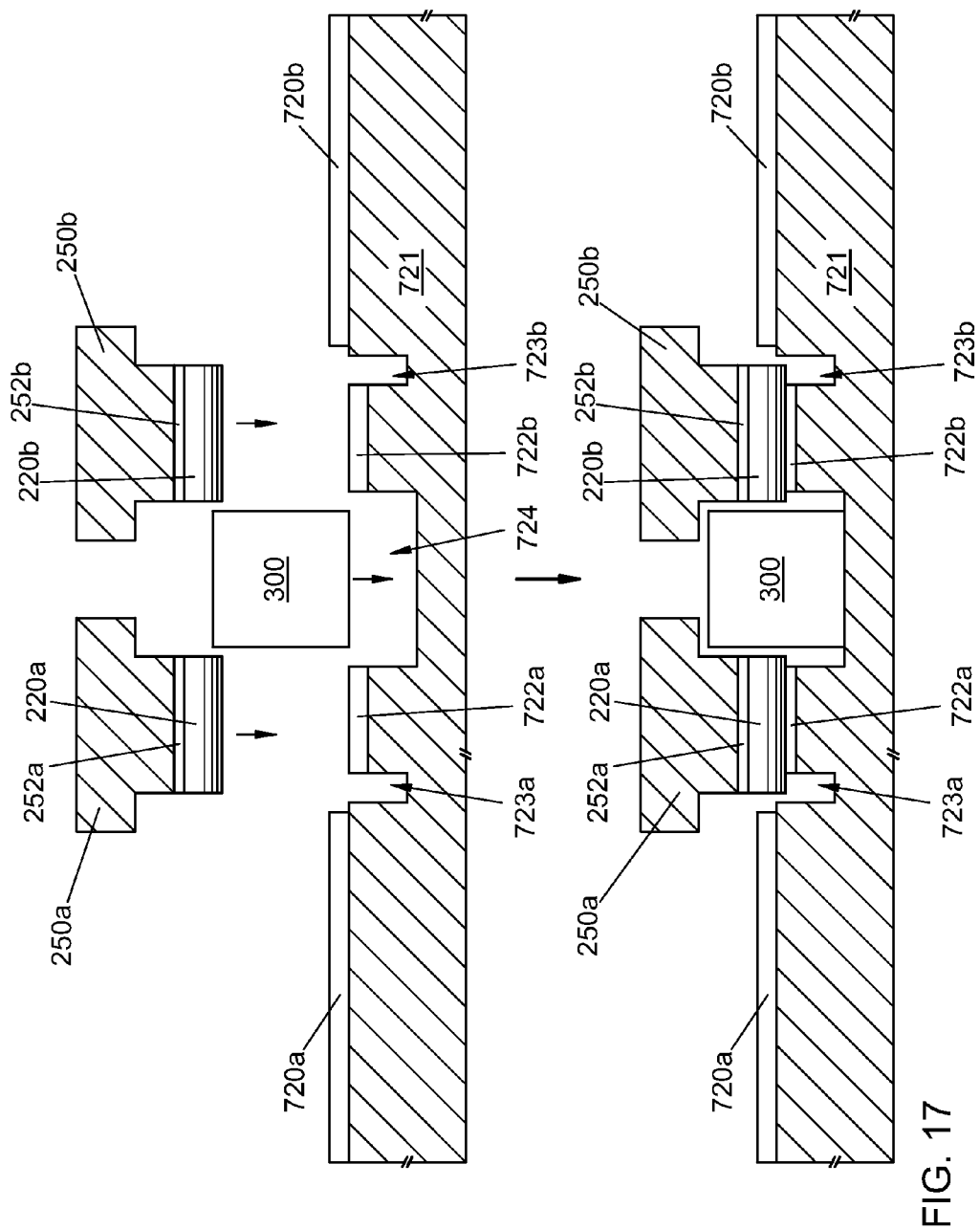
FIG. 17 is a side view of exemplary GRIN lenses, optical component, and planar waveguides.
Figure 18:
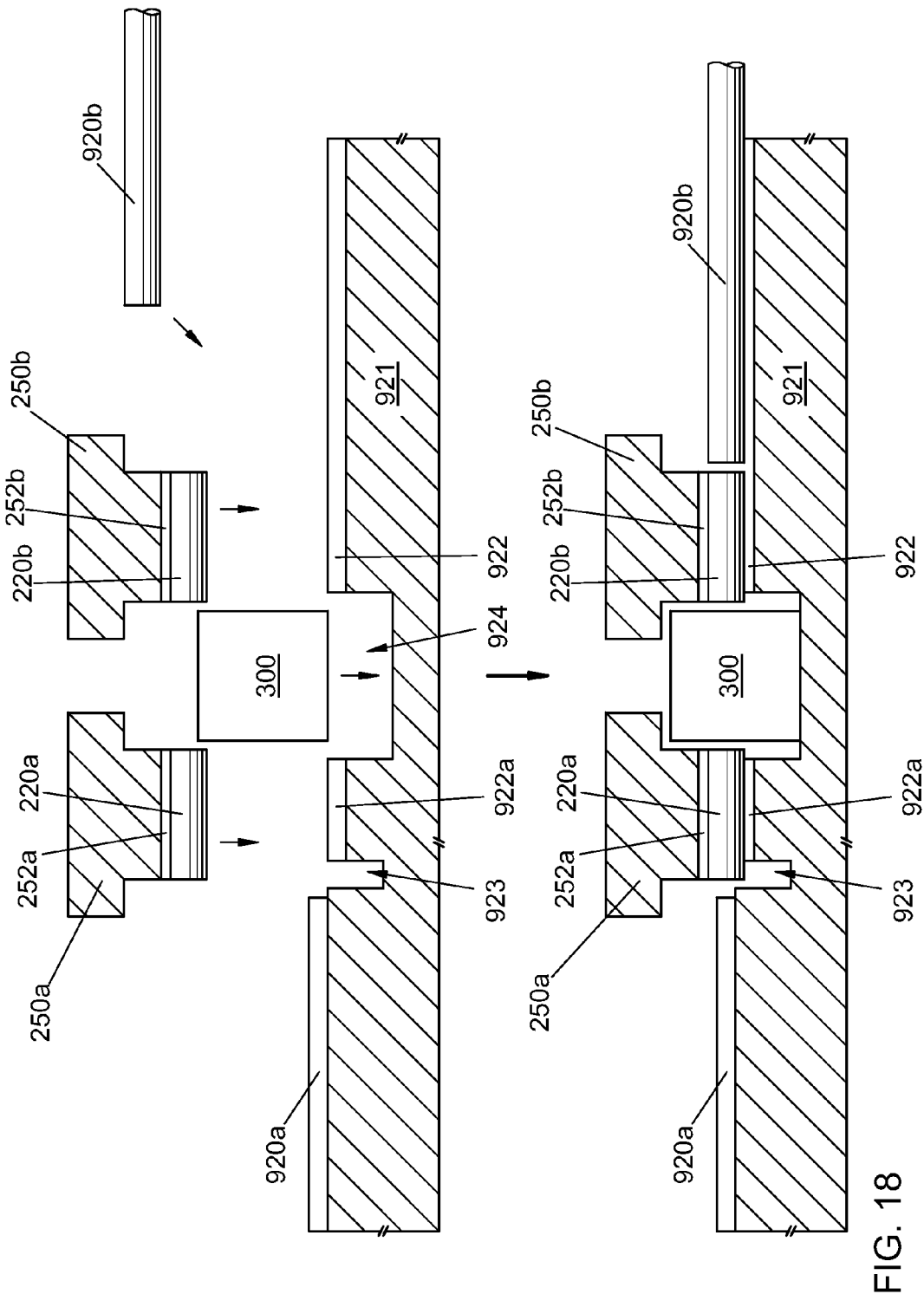
FIG. 18 is a side view of exemplary GRIN lenses, optical component, optical fiber, and planar waveguide.

It may be desirable in various disclosed embodiments to position each of the GRIN segments 220*a*/220*b* individually on waveguide substrate 721 or 921, or on a second substrate with optical fibers 520*a* and 520*b*. Instead of forming dual-lens optical assemblies, the substrate wafer 250 is divided into individual lens substrates 250*a* or 250*b*, each having thereon only one GRIN segment 220*a* or 220*b* in a corresponding V-groove segment 252*a*/252*b* (FIG. 16). GRIN segments 220*a* and 220*b* thus formed may be substantially identical, or may differ in length. One or more of these single GRIN lens substrates may be assembled onto a waveguide substrate 721 or 921 (adapted in any of the ways variously set forth hereinabove) along with an optical component 300 as shown in FIGS. 17 and 18. Dashed lines indicating the optical modes are omitted. Separate mounting of the two GRIN lens segments may be used to implement any dual-lens embodiment set forth herein or falling within the scope of the present disclosure. Embedding and/or index-matching media or encapsulant(s) may be employed, as described above. Alignment and securing of GRIN fiber segments to the substrate may be accomplished as described hereinabove. If GRIN segments arising from adjacent portions of a common GRIN fiber are used, axial asymmetry of the GRIN fiber is self-correlated, as with the dual-lens assemblies described hereinabove. Alternatively, use of separate GRIN segments enables use of differing GRIN profiles in a two-lens optical device, adding another design parameter for implementing such two-lens optical devices.

Figure 27:
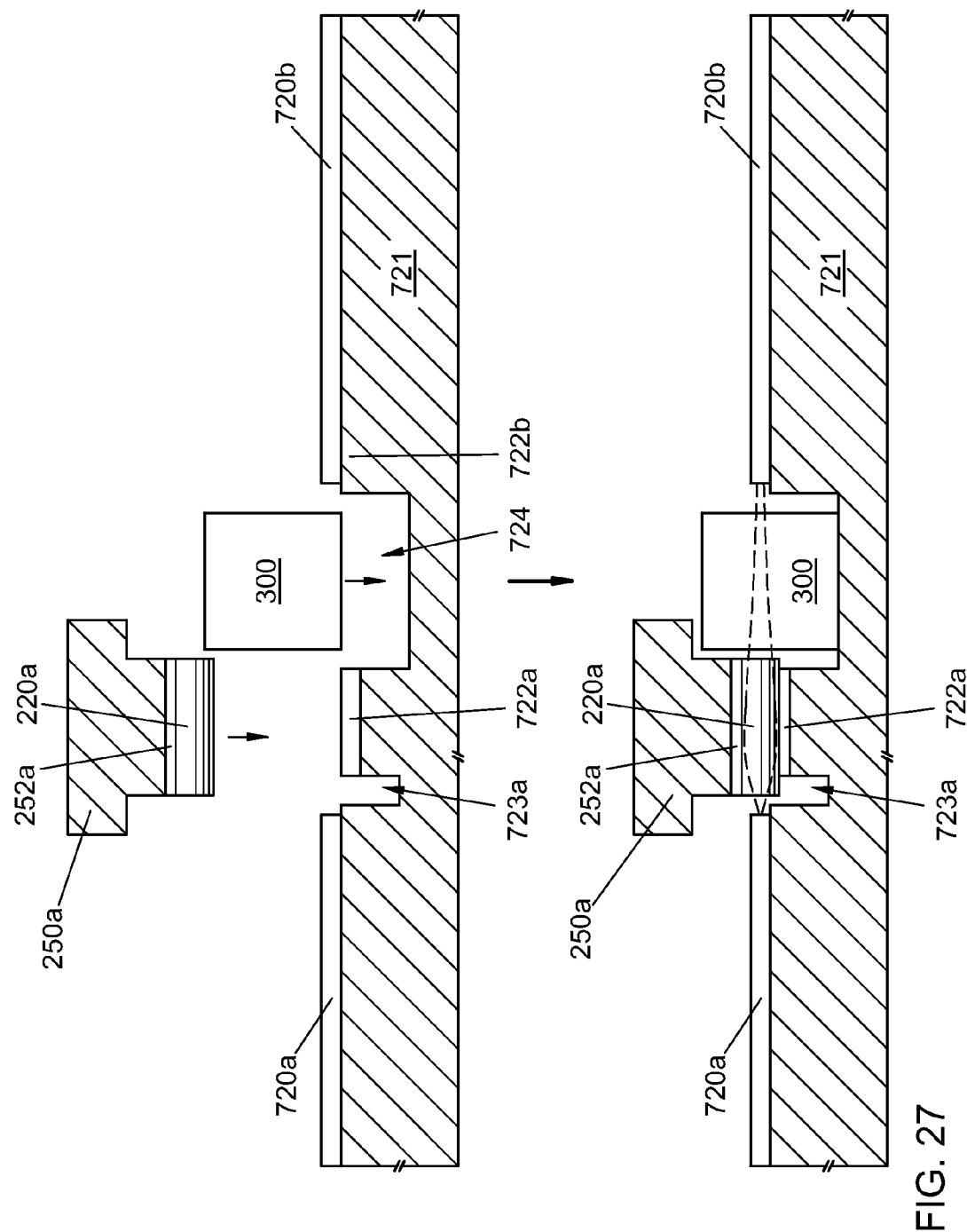
FIG. 27 is a side view of an exemplary GRIN lens, optical component, and planar waveguides.
Figure 28:
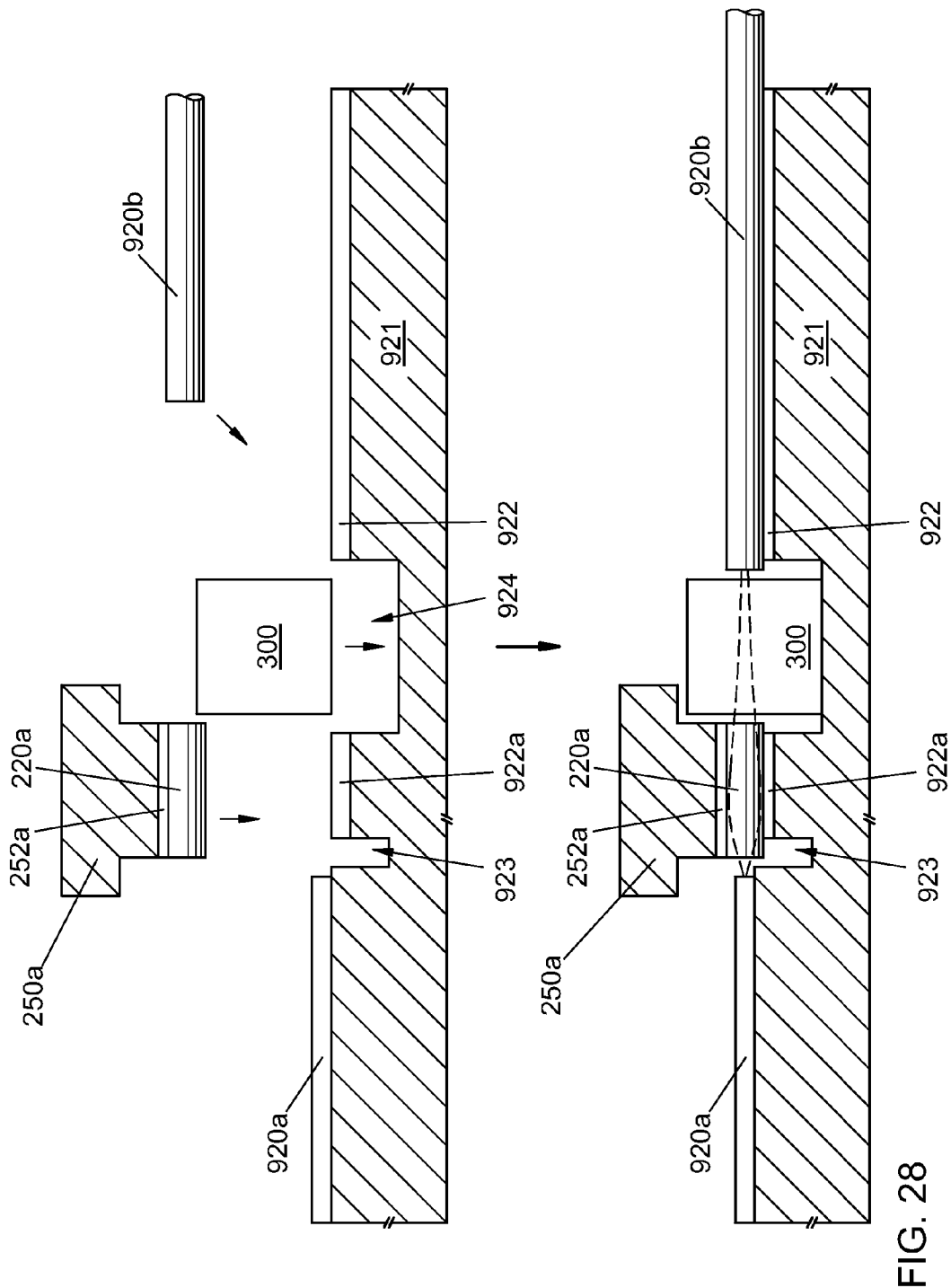
FIG. 28 is a side view of an exemplary GRIN lens, optical component, optical fiber, and planar waveguide.
Figure 29:
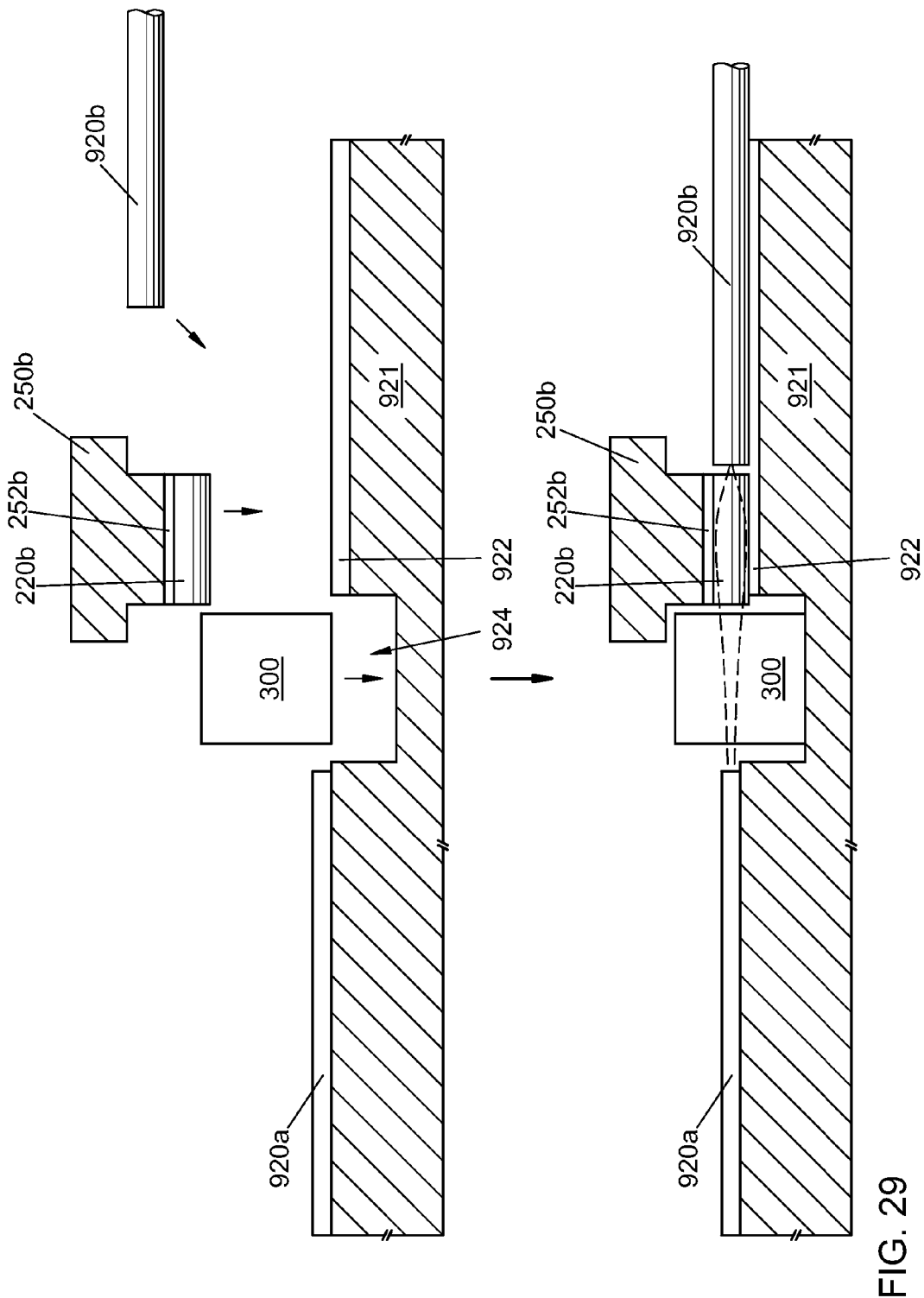
FIG. 29 is a side view of an exemplary GRIN lens, optical component, optical fiber, and planar waveguide.

There may be instances in which a single lens may provide an adequate (i.e., operationally acceptable) level of optical power transfer between fiber(s) and/or waveguide(s). In such cases a single GRIN segment mounted on its own substrate (as in FIGS. 16-18) may be assembled with other optical components in a manner similar to that already described hereinabove. Exemplary single-lens embodiments are shown in FIGS. 27-29, and fall within the scope of the present disclosure and/or appended claims.

Various structural adaptations of optical assemblies disclosed herein may be required depending on the intended alignment configuration. Similarly, fabrication and/or assembly procedures may require modifications depending on the alignment configuration to be employed. In particular, the manner in which GRIN optical fiber 220 is secured to substrate 250 during and after forming GRIN fiber segments 220*a* and 220*b* may vary depending on the subsequent assembly and/or use of the optical assembly. Any suitable method may be employed for securing the GRIN fiber 220 once it is positioned in V-groove 252, and for holding it in place as the fiber is divided into GRIN fiber segments 220*a* and 220*b*, by cleaving, saw cuts, and/or other suitable technique. Suitable methods may include but are not limited to: adhesives; embedding media (including encapsulants, polymers, and so forth); one or more clamps, retainers, covers or lids, or other structural components; solder; electrostatic interactions; heat/pressure bonding; and so forth. Such methods may be similarly employed for securing GRIN fiber segments of an optical assembly into V-groove segments on a planar waveguide substrate (as in FIGS. 6A-6C and 7A-7C, for example), or for securing optical fiber(s) onto a substrate along with the GRIN segments (as in FIGS. 5A-5C, for example).

Some of these techniques for securing GRIN optical fiber 220 in V-groove 252 may rely on the presence of metal. A metal-coated GRIN optical fiber may be secured within a V-groove using solder, for example. Such solder may be spatially-selectively applied to the substrate 250 and/or V-groove 252, and may be bonded to a metal coating of a GRIN optical fiber. Solder reflow may enable sufficiently accurate positioning of the GRIN optical fiber engaged with the V-groove. Another technique relying on the presence of metal is heat/pressure bonding of glass and/or silicon with aluminum (or perhaps an oxide coating thereof; the exact mechanism is not known). Mechanical bonding of convex surfaces to flat surfaces, wherein one surface is silica or silicon and the other surface is aluminum, has been previously disclosed in U.S. Pat. No. 5,178,319 to Coucoulas and U.S. Pat. No. 5,389,193 to Coucoulas et al. Aluminum coatings maybe applied to substrates and/or optical fibers with accurately known thicknesses, and the heat/pressure bonding results in no substantial deformation of the substrate, fiber, or coating. Heat/pressure bonding therefore may be employed while maintaining sufficiently accurate positioning of fibers/segments within V-grooves, for example. Substrates 250, 721, and/or 921 may comprise silicon substrates, while GRIN fiber 220 may be silica or silica-based.

In one heat/pressure technique, the GRIN optical fiber may be provided with an aluminum coating, ranging in thickness from a few microns up to a few tens of microns, typically around 10 microns thick. By applying pressure and heat (or acoustic energy) to the aluminized GRIN fiber within the V-groove (in silicon substrate 250), a robust mechanical bond is formed between the fiber and the V-groove. Pressure, heat, and/or acoustic energy may be applied along substantially the entire length of GRIN fiber 220 within V-groove 252, or may be applied in a localized fashion only to those fiber/V-groove segments where a GRIN fiber segment is ultimately desired. After the optical assembly is formed (as in the exemplary procedures of FIGS. 3A-3C, FIGS. 3D-3F, FIG. 10, or FIG. 16, with the GRIN segments held in place by the silicon/aluminum bond; aluminum coatings not shown), heat/pressure bonding may be further employed to assemble it with a silicon planar waveguide substrate (as in exemplary procedures of FIGS. 6A-6C, FIGS. 7A-7C, FIGS. 12-15, FIGS. 17-18, or FIGS. 27-29; aluminum coatings not shown). The aluminized GRIN segments may be bonded to the V-grooves of the waveguide substrate by additional application of pressure and heat (or acoustic energy). Since the V-grooves provide both lateral as well as (with the GRIN fiber diameter) vertical alignment, the additional size of the GRIN fiber added by the presence of the aluminum coating must be accounted for in designing the V-grooves and waveguides on the waveguide substrate (721 or 921). Similarly, for fabricating an embodiment analogous to the examples of FIGS. 5A-5C and FIG. 11, aluminized optical fiber (having substantially the same diameter) may be used for fibers 520*a*/520*b* as well as the GRIN segments. Alternatively, if non-metallized optical fiber is used for fibers 520*a* and/or 520*b*, then V-groove segments 252*a*/252*b* and 552*a*/552*b* must be made of suitably differing depths, to achieve an acceptable degree of vertical alignment between the GRIN segments and optical fibers.

In another heat/pressure technique, non-metallized optical fiber is employed, and a coating of aluminum may be applied to at least portions of V-groove 252. A silica or silica-based GRIN optical fiber 220 pressed into such an aluminized V-groove will form a robust mechanical bond upon application of heat or acoustic energy. It may be desirable to provide the aluminum coating to only those portions of the V-groove 252 where a GRIN fiber segment is ultimately desired. Alternatively, pressure, heat, and/or acoustic energy may be applied in a localized fashion only to those fiber/V-groove segments where a GRIN fiber segment is ultimately desired. Alternatively, substantially the entire V-groove may be aluminized for heat/pressure bonding of GRIN optical fiber 220. Forming recessed areas 251/253*a*/253*b* as in FIGS. 3A-3C or making saw cuts 254/256*a*/256*b* as in FIGS. 3D-3F (as the case may be) to divide V-groove 252 into V-groove segments 252*a*/252*b* also serves to remove the aluminum coating and V-groove from regions where it is not needed or desired. After the optical assembly is formed (as in the exemplary procedures of FIGS. 3A-3C, FIGS. 3D-3F, FIG. 10, or FIG. 16, with the GRIN segments held in place by the silicon/aluminum bond; aluminum coatings not shown), heat/pressure bonding may be further employed to assemble it with a silicon planar waveguide substrate (as in the exemplary procedures of FIGS. 6A-6C, FIGS. 7A-7C, FIGS. 12-15, FIGS. 17-18, or FIGS. 27-29; aluminum coatings not shown). The V-groove segments on the waveguide substrate that engage the GRIN segments may be aluminized, and the GRIN fiber segments of the optical assembly bonded to the V-grooves of the waveguide substrate by additional application of pressure and heat (or acoustic energy). Since the V-grooves provide both lateral as well as (with the GRIN fiber diameter) vertical alignment, the thickness of the aluminum coating must be accounted for in designing the V-grooves and waveguides on the waveguide substrate (721 or 921). Similarly, for fabricating an embodiment analogous to the examples of FIGS. 5A-5C and FIG. 11, the thickness of the aluminum coating in V-groove segments 220*a*/220*b* must be accounted for. This may be accomplished by providing an aluminum coating of substantially the same thickness in V-groove segments 552*a*/552*b*, by using optical fibers 520*a*/520*b* of suitably differing diameter from the GRIN fiber segment diameters, or by forming V-groove segments 252*a*/252*b* and 552*a*/552*b* at suitably differing depths, to achieve an acceptable degree of vertical alignment between the GRIN segments and optical fibers.

In other exemplary embodiments of optical assemblies and fabrication thereof as disclosed herein, adhesives or polymers may be employed for securing GRIN fiber 220 within V-groove 252 during and after forming GRIN fiber segments 220*a*/220*b*. Such an adhesive or polymer (these terms shall be used interchangeably hereinbelow) may be substantially uniformly applied over the substrate wafer. Such an adhesive or polymer may instead be: spatially selectively applied; substantially uniformly applied and spatially selectively removed (before or after curing); or substantially uniformly applied and spatially selectively cured, to facilitate subsequent processing and assembly of the optical component 300 with the optical assembly 200, and to facilitate positioning, alignment, and securing of the optical assembly 200 relative to other planar waveguide(s) and/or optical fiber(s). For example, adhesive or polymer may be required to hold GRIN fiber 220 during cutting and/or to retain GRIN fiber segments 220*a* and 220*b* properly aligned in V-groove segments 252*a* and 252*b*. However, any cured adhesive or polymer should be substantially absent from V-groove segments 552*a* and 552*b* on substrate 250, in order to enable accurate alignment of single mode fibers 520*a* and 520*b* positioned therein (as in FIGS. 5A-5C or FIG. 11). In another example, any cured adhesive or polymer should be substantially absent from at least a portion of each of GRIN fiber segments 220*a* and 220*b* to enable accurate alignment of the optical assembly 200 with GRIN segments 220*a* and 220*b* engaged with a waveguide substrate V-groove or segment thereof (as in FIGS. 6A-6C, FIGS. 7A-7C, FIGS. 12-15, FIGS. 17-18, or FIGS. 27-29).

Figure 8A:
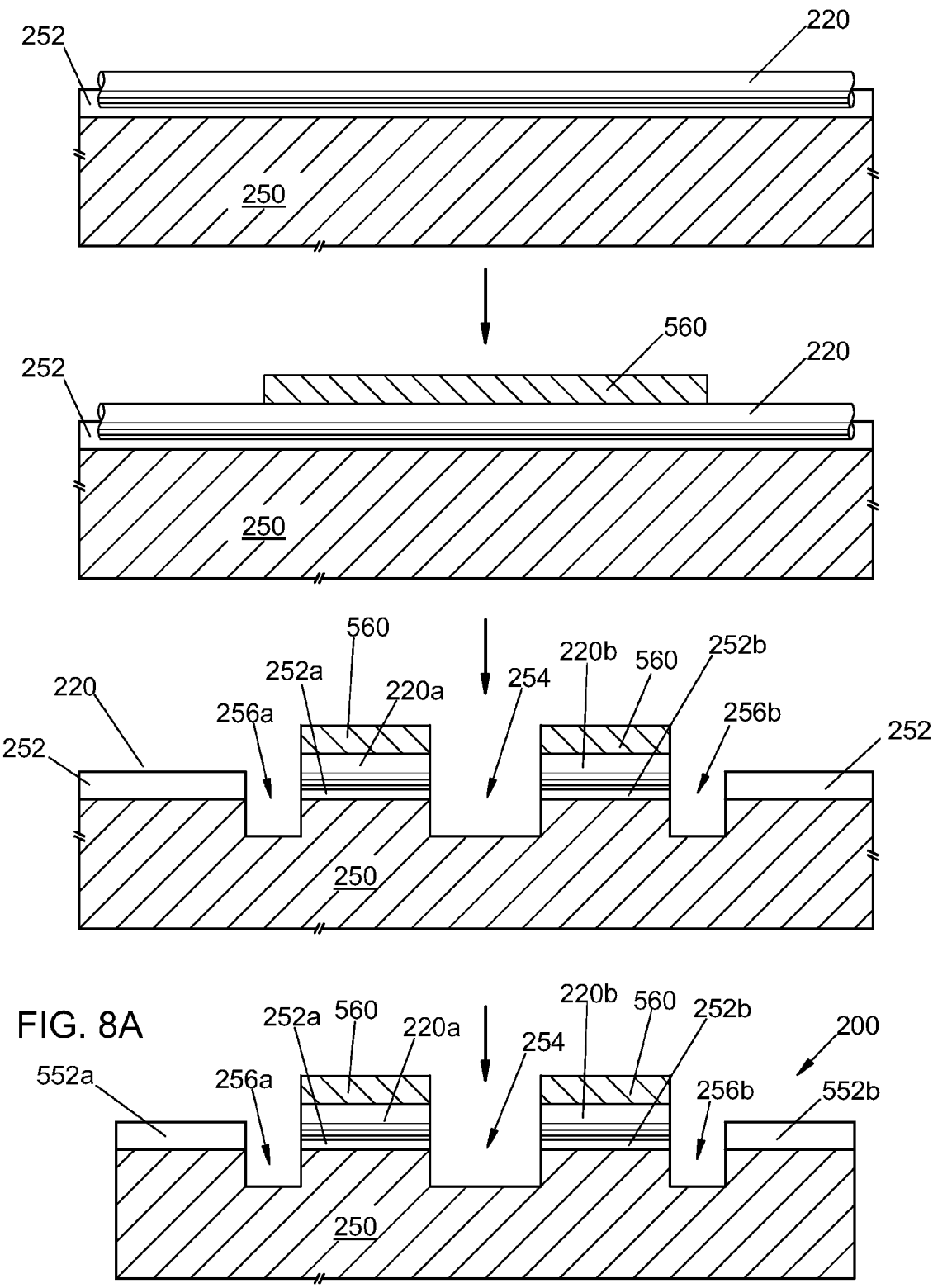
FIGS. 8A and 8B are side and top views, respectively, of an exemplary fabrication/assembly sequence for a dual-lens optical assembly.
Figure 8B:
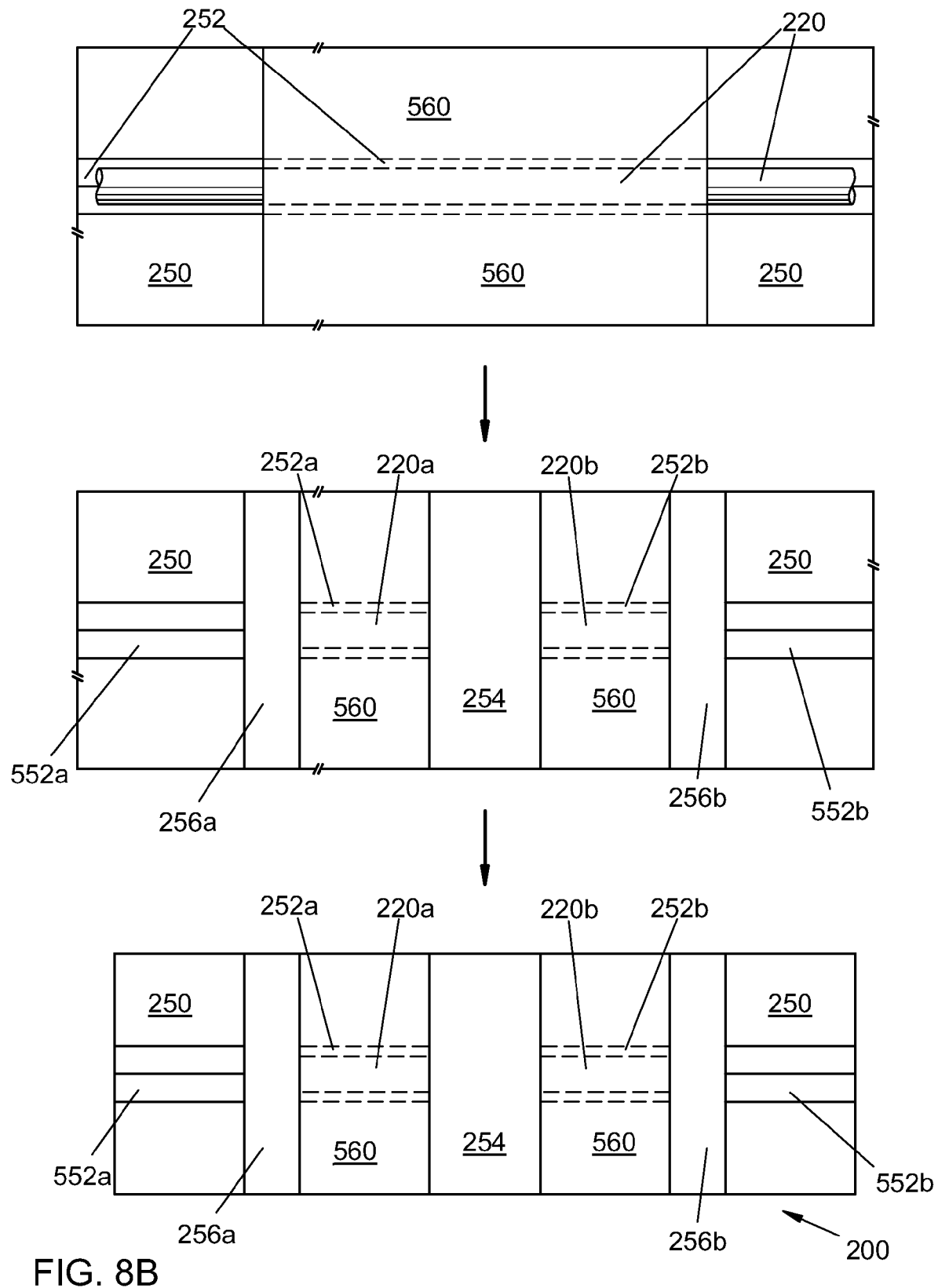

Optical assemblies 200 suitable for use as illustrated in FIGS. 5A-5C or FIG. 11 may be fabricated according to the exemplary procedure illustrated in FIGS. 8A-8B. A substantially similar procedure may be implemented for fabricating assemblies on a wafer scale, at the bar level, or for fabricating individual optical assemblies. A polymer layer is applied in strips 560 substantially perpendicular to V-grooves 252 and GRIN fibers 220 positioned therein, thereby leaving intervening segments of V-grooves 252 substantially free of polymer. Saw cuts 254 are made through a central portion of the polymer strips 560, while saw cuts 256*a* and 256*b* are made along the edges of polymer strips 560. Saw cuts 256*a* and 256*b* thus positioned allow GRIN fiber segments in the intervening portion of V-groove 252 (the portions substantially lacking polymer coverage) to be removed therefrom. The substrate wafer is divided between adjacent saw cuts 256*a* and 256*b* to form individual optical assemblies 200, leaving empty V-groove segments 552*a* and 552*b* on each assembly substrate 250 adjacent each GRIN fiber segments 220*a* and 220*b*. The optical assembly thus formed is thereby prepared for receiving single mode fibers 520*a* and 520*b*, as in FIGS. 5A-5C. Polymer 560 substantially completely covers lateral surfaces of GRIN fiber segments 220*a* and 220*b*, and holds the GRIN fiber segments within V-groove segments 252*a* and 252*b*. If additional processing of the optical assembly is needed or desired, polymer 560 may serve as a mask protecting lateral surfaces of GRIN fiber segments 220 and 220*b* from such processing steps. For example, a wet etch might be employed to improve the optical quality of the transmissive end surfaces of GRIN fiber segments 220*a* and 220*b* (improve the optical quality relative to that left by the saw cut process), and polymer 560 protects the lateral surfaces of the GRIN fiber segments from the wet etch. In such a case, it may be desirable to apply at least some of the polymer (precursor) prior to placement of GRIN fiber 220, to ensure that the underside of the GRIN fiber segments (within the V-groove segments) are protected as well. Any embedding medium and/or index matching medium or encapsulant employed with optical component 300 and/or single-mode fibers 520*a* and 520*b* (as in FIG. 5C) may also surround polymer 560.

Figure 9A:
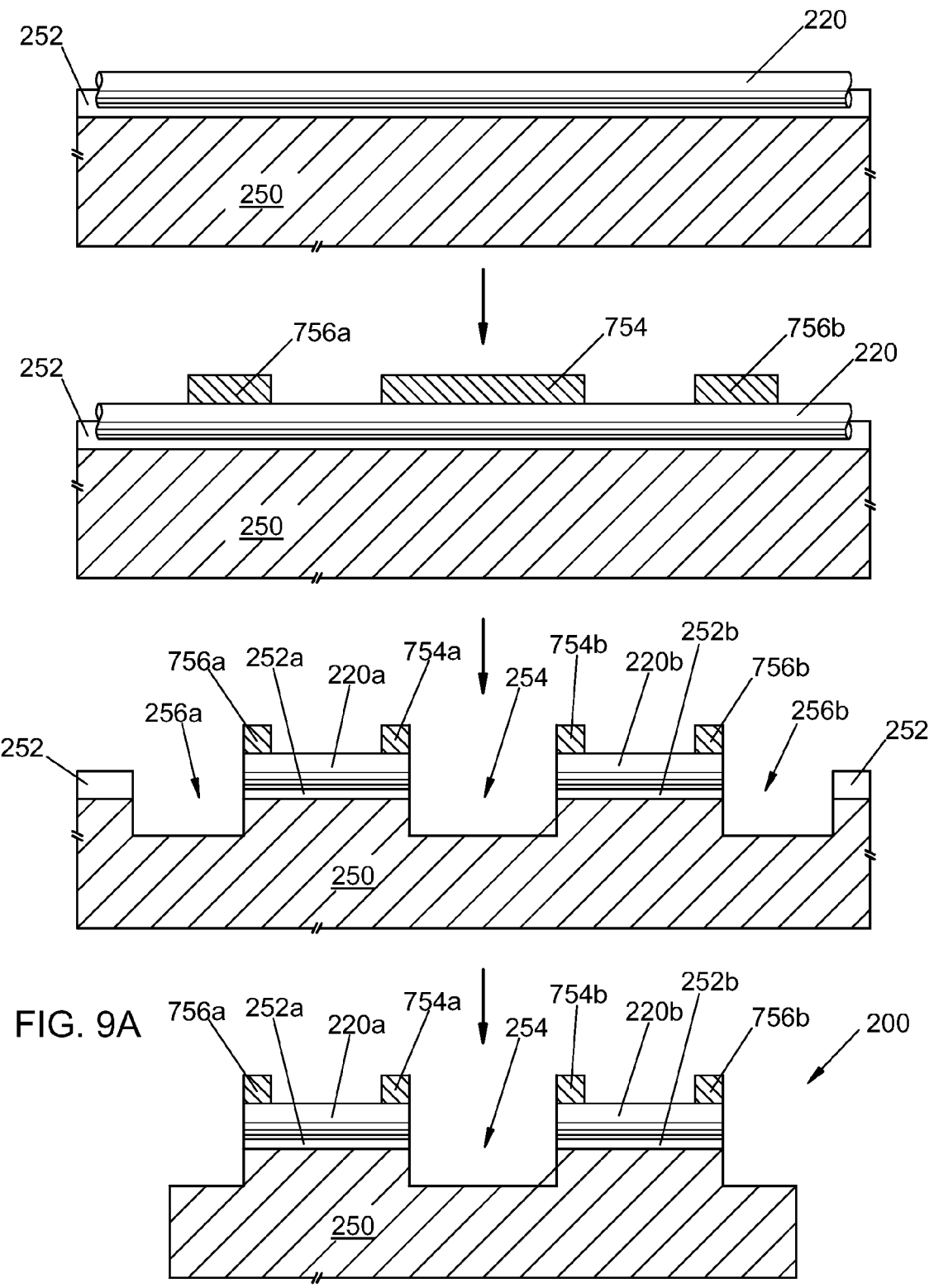
FIGS. 9A and 9B are side and top views, respectively, of an exemplary fabrication/assembly sequence for a dual-lens optical assembly.
Figure 9B:
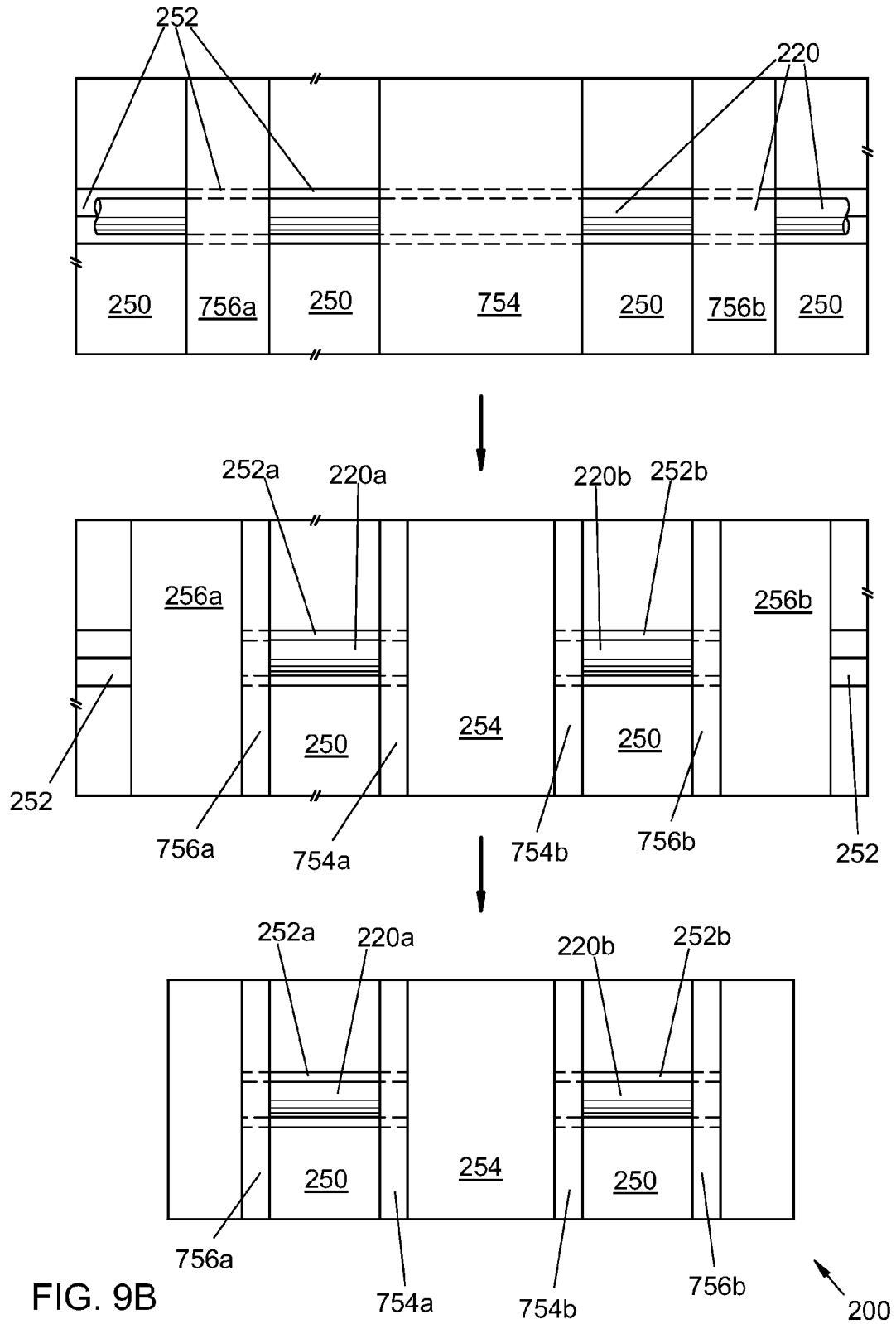

Optical assemblies 200 suitable for use as illustrated in FIGS. 6A-6C, FIGS. 7A-7C, FIGS. 12-15, FIGS. 17-18, or FIGS. 27-29 may be fabricated according to the exemplary procedure illustrated in FIGS. 9A-9B. A substantially similar procedure may be implemented for fabricating assemblies on a wafer scale, at the bar level, or for fabricating individual optical assemblies. A polymer layer is provided as sets of three strips 754/756*a*/756*b* substantially perpendicular to V-grooves 252 and GRIN fibers 220 positioned therein. Polymer strips 754/756*a*/756*b* are positioned to correspond roughly to the positions of saw cuts 254/256*a*/256*b*, and the intervening segments of GRIN optical fiber 252 are substantially free of polymer. Polymer strip 754 is wider than saw cut 254, which divides polymer strip 754 into polymer strip segments 754*a* and 754*b*. Polymer strips 756*a* and 756*b* are positioned so that portions of their respective outer edges are removed by saw cuts 256*a* and 256*b*. As a result, GRIN fiber segment 220*a* is secured within V-groove segment 252*a* by a polymer strip 754*a* at its inner (i.e., proximal) end and polymer strip 756*a* at its outer (i.e., distal) end, leaving a central portion of the GRIN fiber segment substantially free of polymer. GRIN fiber segment 220*b* is similarly secured within V-groove segment 252*b* by a polymer strip 754*b* at its inner end and polymer strip 756*b* at its outer end, leaving a central portion of the GRIN fiber segment substantially free of polymer. The substrate wafer is divided between adjacent saw cuts 256*a* and 256*b* to form individual optical assemblies 200. If additional processing is needed or desired (such as a wet etch to improve optical quality of GRIN fiber segment transmissive end surfaces, as described hereinabove), a temporary mask (not shown) may be employed, if needed, to protect the exposed lateral surfaces of the GRIN fiber segments. Such a temporary mask is typically selectively removable from the GRIN fiber segments while leaving polymer strips 754/756*a*/756*b* intact.

The substantially polymer-free central portions of the GRIN fiber segments facilitate accurate vertical alignment of the GRIN fiber segments within V-grooves and/or V-groove segments on the waveguide substrate. The polymer strips 756*a*/756*b* may be received within slots in the waveguide substrate (to enable engagement of the GRIN fiber segments with the waveguide substrate V-groove; slots 723*a*/723*b* in FIGS. 6A-6C; slot 923 in FIGS. 7A-7C along with an additional slot not shown). The polymer strip segments 754*a*/754*b* may be similarly received within a recessed portion of the waveguide substrate along with optical component 300 (recessed portion 724 in FIGS. 6A-6C; recessed portion 924 in FIGS. 7A-7C). One or more of polymer strips 754*a*/754*b*/756*a*/756*b* may engage a substrate for facilitating longitudinal alignment of the GRIN segment(s). An optical assembly thus formed may be employed between two planar optical waveguides (as in FIGS. 6A-6C, FIG. 12, FIG. 14, FIG. 17, or FIG. 27) or between a planar optical waveguide and a single-mode optical fiber (as in FIGS. 7A-7C, FIG. 13, FIG. 15, FIG. 18, FIG. 28, or FIG. 29). Any embedding medium and/or index matching medium or encapsulant employed with optical component 300, planar waveguide(s), and/or a single-mode fiber may also surround polymer strips 754*a*/754*b*/756*a*/756*b*.

Figure 19:
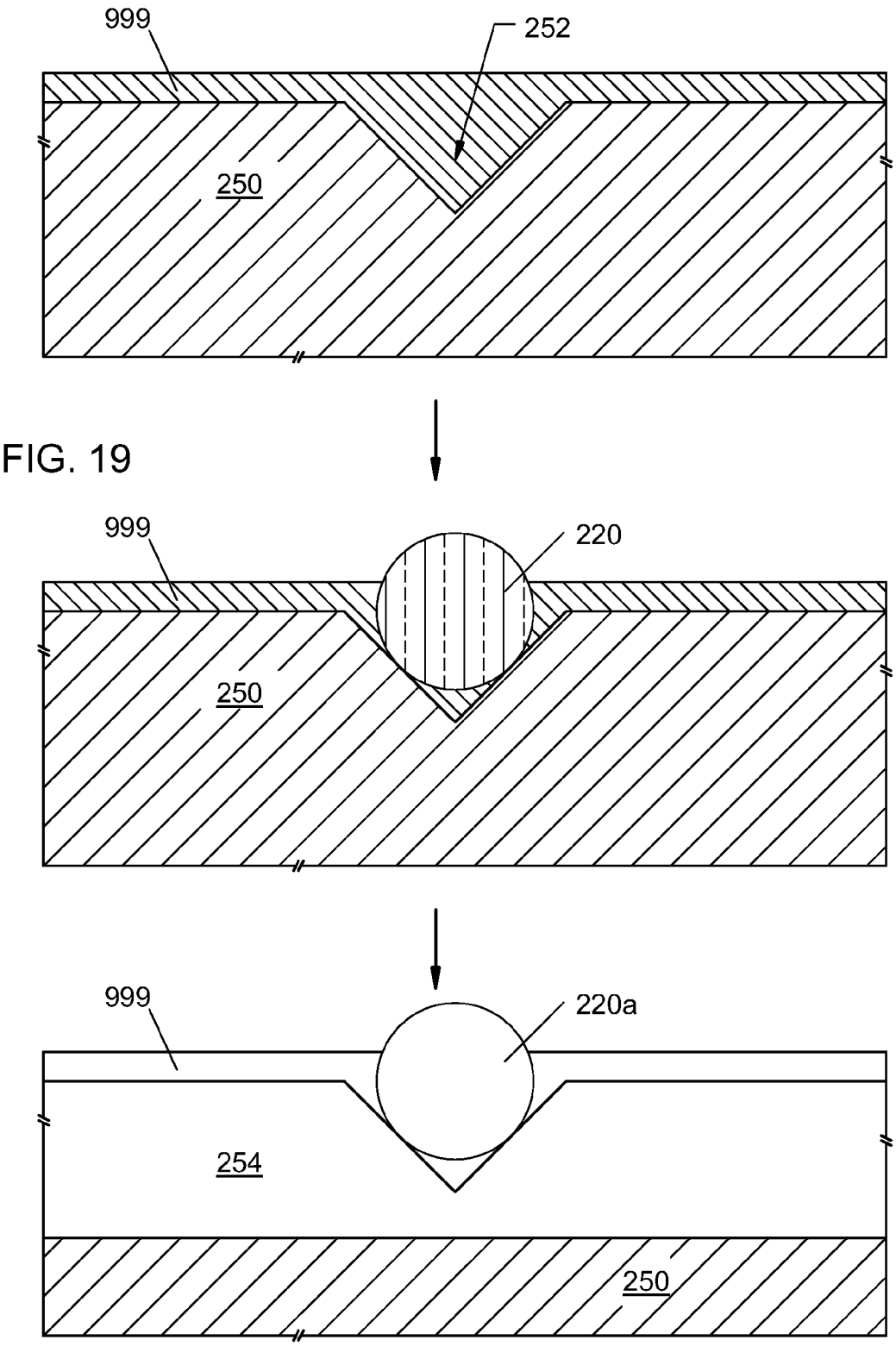
FIG. 19 is an end cross-sectional view of an exemplary fabrication/assembly sequence for a dual-lens optical assembly.

Another exemplary procedure for forming optical assembly 200 which would 11 leave portions of GRIN fiber segments substantially free of cured polymer is shown in FIG. 19. A substantially uniform polymer or adhesive layer 999 is deposited on substrate wafer 250, which includes V-groove(s) 252. GRIN optical fiber(s) 220 are positioned in V-groove(s) 252, and the polymer or adhesive is cured. The polymer layer 999 is sufficiently thin that when GRIN optical fibers are placed in the polymer layer and positioned in the V-groove(s), the polymer leaves a significant portion of the circumference of the GRIN fiber uncovered. The uncovered portion of the circumference is large enough to allow it to engage the corresponding V-groove on a waveguide substrate upon assembly therewith. Saw cuts 254 (shown in FIG. 19) and 256*a*/

256b (not shown in FIG. 19) are made as described hereinabove, optical component 300 positioned and the substrate wafer divided into individual assembly substrates, and the resulting optical assemblies assembled onto V-grooves of corresponding waveguide substrates (as in FIGS. 6A-6C and 7A-7C). The success of this technique may depend on the viscosity and/or wetting properties of the polymer before curing, which may facilitate or render problematic the placement of the GRIN fiber while maintaining a portion of its circumference substantially free of polymer.

It should be understood that any of the techniques described herein for forming a dual-GRIN-lens assembly may be suitably adapted for forming single-GRIN-segment assembly (i.e., a GRIN segment mounted on its own substrate, as in FIGS. 16-18 and 27-29), and that such adaptations fall within the scope of the present disclosure and/or appended claims.

It should be understood that optical propagation through any of the optical assemblies disclosed herein may occur in either or both directions. In particular, in the exemplary embodiments of FIGS. 7A-7C, FIG. 13, FIG. 15, FIG. 18, and FIGS. 28-29, optical power may propagate from planar waveguide 920a, through optical assembly 200 and optical component 300, and into single-mode optical fiber 920b, and also from single-mode optical fiber 920b, through optical assembly 200 and optical component 300, and into planar waveguide 920a. It should be understood that while exemplary embodiments have been disclosed including optical assemblies used with single-mode optical fiber, the optical assemblies disclosed herein may also be adapted for and used with multi-mode optical fiber, expanded-mode optical fiber, and other types of optical fiber. Similarly, planar waveguides used with the disclosed optical assemblies may be single-mode, multi-mode, expanded-mode, and so forth. Such uses of the disclosed optical assemblies with various types of optical fibers and/or planar waveguides shall nevertheless fall within the scope of the present disclosure and/or appended claims.

In addition to the example of an optical isolator as optical component 300, a dual-lens optical assembly 200 as disclosed herein may be implemented for placement and alignment of any one or more suitable "free-space" optical component(s) 300 between GRIN fiber segments 220a and 220b. Such components may include, but are not limited to: polarization-dependent and/or polarization-independent optical isolators; thin-film filters; bulk polarizers, polarization rotators, waveplates, birefringent wedges, analyzers, and/or other polarization components; micro-mirrors and/or micro-beamsplitters; optical taps; diffractive optics; and so forth. A portion of the functionality of any free-space optical component 300 (incorporated into an optical assembly according to the present disclosure) may reside in a planar waveguides 720a and/or 720b (FIGS. 6A-6C, FIG. 12, FIG. 14, FIG. 17, FIG. 27) or waveguide 920a (FIGS. 7A-7C, FIG. 13, FIG. 15, FIG. 18, and FIGS. 28-29). Such waveguide-based functionality may be implemented on a wafer-scale for many waveguides concurrently, and may potentially reduce the size and/or cost of the component 300 and/or the size of the gap required between the planar waveguide(s) and/or optical fiber, as well as potentially reducing the overall manufacturing cost of the finished optical assemblies. In one example of such inclusion of functionality in a waveguide, one linear polarizer may be omitted from a conventional optical isolator (potentially reducing its length). The required linear polarization selectivity may instead be incorporated into the planar waveguide on the substrate (by any suitable means).

In addition to GRIN optical fiber for forming GRIN fiber segments 220a/220b, other gradient-index optical media, such as GRIN rods, may be employed for forming functionally equivalent lens-like components as part of optical assemblies disclosed herein. Use of such alternative GRIN optical media shall nevertheless fall within the scope of the present disclosure and/or appended claims.

FIGS. 20A and 20B illustrate another exemplary optical assembly. A planar waveguide 1120 is provided on a waveguide substrate 1102. Waveguide 1120 may be provided at its proximal end with a mode-expander segment 1122. The mode expander is preferably arranged so as to provide substantially adiabatic mode expansion, i.e., longitudinal variation of waveguide dimensions and/or properties are sufficiently gradual so that only an operationally acceptable fraction of propagating optical power is lost by transfer into undesired modes. Optical power propagating through waveguide 1120 and mode expander 1122 exits through an end-facet of the waveguide/mode expander and diverges by so-called free-space diffraction, determined primarily by the wavelength and the mode characteristics at the end facet of the waveguide. The optical power then enters an entrance face of an optical component 1140 (such as an optical isolator, for example) and propagates therethrough. The transverse dimensions of the optical isolator are typically too large to provide substantial lateral confinement of the propagating optical power, which therefore continues to diverge through the isolator. After exiting the isolator, the still-diverging optical power enters a proximal end face of an optical fiber 1170. Optical fiber 1170 preferably comprises a single-mode optical fiber provided at its proximal end with a short segment of multi-mode GRIN optical fiber, which acts as a focusing element 1172 (equivalently, as an expanded-mode coupling segment), and serves to "collect" the diverging optical power exiting the optical component 1140 and couple a substantial portion of the optical power into the single-mode fiber 1170. The length of the segment 1172 is preferably selected so as to substantially spatially mode match the diverging optical power entering segment 1172 and the mode supported by single-mode optical fiber 1170 (described further hereinbelow).

The exemplary optical assembly of FIGS. 20A and 20B may be modified in a variety of ways for achieving a variety of performance requirements and/or optimizing a variety of performance characteristics. The divergence of the optical mode emerging from the exit face of waveguide 1120 may be selected by suitable design of mode-expander 1122. For example, if optical component 1140 is relatively long (greater than about 0.5 mm, for example; isolators with cemented Polarcor® or other bulk polarizers may typically exceed this length), it may be desirable to design mode expander 1122 to provide a larger mode size at the waveguide exit face (and therefore correspondingly smaller mode divergence). Mode sizes greater than about 10 μm up to several tens of μm across may be desirable. On the other hand, an exiting mode size of less than about 10 μm may be desirable for enabling direct end-transfer of optical power between waveguide/mode expander 1120/1122 and a single mode optical fiber (butt-coupling or end-coupling), without an expanded-mode coupling fiber segment and/or without the intervening optical component. This may be the case when a common planar waveguide substrate 1102 is to be manufactured (with one or more waveguides thereon) that may be used for optical assemblies either including (FIG. 21A) or not including (FIG. 21B) an optical component 1140 (with a single-mode optical fiber in groove 1107 and pushed forward near waveguide 1120 when component 1140 is not present, with or without an expanded-mode coupling segment 1172; shown without segment 1172 in FIG. 21B). The smaller exiting mode size and correspondingly larger divergence may limit the length of an isolator that may be used (to perhaps less than about 0.5 mm long; isolators with thin-film polarizer coatings applied thereto may fall within this length range), may result in over-filling of the input face of optical fiber 1170, and/or may require a suitably adapted focusing element or expanded-mode coupling segment 1172 for optical fiber 1170 for optimizing optical power transfer into the single-mode fiber (discussed further below). On the other hand, decreased optical power transmission through the optical assembly (due to the larger divergence and possible over-filling of the fiber input face) may be an operationally acceptable consequence of such a "dual-use" substrate (FIG. 21A).

Waveguide 1120 and beam expander 1122 may be implemented in a variety of ways. Waveguide 1120 may typically include a core and lower-index cladding. The core may gradually taper (in one or both transverse dimensions) along the length of the waveguide until it eventually terminates, leaving only the cladding to function as an air-guided ridge waveguide. Alternatively, the core may taper (either decreasing or increasing in one or both transverse dimensions) without terminating to yield a desired expanded mode size. In another suitable configuration, a core/cladding waveguide may be embedded in another medium or encapsulant having a lower index than the cladding. As the core gradually tapers away, the cladding begins to act as a waveguide core, while the embedding medium or encapsulant acts as cladding. Myriad other suitable configurations may be contrived while remaining within the scope of the present invention, some of which are disclosed in above-cited App. No. 60/466,799. If the tapering and/or termination of the core are substantially adiabatic, then the core-guided mode will smoothly evolve into a larger mode supported by the waveguide (an air-guided mode in a ridge waveguide, for example). The spatial mode characteristics of the core-guided mode (and therefore the configuration, parameters, and dimensions of the core/cladding) are typically dictated by upstream optical devices/components coupled to and/or incorporated into the waveguide 1120. The spatial mode characteristics of the expanded optical mode (and therefore the configuration, parameters, and dimensions of the mode expander) are determined by the considerations discussed in the preceding paragraphs. In one of many possible implementations of the present invention, a silica-based waveguide 1120 may include a silicon nitride or silicon oxynitride core, the core being several μm wide and only a few hundred nm thick or less. Such a thin-core waveguide may be well-suited for transverse-transfer of optical power, as described in U.S. App. Nos. 60/334,705, 60/360,261, and 10/187,030, which may be useful for upstream optical power transfer into waveguide 1120 for propagation therethrough. Alternatively, a thin core waveguide of this type may enable spatial-mode-matched end-transfer of optical power with various other waveguides and/or devices. The width of the thin core may decrease along the mode-expander segment 1122 with the core eventually terminating, leaving a larger doped silica core within the cladding, or leaving only silica-based cladding material to act as an air-guided ridge waveguide or as a waveguide core within a lower-index embedding medium or encapsulant. Sufficiently gradual tapering and termination of the thin core results in substantially adiabatic evolution of the core-guided optical mode into an expanded optical mode. It should be noted that in some implementations of the present invention, a mode expander 1122 may be completely omitted, so that the optical mode supported by waveguide 1120 simply exits the waveguide and propagates therefrom.

Many other types and/or configurations of planar waveguides may be equivalently employed for implementing embodiments set forth herein and/or equivalents thereof. These may include ridge waveguides, buried waveguides, semiconductor waveguides, other high-index waveguides, silica-based waveguides, polymer waveguides, other low-index waveguides, core/clad type waveguides, multi-layer reflector waveguides, metal-clad waveguides, air-guided waveguides, photonic crystal-based or photonic bandgap-based waveguides, and myriad other examples not explicitly set forth herein but that may nevertheless fall within the scope of inventive concepts disclosed and/or claimed herein. In any of these examples, substantially adiabatic variation of one or more of the material(s), configuration, parameters, and/or dimensions of the waveguide may be employed for producing an expanded optical mode exiting the mode expander with the desired divergence characteristics. It should be noted that a planar waveguide mode expander as described herein may be formed at the proximal ends of planar waveguides 720a and/or 720b (in the exemplary embodiments of FIGS. 6A-6C, FIG. 12, FIG. 14, FIG. 17, or FIG. 27) or planar waveguide 920a (in the exemplary embodiments of FIGS. 7A-7C, FIG. 13, FIG. 15, FIG. 18, FIG. 28, or FIG. 29).

Optical fiber 1170 with expanded-mode coupling segment 1172 (equivalently, collecting segment or focusing segment) may include a single-mode optical fiber and a short segment of multi-mode optical fiber coupled to its end to serve as a focusing or collecting element (functionally similar to GRIN segment(s) 220a and/or 220b of FIGS. 5A-5C or FIG. 11, or to GRIN segment 220b of FIGS. 7A-7C, FIG. 13, FIG. 15, or FIG. 18, for example). The index profile of the multi-mode fiber and the length of the segment 1172 may be tailored to optimally couple a freely-propagating optical mode and the mode of single-mode fiber 1170 fused to segment 1172. The multi-mode fiber segment may be secured to the single-mode fiber for end-transfer of optical power (i.e., butt-coupling or end-coupling) by a variety of means, preferably by fusion splicing of the multi-mode GRIN fiber segment to the single-mode fiber, or alternatively by cementing or by a ferrule or other similar mechanical device. Relative concentricity of the multi-mode fiber segment and the single-mode fiber is desirable, and may be readily achieved by fusion splicing of fibers having substantially similar outer diameters. Gradient-index multi-mode fiber having various core diameters, cladding diameters, and/or index gradients are available commercially, and may be selected for satisfying specific performance requirements for mode-expanded coupling segment 1172. In particular, GRIN optical fiber having an outer cladding diameter of about 125 μm is well-suited for substantially co-axial fusion to standard single-mode optical fiber (which also typically has an outer cladding diameter of about 125 μm). Quarter-pitch lengths for available GRIN optical fiber are on the order of 0.2 mm to 2 mm, and segments may be cleaved or polished to a design length with accuracy of a few microns for achieving desire focusing properties.

A single-mode optical fiber 1170 with an expanded-mode coupling segment 1172 may be substantially coaxially positioned with respect to waveguide 1120 and the mode-expander 1122 thereof, leaving a gap between them for accommodating optical component 1140 (an optical isolator, for example). The mode expander 1122 and expanded-mode coupling segment 1172 may be suitably adapted (as described in the preceding paragraphs) so as to achieve an optimal level of optical power transfer therebetween for a particular longitudinal spacing. Alternatively, mode expander 1122 and expanded-mode coupling segment 1172 may be suitably adapted so as to achieve an operationally acceptable level of optical power transfer therebetween over a range of longitudinal spacings (which may include no gap, i.e., butt-coupling of the waveguide 1120 and fiber 1170). The longitudinal spacing (or range thereof) may be determined by the size (or range of sizes) of component 1140 that may be placed between waveguide 1120 and fiber 1170.

It may be desirable to provide waveguide 1120 with an expanded-mode coupling segment 1122 having performance (i.e., focusing properties) similar to segment 1172. As shown in FIGS. 22A and 22B, waveguide 1120 may terminate with a segment 1122 with an enlarged core (including an index gradient; parameters determined by requirements for propagating through the isolator and into the optical fiber), which would function in a manner analogous to GRIN fiber segment 1172 coupled to single-mode fiber 1170. Waveguide segment 1122 may be configured slightly longer than the corresponding quarter-pitch length, thereby providing a collimated or slightly convergent optical mode for propagation through isolator 1140. This may enable use of a longer optical component 1140, since the divergent portion of the optical mode entering segment 1172 will be shifted farther from the exit face of segment 1122.

Transverse and/or angular alignment of waveguide 1120 and fiber 1170 significantly affects the degree of optical power transfer that may be achieved therebetween. Use of a planar waveguide on a substrate may facilitate transverse alignment, and may enable passive assembly of waveguide, isolator, and optical fiber while achieving operationally acceptable levels of optical power transfer through the optical assembly. In particular, fabrication of alignment structures on the waveguide substrate (for later positioning of the optical component and the optical fiber) substantially concurrently with fabrication of the waveguide 1120 and mode expander 1122 (if present), using spatially-selective fabrication techniques, ensures accurate relative positioning of the alignment structures relative to the waveguide/mode expander. In turn, these alignment structures (grooves, V-grooves, pockets, edges, risers, posts, and so on, which may be very accurately formed on a silicon PLC substrate using standard lithography techniques, for example), enable accurate placement of the optical component 1140 and optical fiber/expanded-mode coupling segment 1170/1172 on substrate 1102 relative to waveguide/mode expander 1120/1122. Sub-micron accuracy is readily achieved using standard lithographic techniques on a silicon substrate, for example. FIGS. 20A/20B, 21A/21B, and 22A/22B show a groove 1104 for receiving and positioning optical component 1140, and a V-groove 1107 for receiving optical fiber/focusing segment 1170/1172. Groove 1104 may be slightly over-sized (for tolerance purposes), and may be fabricated so that one edge provides the required longitudinal and/or angular alignment of component 1140. End faces of isolator 1140 may typically be oriented substantially normal to a propagation axis defined by waveguide 1120 and fiber 1170/groove 1107, or a non-normal angle of incidence on component 1140 may be desirable for a variety of reasons; in either case the orientation of at least one edge of groove 1104 provides the necessary alignment guide.

Other structures, waveguides, devices, and so forth may also be fabricated on substrate 1102 substantially concurrently with the waveguide/mode expander and alignment structures, for forming multi-component optical devices and/or assemblies. Furthermore, these spatially-selective fabrication techniques may typically be implemented on a wafer scale for many devices simultaneously (hundreds or even thousands of devices on a single wafer). Passive assembly/alignment and wafer-scale processing each contribute significantly for enabling substantial economies-of-scale to be realized for the fabrication and assembly of finished optical assemblies and/or devices.

An optical assembly according to the present invention may be employed for providing an "in-line" optical isolator for an optical fiber (FIGS. 23A and 23B). A PLC or other planar waveguide 1120 on a waveguide substrate 1102 may be provided with a distal end adapted for substantially spatial-mode-matched end-transfer of optical power with a single-mode optical fiber 1110. A V-groove 1101 may be provided in the waveguide substrate 1102 for receiving and aligning the optical fiber 1110 relative to the waveguide 1120. Optical power propagating through the waveguide diverges from its proximal end face. The proximal end of the waveguide 1120 may be suitably adapted for achieving desired divergence properties for the exiting optical power (with mode expander 1122, for example), which then enters the optical component 1140 and propagates therethrough (still diverging). The optical component 1140 may be received in and positioned by an alignment groove 1104 provided in the waveguide substrate 1102. A V-groove 1107 is provided in the waveguide substrate 1102 for receiving an optical fiber 1170 and aligning it with the waveguide 1120. The proximal end of the optical fiber 1170 may include an expanded-mode coupling segment 1172 (i.e., a focusing segment comprising a GRIN optical fiber segment fusion-spliced or otherwise joined to the single-mode optical fiber 1170) as described hereinabove, suitably adapted for collecting optical power transmitted through the component 1140 and coupling it into the mode supported by the optical fiber 1170. Wafer-scale fabrication of many waveguides substantially concurrently with the grooves, V-grooves, and any other required alignment structures may ensure operationally acceptable optical power throughput for passively assembled and aligned devices (while also reducing manufacturing costs). Additional components may be implemented on the waveguide substrate (on a wafer scale) for producing high-performance isolators, such as optical tap(s), optical detector(s) for monitoring power, thermo-optic compensator element(s), electro-optic element(s), and so on. Feedback and/or control circuitry may be employed for stabilizing variations of isolator performance with wavelength, temperature, and/or other variables.

Alignment structures on the planar waveguide substrates may be employed for aligning other mode-expanding and/or focusing optical elements incorporated into the optical assembly. For example, as shown in FIGS. 24A/24B and 26A/26B, instead of mode expander 1122 integrally provided for waveguide 1120, a ball or aspheric lens 1124 may be employed instead as a mode expander and focusing element for reducing the divergence through optical component 1140, or even producing a substantially collimated or convergent optical mode. An alignment pocket 1103 may be fabricated in substrate 1102 (once again, substantially concurrently with waveguide 1120) for accurately positioning lens 1124 relative to waveguide 1120. Similarly, a ball or aspheric lens 1174 may be employed as an expanded-mode fiber coupler instead of fiber segment 1172, as in FIGS. 24A/24B and 25A/25B. An alignment pocket 1108 may be fabricated in substrate 1102 for receiving and positioning lens 1174 aligned with waveguide 1120, pocket/lens 1103/1124 (if present), groove 1104, and V-groove 1107.

In another example, as shown in FIGS. 30A/30B and 32A/32B, instead of mode expander 1122 integrally provided for waveguide 1120, a diffractive or Fresnel lens 1126 (a silicon micro-Fresnel lens, for example) may be employed instead as a mode expander and focusing element for reducing the divergence through optical component 1140, or even producing a substantially collimated or convergent optical mode. An alignment groove 1105 may be fabricated in substrate 1102 (once again, substantially concurrently with waveguide 1120) for accurately positioning Fresnel lens 1126 relative to waveguide 1120. Similarly, a Fresnel lens 1176 may be employed as an expanded-mode fiber coupler instead of fiber segment 1172, as in FIGS. 30A/30B and 31A/31B. An alignment groove 1109 may be fabricated in substrate 1102 for receiving and positioning Fresnel lens 1176 aligned with waveguide 1120, pocket/lens 1105/1126 (if present), groove 1104, and V-groove 1107.

It should be noted that any desirable "mixing and matching" of dual-GRIN-segment assembly 200, single GRIN segments 220a/220b, ball/aspheric lenses 1124/1174, waveguide mode expanders (such as mode expander 1122), Fresnel lenses 1126/1176, and/or spliced GRIN segments (such as segment 1172) may be employed to achieve a desired or required level of optical power transfer between fiber(s) and/or waveguide(s) through an optical component. Such mixed/matched optical assemblies shall fall within the scope of the present disclosure and/or appended claims. Suitable index-matching embedding media may be employed for substantially filling optical paths in the any of the exemplary embodiments and/or mixed/matched variants thereof, and/or for encapsulating those embodiments, in a manner already described hereinabove.

It should be understood that while propagation of optical power may often be described herein as proceeding from the waveguide, through one or more free-space optical components, and into an optical fiber, optical power propagation in the either of both directions shall fall within the scope of the present disclosure and/or appended claims.

It should be noted that the single- and dual-GRIN-lens assemblies, waveguide mode expanders, and fiber- or waveguide-based focusing elements (i.e., expanded-mode couplers) as disclosed herein may be less affected by a surrounding optical medium than previous designs based on ball lenses. Optical performance of a ball lens depends explicitly on the index contrast between the ball and the surrounding medium, while the GRIN lenses, mode expanders, and focusing elements disclosed herein may be designed so as to be substantially unaffected by the index of the surrounding medium. For this reason, optical assemblies disclosed herein that include only GRIN lenses, waveguide- or fiber-based focusing elements, and/or waveguide mode expanders may be suitable for embedding or encapsulating in another medium without substantially altering optical performance characteristics. Suitable embedding media or encapsulants may include dielectrics, index-matching media, polymers (including epoxies), and/or other suitable "potting" media. The potting medium may be chosen for one or more of its: refractive index, power-handling capability, hermetic sealing properties (such as low out-gassing and/or hydrophobicity, for example), flow properties, surface tension, optical homogeneity, and so forth. Gaps between transmissive end faces within the optical assembly, whether intentional (for tolerance purposes or for accommodating a variety of component lengths) or unintentional, may be filled with the embedding medium or encapsulant. In addition to maintaining alignment of the embedded components and protecting sensitive optical surfaces thereof, this may serve to substantially reduce Fresnel losses at the corresponding optical interfaces, may serve to reduce the divergence of the propagating optical power between the waveguide and optical fiber, and may also serve to reduce the dependence of overall transmission of the optical assembly on unintended angular deviations of entrance/exit faces of waveguide 1120, component 1140, and/or optical fiber 1170.

An optical Isolator as component 1140 typically includes a Faraday rotator crystal configured for non-reciprocal 45° rotation placed between a pair of linear polarizers with their transmission axes offset by 45°. These may be Polarcor® or other bulk polarizers cemented or otherwise secured to the faces of the Faraday rotator, or may be provided as thin film coatings on the faces of the Faraday rotator. Alternatively, part of the functionality of the isolator may be incorporated into waveguide 1120 (as already described hereinabove for waveguide(s) 720a/720b/920a; the following discussion shall also apply to those exemplary embodiments). In particular, it may be desirable for a portion of waveguide 1120 to function as a polarization-selective element, either by exploiting its intrinsic properties or by providing a polarization-selective structure, such as a bend in the waveguide or a coating thereon, for example. In another example, waveguide 1120 may be adapted for transverse-transfer of optical power (either mode-interference-coupled or substantially adiabatic transverse-transfer; as disclosed in U.S. App. No. 60/334,705, U.S. App. No. 60/360,261, and U.S. Application. Ser. No. 10/187,030, for example) from an upstream optical device into waveguide 1120 and thence into fiber 1170. Transverse-transfer of optical power into waveguide 1120 may be made polarization selective, so that the transverse-transfer segment of waveguide 1120 (i.e., the optical junction segment) may take the place of the first polarizer of isolator 1140. Any such segment of waveguide 1120 configured for substantial transmission of only one linear polarization may take the place of the first polarizer of isolator 1140. In such embodiments (wherein a portion of the isolator functionality, i.e., the first polarizer, is incorporated into waveguide 1120), the gap between waveguide 1120 and fiber 1170 may be reduced, thereby easing the requirements for efficient optical power transfer therebetween. Incorporation of the first isolator polarizer into waveguide 1120 may also serve to reduce overall cost for the optical assembly, since the polarization-selectivity may be incorporated into the waveguide during the same wafer-scale fabrication sequence used for its fabrication, and therefore adds negligibly to the overall manufacturing cost of the finished optical assemblies. The cost of isolator 1140 would also be reduced by the omission of the first polarizer thereof, while potential misalignment of the first polarizer with respect to the input polarization would be substantially reduced as a source of optical loss.

Figure 33:
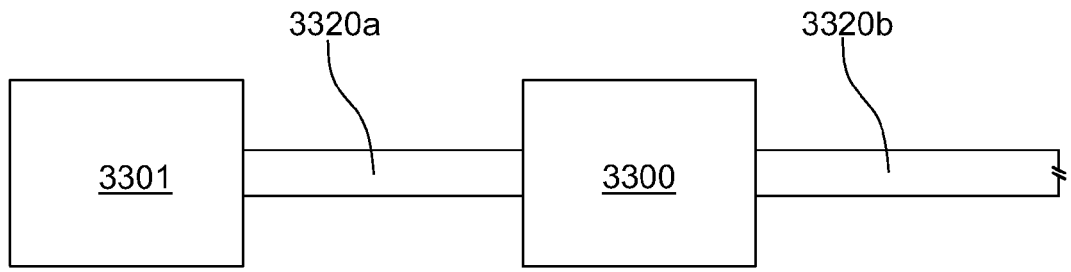
FIG. 33 is a schematic diagram of a laser source with an optical assembly.
Figure 34:
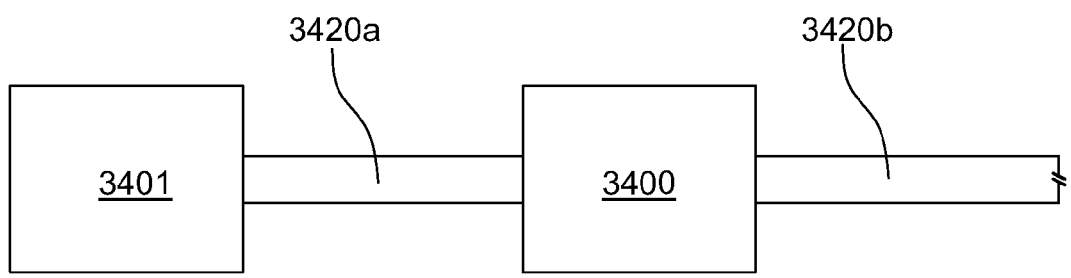
FIG. 34 is a schematic diagram of an optical transceiver with an optical assembly.

Optical assemblies as disclosed herein may be readily incorporated into higher-level integrated optical devices. In the schematic diagram of FIG. 33, optical output of laser source 3301 (of any suitable type) is transmitted by transmission optical element 3320a through optical assembly 3300 (including an optical component, for example an optical isolator) into transmission optical element 3320b. Transmission optical elements 3320a and 3320b may include any combination of planar waveguide(s) and/or optical fiber(s) as disclosed herein. The optical assembly 3300 includes one or more focusing optical elements and is assembled with transmission elements 3320a and 3320b, in a manner similar to any of the exemplary embodiments disclosed herein or substantially equivalent thereto. In the schematic diagram of FIG. 34, an optical transceiver 3401 is optically coupled to transmission optical element 3420b through transmission optical element 3420a and optical assembly 3400 (including an optical component, for example an optical isolator). Transceiver 3401 includes at least one laser source (of any suitable type) and at least one photodetector (of any suitable type).

Figure 35:
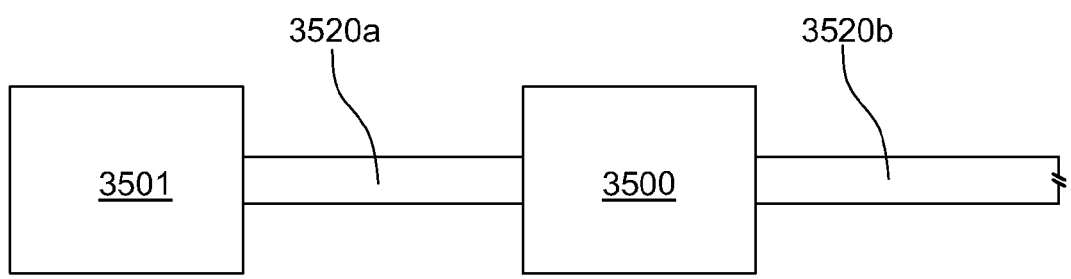
FIG. 35 is a schematic diagram of a photodetector with an optical assembly.

Transmission optical elements 3420a and 3420b may include any combination of planar waveguide(s) and/or optical fiber(s) as disclosed herein. The optical assembly 3400 includes one or more focusing optical elements and is assembled with transmission elements 3420a and 3420b, in a manner similar to any of the exemplary embodiments disclosed herein or substantially equivalent thereto. In the schematic diagram of FIG. 35, a photodetector 3501 (of any suitable type) is optically coupled to transmission optical element 3520b through transmission optical element 3520a and optical assembly 3500 (including an optical component, for example an optical isolator or optical filter). Transmission optical elements 3520a and 3520b may include any combination of planar waveguide(s) and/or optical fiber(s) as disclosed herein. The optical assembly 3500 includes one or more focusing optical elements and is assembled with transmission elements 3520a and 3520b, in a manner similar to any of the exemplary embodiments disclosed herein or substantially equivalent thereto.

In addition to an optical isolator 1140, the present invention may be implemented for placement and alignment of any one or more suitable "free-space" optical components 1140 between a planar waveguide 1120 and an optical fiber 1170. Such components may include, but are not limited to: thin-film filters; bulk polarizers, polarization rotators, waveplates, and/or other polarization components; micro-mirrors and/or micro-beamsplitters; optical taps; diffractive optics; and so forth. As with an isolator, a portion of the functionality of any free-space optical component 1140 (incorporated into an optical assembly according to the present invention) may reside in waveguide 1120, incorporated therein on a wafer-scale, potentially reducing the size and/or cost of the component and/or the size of the gap required between waveguide 1120 and fiber 170, as well as potentially reducing the overall manufacturing cost of the finished optical assemblies.

The term "free-space" optical propagation as used herein shall denote propagation of optical fields through media which do not provide transverse confinement or guiding of the optical field. Propagation of optical fields through such media is determined predominantly by diffraction. Free-space propagation may occur in vacuum or air, or may occur within any substantially transparent medium or a transmissive optical component fabricated from substantially transparent material(s). "Substantially transparent" refers to a particular operating wavelength range.

For purposes of the foregoing written description and/or the appended claims, "index" may denote the bulk refractive index of a particular material (also referred to herein as a "material index") or may denote an "effective index" $n_{eff}$, related to the propagation constant $\beta$ of a particular optical mode in a particular optical element by $\beta=2\pi n_{eff}/\lambda$. The effective index may also be referred to herein as a "modal index". As referred to herein, the term "low-index" shall denote any materials and/or optical structures having an index less than about 2.5, while "high-index" shall denote any materials and/or structures having an index greater than about 2.5. Within these bounds, "low-index" may refer to: silica ($SiO_x$), germano-silicate, boro-silicate, other doped silicas, and/or other silica-based materials; silicon nitride ($Si_xN_y$) and/or silicon oxynitrides ($SiO_xN_y$); other glasses; other oxides; various polymers; and/or any other suitable optical materials having indices below about 2.5. "Low-index" may also include optical fiber, optical waveguides, planar optical waveguides, and/or any other optical components incorporating such materials and/or exhibiting a modal index below about 2.5. Similarly, "high-index" may refer to materials such as semiconductors, IR materials, and/or any other suitable optical materials having indices greater than about 2.5, and/or optical waveguides of any suitable type incorporating such material and/or exhibiting a modal index greater than about 2.5. The terms "low-index" and "high-index" are to be distinguished from the terms "lower-index" and "higher-index", also employed herein. "Low-index" and "high-index" refer to an absolute numerical value of the index (greater than or less than about 2.5), while "lower-index" and "higher-index" are relative terms indicating which of two particular materials has the larger index, regardless of the absolute numerical values of the indices.

For purposes of the foregoing written description and/or the appended claims, the term "optical waveguide" (or equivalently, "waveguide") as employed herein shall denote a structure adapted for supporting one or more optical modes. Such waveguides shall typically provide confinement of a supported optical mode in two transverse dimensions while allowing propagation along a longitudinal dimension. The transverse and longitudinal dimensions/directions shall be defined locally for a curved waveguide; the absolute orientations of the transverse and longitudinal dimensions may therefore vary along the length of a curvilinear waveguide, for example. Examples of optical waveguides may include, without being limited to, various types of optical fiber and various types of planar waveguides. The term "planar optical waveguide" (or equivalently, "planar waveguide") as employed herein shall denote any optical waveguide that is formed on a substantially planar substrate. The longitudinal dimension (i.e., the propagation dimension) shall be considered substantially parallel to the substrate. A transverse dimension substantially parallel to the substrate may be referred to as a lateral or horizontal dimension, while a transverse dimension substantially perpendicular to the substrate may be referred to as a vertical dimension. Examples of such waveguides include ridge waveguides, buried waveguides, semiconductor waveguides, other high-index waveguides ("high-index" being above about 2.5), silica-based waveguides, polymer waveguides, other low-index waveguides ("low-index" being below about 2.5), core/clad type waveguides, multi-layer reflector (MLR) waveguides, metal-clad waveguides, air-guided waveguides, vacuum-guided waveguides, photonic crystal-based or photonic bandgap-based waveguides, waveguides incorporating electro-optic (EO) and/or electro-absorptive (EA) materials, waveguides incorporating non-linear-optical (NLO) materials, and myriad other examples not explicitly set forth herein which may nevertheless fall within the scope of the present disclosure and/or appended claims. Many suitable substrate materials may be employed, including semiconductor, crystalline, silica or silica-based, other glasses, ceramic, metal, and myriad other examples not explicitly set forth herein which may nevertheless fall within the scope of the present disclosure and/or appended claims.

The term "transmission optical element" (equivalently, "transmission element") as used herein shall denote an optical waveguide primarily serving to convey optical power from one point to another. A transmission optical element may serve to alter the optical power transmitted therethrough, and such alteration may be passive (i.e., requiring no control signal input) and/or active (i.e., in response to an applied control signal). A transmission optical element shall be distinguished from an optical source (such as an LED or laser), in that a transmission optical element does not generate optical power, but serves to transmit optical power generated elsewhere.

One exemplary type of planar optical waveguide that may be suitable for use with optical components disclosed herein is a so-called PLC waveguide (Planar Lightwave Circuit). Such waveguides typically comprise silica or silica-based waveguides (often ridge or buried waveguides; other waveguide configuration may also be employed) supported on a substantially planar silicon substrate (often with an interposed silica or silica-based optical buffer layer). Sets of one or more such waveguides may be referred to as planar waveguide circuits, optical integrated circuits, or opto-electronic integrated circuits. A PLC substrate with one or more PLC waveguides may be readily adapted for mounting one or more optical sources, lasers, modulators, and/or other optical devices adapted for end-transfer of optical power with a suitably adapted PLC waveguide. A PLC substrate with one or more PLC waveguides may be readily adapted (according to the teachings of U.S. patent application Pub. No. 2003/0081902 and/or U.S. App. No. 60/466,799) for mounting one or more optical sources, lasers, modulators, photodetectors, and/or other optical devices adapted for transverse-transfer of optical power with a suitably adapted PLC waveguide (mode-interference-coupled, or substantially adiabatic, transverse-transfer; also referred to as transverse-coupling).

For purposes of the foregoing written description and/or appended claims, "spatially-selective material processing techniques" shall encompass epitaxy, layer growth, lithography, photolithography, evaporative deposition, sputtering, vapor deposition, chemical vapor deposition, beam deposition, beam-assisted deposition, ion beam deposition, ion-beam-assisted deposition, plasma-assisted deposition, wet etching, dry etching, ion etching (including reactive ion etching), ion milling, laser machining, spin deposition, spray-on deposition, electrochemical plating or deposition, electroless plating, photo-resists, UV curing and/or densification, micro-machining using precision saws and/or other mechanical cutting/shaping tools, selective metallization and/or solder deposition, chemical-mechanical polishing for planarizing, any other suitable spatially-selective material processing techniques, combinations thereof, and/or functional equivalents thereof. In particular, it should be noted that any step involving "spatially-selectively providing" a layer or structure may involve either or both of: spatially-selective deposition and/or growth, or substantially uniform deposition and/or growth (over a given area) followed by spatially-selective removal. Any spatially-selective deposition, removal, or other process may be a so-called direct-write process, or may be a masked process. It should be noted that any "layer" referred to herein may comprise a substantially homogeneous material layer, or may comprise an inhomogeneous set of one or more material sub-layers. Spatially-selective material processing techniques may be implemented on a wafer scale for simultaneous fabrication/processing of multiple structures on a common substrate wafer.

It should be noted that various components, elements, structures, and/or layers described herein as "secured to", "connected to", "mounted on", "deposited on", "formed on", "positioned on", etc., a substrate may make direct contact with the substrate material, or may make contact with one or more layer(s) and/or other intermediate structure(s) already present on the substrate, and may therefore be indirectly "secured to", etc, the substrate.

The phrase "operationally acceptable" appears herein describing levels of various performance parameters of optical components and/or optical devices, such as optical power transfer efficiency (equivalently, optical coupling efficiency), optical loss, optical gain, lasing threshold, undesirable optical mode coupling, and so on. An operationally acceptable level may be determined by any relevant set or subset of applicable constraints and/or requirements arising from the performance, fabrication, device yield, assembly, testing, availability, cost, supply, demand, and/or other factors surrounding the manufacture, deployment, and/or use of a particular optical device. Such "operationally acceptable" levels of such parameters may therefore vary within a given class of devices depending on such constraints and/or requirements. For example, a lower optical coupling efficiency may be an acceptable trade-off for achieving lower optical assembly fabrication costs in some instances, while higher optical coupling may be required in other instances in spite of higher fabrication costs. The "operationally acceptable" coupling efficiency therefore varies between the instances. In another example, higher lasing threshold arising from optical loss (due to scattering, absorption, undesirable optical coupling, and so on) may be an acceptable trade-off for achieving lower device fabrication cost or smaller device size in some instances, while a lower lasing threshold may be required in other instances in spite of higher fabrication costs and/or larger device size. The "operationally acceptable" lasing threshold therefore varies between the instances. Many other examples of such trade-offs may be imagined. Optical assemblies and fabrication methods therefor as disclosed herein, and equivalents thereof, may therefore be implemented within tolerances of varying precision depending on such "operationally acceptable" constraints and/or requirements. Phrases such as "substantially adiabatic", "substantially spatial-mode-matched", "substantially modal-index-matched", "so as to substantially avoid undesirable optical coupling", and so on as used herein shall be construed in light of this notion of "operationally acceptable" performance.

While particular examples have been disclosed herein employing specific materials and/or material combinations and having particular dimensions and configurations, it should be understood that many materials and/or material combinations may be employed in any of a variety of dimensions and/or configurations while remaining within the scope of inventive concepts disclosed and/or claimed herein.

It is intended that equivalents of the disclosed exemplary embodiments and methods shall fall within the scope of the present disclosure and/or appended claims. It is intended that the disclosed exemplary embodiments and methods, and equivalents thereof, may be modified while remaining within the scope of the present disclosure and/or appended claims.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or", "only one of . . . ", or similar language; or (ii) two or more of the listed alternatives are mutually exclusive within the particular context, in which case "or" would encompass only those combinations involving non-mutually-exclusive alternatives. For purposes of the present disclosure or appended claims, the words "comprising", "including", and "having" shall be construed as open ended terminology, with the same meaning as if the phrase "at least" were appended after each instance thereof.

What is claimed is:

1. An optical apparatus comprising:
a first substrate with at least one groove;
first and second segments of a GRIN optical medium secured to the first substrate in at least one groove thereon, the first and second GRIN segments being longitudinally spaced apart from one another on the first substrate and having respective proximal and distal end faces, the first and second GRIN segments being arranged so as to enable a free-space optical beam to be received through the distal end face of the first GRIN segment so that the optical beam thus received (i) is transmitted through the proximal end face of the first GRIN segment, (ii) propagates to the proximal end face of the second GRIN segment, (iii) is received through the proximal end face of the second GRIN segment, and (iv) is transmitted as a free-space optical beam through the distal end face of the second GRIN segment;

a second substrate having at least one groove, the first substrate and the first and second GRIN segments being mounted on the second substrate with the first and second GRIN segments received in at least one groove on the second substrate;

an optical component positioned between the proximal end faces of the first and second GRIN segments, the optical component having first and second end faces facing the proximal end faces of the first and second GRIN segments, respectively, so that the optical component is thereby arranged so that an optical beam propagating between the proximal end faces of the GRIN segments is transmitted through the first and second end faces of the optical component;

a first transmission optical element positioned on the second substrate, the first transmission optical element having a proximal end face facing the distal end face of the first GRIN segment and being arranged so that a divergent optical beam emergent from the proximal end face of the first transmission optical element is received though the distal end face of the first GRIN segment; and a second transmission optical element positioned on the second substrate, the second transmission optical element having a proximal end face facing the distal end face of the second GRIN segment and being arranged so that a convergent optical beam emergent from the distal end face of the second GRIN segment is received through the proximal end face of the second transmission optical element.

2. The apparatus of claim 1 wherein:
the first transmission optical element comprises a first optical fiber mounted in a groove on the second substrate so that the first optical fiber is optically substantially coaxial with the first GRIN segment; and
the second transmission optical element comprises a second optical fiber mounted in a groove on the second substrate so that the second optical fiber is optically substantially coaxial with the second GRIN segment.

3. The apparatus of claim 1 wherein:
the first transmission optical element comprises a first planar optical waveguide formed on the second substrate so that the first planar optical waveguide is optically substantially coaxial with the first GRIN segment; and
the second transmission optical element comprises a second planar optical waveguide formed on the second substrate so that the second planar optical waveguide is optically substantially coaxial with the second GRIN segment.

4. The apparatus of claim 1 wherein:
the first transmission optical element comprises a planar optical waveguide formed on the second substrate so that the planar optical waveguide is optically substantially coaxial with the first GRIN segment; and
the second transmission optical element comprises an optical fiber mounted in a groove on the second substrate so that the optical fiber is optically substantially coaxial with the second GRIN segment.

5. The apparatus of claim 1 further comprising:
a substantially transparent, non-gaseous embedding medium substantially filling an optical path between the first end face of the optical component and the proximal end face of the first GRIN segment; and
a substantially transparent, non-gaseous embedding medium substantially filling an optical path between the second end face of the optical component and the proximal end face of the second GRIN segment.

6. The apparatus of claim 1 further comprising:
a substantially transparent, non-gaseous embedding medium substantially filling an optical path between the proximal end face of the first transmission optical element and the distal end face of the first GRIN segment; and
a substantially transparent, non-gaseous embedding medium substantially filling an optical path between the proximal end face of the transmission optical element and the distal end face of the second GRIN segment.

7. The apparatus of claim 1 wherein the optical component, the first and second GRIN segments, and proximal portions of the first and second transmission optical elements are encapsulated.

8. The apparatus of claim 1 wherein the optical component is mounted on the first substrate.

9. The apparatus of claim 1 wherein the optical component is mounted on the second substrate.

10. The apparatus of claim 1 wherein the optical component comprises an optical isolator.

11. The apparatus of claim 1 wherein:
the optical component comprises a Faraday rotator and a linear polarizer;
at least one of the transmission optical elements comprises a polarization-selective planar waveguide formed on the second substrate; and
the Faraday rotator, polarizer, and polarization-selective planar waveguide together function as an optical isolator.

12. The apparatus of claim 1 further comprising a laser source optically coupled to the first transmission optical element at a distal portion thereof so that optical output power from the laser source is transmitted into the second transmission optical element through the first transmission optical element, the first GRIN segment, the optical component, and the second GRIN segment.

13. The apparatus of claim 1 further comprising an optical transceiver optically coupled to the first transmission optical element at a distal portion thereof so that optical power is transmitted between the optical transceiver and the second transmission optical element through the first transmission optical element, the first GRIN segment, the optical component, and the second GRIN segment.

14. The apparatus of claim 1 further comprising a photodetector optically coupled to the first transmission optical element at a distal portion thereof so that optical power is transmitted from the second transmission optical element to the photodetector through the second GRIN segment, the optical component, the first GRIN segment, and the first transmission optical element.

15. The apparatus of claim 1 wherein the first and second GRIN segments comprise discrete, separated segments of a single GRIN optical medium mounted on the first substrate.

16. The apparatus of claim 1 wherein the first GRIN segment comprises a first segment of GRIN optical fiber, and the second GRIN segment comprises a second segment of GRIN optical fiber.

17. The apparatus of claim 1 wherein the first and second GRIN segments comprise discrete, separated segments of a single GRIN optical fiber mounted on the first substrate.

18. The apparatus of claim 1 wherein the first substrate is arranged to maintain the first and second GRIN segments in the arrangement that enables the free-space optical beam received through the distal end face of the first GRIN segment (i) to be transmitted through the proximal end face of the first GRIN segment, (ii) to propagate to the proximal end face of the second GRIN segment, (iii) to be received through the proximal end face of the second GRIN segment, and (iv) to be transmitted as a free-space optical beam through the distal end face of the second GRIN segment.

19. The apparatus of claim 1 wherein the second substrate is arranged to maintain the first GRIN segment and the first transmission optical element in the arrangement that enables the divergent optical beam emergent from the proximal end face of the first transmission optical element to be received through the distal end face of the first GRIN segment.

20. The apparatus of claim 1 wherein the second substrate is arranged to maintain the second GRIN segment and the second transmission optical element in the arrangement that enables the convergent optical beam emergent from the distal end face of the second GRIN segment to be received through the proximal end face of the second transmission optical element.

* * * * *